United States Patent
Zhang et al.

(10) Patent No.: US 10,531,249 B2
(45) Date of Patent: Jan. 7, 2020

(54) DOWNLINK OFFLOADING AND CONVERGING METHOD, UPLINK OFFLOADING AND CONVERGING METHOD, AND DEVICE

(71) Applicant: Huawei Technologies Co., Ltd., Shenzhen (CN)

(72) Inventors: Hongzhuo Zhang, Shanghai (CN); Tianle Deng, Shanghai (CN); Xiaoli Shi, Shanghai (CN); Li Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 15/429,687

(22) Filed: Feb. 10, 2017

(65) Prior Publication Data
US 2017/0156041 A1 Jun. 1, 2017

Related U.S. Application Data

(63) Continuation of application No. PCT/CN2014/084210, filed on Aug. 12, 2014.

(51) Int. Cl.
*H04W 4/20* (2018.01)
*H04L 29/12* (2006.01)
(Continued)

(52) U.S. Cl.
CPC .......... *H04W 4/20* (2013.01); *H04L 61/6022* (2013.01); *H04W 28/08* (2013.01); *H04W 88/06* (2013.01)

(58) Field of Classification Search
None
See application file for complete search history.

(56) References Cited

U.S. PATENT DOCUMENTS

| 2012/0224485 | A1 | 9/2012 | Payyappilly et al. |
| 2014/0082697 | A1 | 3/2014 | Watfa et al. |
(Continued)

FOREIGN PATENT DOCUMENTS

| CN | 103220786 A | 7/2013 |
| CN | 103404085 A | 11/2013 |
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300, V12.2.0, Jun. 2014, 215 pages.

(Continued)

*Primary Examiner* — Robert C Scheibel
(74) *Attorney, Agent, or Firm* — Slater Matsil, LLP

(57) ABSTRACT

The present embodiments relate to a cellular radio access device sends, by using a non-cellular radio access device, a data frame to the UE served by the cellular radio access device, where the data frame includes a data packet that the cellular radio access device needs to send to the UE, and indication information used to indicate that the data packet is a cellular network data packet. The indication information is used by the UE to process the data packet by using a cellular network protocol according to the indication information.

8 Claims, 22 Drawing Sheets

(51) Int. Cl.
*H04W 72/04* (2009.01)
*H04W 28/08* (2009.01)
*H04W 88/06* (2009.01)

(56) References Cited

U.S. PATENT DOCUMENTS

| 2015/0063295 | A1* | 3/2015 | Himayat | H04W 36/0022 370/331 |
| 2015/0139184 | A1* | 5/2015 | Wang | H04W 28/08 370/331 |
| 2015/0264726 | A1* | 9/2015 | Zhu | H04W 28/065 370/329 |
| 2015/0350988 | A1* | 12/2015 | Himayat | H04W 36/22 370/331 |
| 2016/0337958 | A1 | 11/2016 | Fujishiro et al. | |

FOREIGN PATENT DOCUMENTS

| CN | 103582011 A | 2/2014 |
| CN | 103747486 A | 4/2014 |
| WO | 2013185653 A1 | 12/2013 |
| WO | 2014113103 A1 | 7/2014 |
| WO | 2015170764 A1 | 11/2015 |

OTHER PUBLICATIONS

IEEE, "IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications", IEEE Std 802.11, Mar. 29, 2012, 2793 pages.

J. Postel et al., "A Standard for the Transmission of IP Datagrams Over IEEE 802 Networks", Network Working Group, Feb. 1988, 16 pages.

* cited by examiner

DOWNLINK OFFLOADING AND CONVERGING METHOD, UPLINK OFFLOADING AND CONVERGING METHOD, AND DEVICE

CROSS-REFERENCE TO RELATED APPLICATIONS

This application is a continuation of International Application No. PCT/CN2014/084210, filed on Aug. 12, 2014, the disclosure of which is hereby incorporated by reference in its entirety.

TECHNICAL FIELD

The present embodiments relate to the communications field, and in particular, to a downlink offloading and converging method, an uplink offloading and converging method, and a device.

BACKGROUND

With rapid development of intelligent terminals and mobile applications, mobile data traffic has sharply increased. Consequently, it is more difficult for a current 3rd Generation Partnership Project (3GPP) network to meet increasing requirements for mobile data traffic. Therefore, mobile operators expect to use a non-3GPP network to bear some or all mobile data traffic of the 3GPP network by means of inter-network cooperation between the 3GPP network and the non-3GPP (non-3GPP) network, so as to relieve a burden on the current 3GPP network. For example, when a Long Term Evolution (LTE) network is overloaded, some or all services of some user equipments (UE) within coverage of a wireless local area network (WLAN) are offloaded to the WLAN, so that a service overloaded status of the LTE network can be relieved.

However, after some or all the services of the UE are offloaded to the WLAN, the services cannot be converged at an LTE protocol layer for processing. Therefore, UE service continuity cannot be ensured, and service quality of the UE is deteriorated, thereby affecting user experience.

SUMMARY

The present embodiments provide a downlink offloading and converging method, an uplink offloading and converging method, and a device, to resolve a problem that low service quality and poor user experience are caused because user equipment (UE) service continuity cannot be ensured after some or all services of UE are offloaded.

To achieve the foregoing objective, the present embodiments use the following technical solutions.

A first aspect of the present embodiments provide a downlink offloading and converging method, where the method is applied to a wireless communications system that includes a cellular radio access device and a non-cellular radio access device. The method includes determining, by the cellular radio access device, to offload data, in a cellular network, of a UE served by the cellular radio access device to a non-cellular network and sending, by the cellular radio access device by using the non-cellular radio access device, a data frame to the UE served by the cellular radio access device. The data frame includes a data packet that the cellular radio access device needs to send to the UE, and indication information used to indicate that the data packet is a cellular network data packet, where the indication information is used by the UE to process the data packet by using a cellular network protocol according to the indication information.

With reference to the first aspect, in a possible implementation manner, the indication information is address information of the cellular radio access device.

With reference to the first aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the first aspect and the foregoing possible implementation manners, in another possible implementation manner, the method further includes: sending, by the cellular radio access device, a mapping relationship between the bearer information and the radio bearer that is in the at least one radio bearer and that carries the data packet, to the UE by using an air interface message.

With reference to the first aspect and the foregoing possible implementation manners, in another possible implementation manner, the cellular network data packet includes a Packet Data Convergence Protocol (PDCP) data packet or a Radio Link Control (RLC) data packet.

A second aspect of the present embodiments provide a downlink offloading and converging method, where the method is applied to a wireless communications system that includes a cellular radio access device and a non-cellular radio access device, and the method includes receiving, by an access controller (AC), a data packet that is sent by the cellular radio access device and that the cellular radio access device needs to send to a user equipment (UE) and sending, by the AC, a data frame to the UE by using the non-cellular radio access device. The data frame includes the data packet that the cellular radio access device needs to send to the UE, and indication information used to indicate that the data packet is a cellular network data packet, where the indication information is used by the UE to process the data packet by using a cellular network protocol according to the indication information.

With reference to the second aspect, in a possible implementation manner, the indication information is address information of the cellular radio access device.

With reference to the second aspect and the foregoing possible implementation manner, in another possible implementation manner, before the sending, by the AC, a data frame to the UE by using the non-cellular radio access device, the method further includes: receiving, by the AC, identification information of the non-cellular radio access device that is sent by the cellular radio access device, where the identification information is used by the AC to determine the non-cellular radio access device.

With reference to the second aspect and the foregoing possible implementation manners, in another possible implementation manner, the data packet is included in an 802.3 frame; and before the sending, by the AC, a data frame to the UE by using the non-cellular radio access device, the method further includes: adding, by the AC, the data packet included in the 802.3 frame to the data frame.

With reference to the second aspect and the foregoing possible implementation manners, in another possible implementation manner, the identification information of the non-cellular radio access device is a media access control (MAC) address of the non-cellular radio access device, a basic service set identifier (BSSID) of the non-cellular radio access device, or a service set identifier (SSID) of the non-cellular radio access device.

With reference to the second aspect and the foregoing possible implementation manners, in another possible implementation manner, when there is at least one radio bearer on the UE, the data frame further includes bearer information used to indicate a radio bearer that is in the at least one radio bearer and that carries the data packet.

With reference to the second aspect and the foregoing possible implementation manners, in another possible implementation manner, the method further includes: sending, by the AC, a mapping relationship between the bearer information and the radio bearer that is in the at least one radio bearer and that carries the data packet, to the UE by using the cellular radio access device.

With reference to the second aspect and the foregoing possible implementation manners, in another possible implementation manner, the cellular network data packet includes a PDCP data packet or a RLC data packet.

A third aspect of the present embodiments provide an uplink offloading and converging method, where the method is applied to a wireless communications system that includes a cellular radio access device and a non-cellular radio access device, and the method includes: when a UE determines to offload data of the UE in a cellular network to a non-cellular network, sending, by the UE, a data frame to the cellular radio access device by using the non-cellular radio access device, where the data frame includes a data packet that the UE needs to send to the cellular radio access device, and indication information used to indicate that the data packet is a cellular network data packet, where the indication information is used by the cellular radio access device to process the data packet by using a cellular network protocol.

With reference to the third aspect, in a possible implementation manner, the indication information is address information of the cellular radio access device.

With reference to the third aspect and the foregoing possible implementation manner, in another possible implementation manner, before the sending, by the UE, a data frame to the cellular radio access device by using the non-cellular radio access device, the method further includes: receiving, by the UE, a mapping relationship between a MAC address of the cellular radio access device and function information of the MAC address, where the mapping relationship is sent by the cellular radio access device, and the function information includes offloading and converging; and determining, by the UE according to the mapping relationship, a MAC address whose function information is offloading and converging as the indication information.

With reference to the third aspect and the foregoing possible implementation manners, in another possible implementation manner, when there is at least one radio bearer on the UE, the data frame further includes bearer information used to indicate a radio bearer that is in the at least one radio bearer and that carries the data packet.

With reference to the third aspect and the foregoing possible implementation manners, in another possible implementation manner, the cellular network data packet includes a PDCP data packet or a RLC data packet.

A fourth aspect of the present embodiments provide a downlink offloading and converging method, where the method is applied to a wireless communications system that includes a cellular radio access device and a non-cellular radio access device, and the method includes: receiving, by a UE, a data frame sent by the cellular radio access device by using the non-cellular radio access device, where the data frame is sent after the cellular radio access device determines to offload data of the UE in a cellular network to a non-cellular network, and the data frame includes a data packet that the cellular radio access device needs to send to the UE, and indication information used to indicate that the data packet is a cellular network data packet; determining, by the UE, that the data packet is the cellular network data packet according to the indication information; and processing, by the UE, the data packet by using a cellular network protocol.

With reference to the fourth aspect, in a possible implementation manner, the indication information is address information of the cellular radio access device.

With reference to the fourth aspect and the foregoing possible implementation manner, in another possible implementation manner, when there is at least one radio bearer on the UE, the data frame further includes bearer information used to indicate a radio bearer that is in the at least one radio bearer and that carries the data packet; before the processing, by the UE, the data packet by using a cellular network protocol, the method further includes: receiving, by the UE, a mapping relationship between the bearer information and the radio bearer that is in the at least one radio bearer and that carries the data packet, where the mapping relationship is sent by the cellular radio access device by using an air interface message; and the processing, by the UE, the data packet by using a cellular network protocol includes: processing, by the UE, the data packet by using the cellular network protocol according to the mapping relationship and the bearer information.

With reference to the fourth aspect and the foregoing possible implementation manners, in another possible implementation manner, the cellular network data packet includes a PDCP data packet or a RLC data packet.

A fifth aspect of the present embodiments provide a downlink offloading and converging method, where the method is applied to a wireless communications system that includes a cellular radio access device and a non-cellular radio access device, and the method includes: receiving, by a UE, a data frame sent by an AC by using the non-cellular radio access device, where the data frame is sent after the AC receives a data packet that is sent by the cellular radio access device and that the cellular radio access device needs to send to the UE, and the data frame includes the data packet that the cellular radio access device needs to send to the UE, and indication information used to indicate that the data packet is a cellular network data packet; determining, by the UE, that the data packet is the cellular network data packet according to the indication information; and processing, by the UE, the data packet by using a cellular network protocol.

With reference to the fifth aspect, in a possible implementation manner, the indication information is address information of the cellular radio access device.

With reference to the fifth aspect and the foregoing possible implementation manner, in another possible implementation manner, when there is at least one radio bearer on the UE, the data frame further includes bearer information used to indicate a radio bearer that is in the at least one radio bearer and that carries the data packet; before the processing, by the UE, the data packet by using a cellular network protocol, the method further includes: receiving, by the UE, a mapping relationship between the bearer information and the radio bearer that is in the at least one radio bearer and that carries the data packet, where the mapping relationship is sent by the AC by using the cellular radio access device; and the processing, by the UE, the data packet by using a cellular network protocol includes: processing, by the UE, the data packet by using the cellular network protocol according to the mapping relationship and the bearer information.

With reference to the fifth aspect and the foregoing possible implementation manners, in another possible implementation manner, the cellular network data packet includes a PDCP data packet or a RLC data packet.

A sixth aspect of the present embodiments provide an uplink offloading and converging method, where the method is applied to a wireless communications system that includes a cellular radio access device and a non-cellular radio access device, and the method includes: receiving, by the cellular radio access device, a data frame sent by a UE by using the non-cellular radio access device, where the data frame is sent when the UE determines to offload data of the UE in a cellular network to a non-cellular network, and the data frame includes a data packet that the UE needs to send to the cellular radio access device, and indication information used to indicate that the data packet is a cellular network data packet; and processing, by the cellular radio access device, the data packet by using a cellular network protocol.

With reference to the sixth aspect, in a possible implementation manner, the indication information is address information of the cellular radio access device.

With reference to the sixth aspect and the foregoing possible implementation manner, in another possible implementation manner, before the receiving, by the cellular radio access device, a data frame sent by a UE by using the non-cellular radio access device, the method further includes: sending, by the cellular radio access device, a mapping relationship between a MAC address of the cellular radio access device and function information of the MAC address to the UE, where the function information includes offloading and converging.

With reference to the sixth aspect and the foregoing possible implementation manners, in another possible implementation manner, the data frame is sent after the non-cellular radio access device determines that the data packet is the cellular network data packet; or before the processing, by the cellular radio access device, the data packet by using a cellular network protocol, the method further includes: determining, by the cellular radio access device, that the data packet is the cellular network data packet according to the indication information.

With reference to the sixth aspect and the foregoing possible implementation manner, in another possible implementation manner, when there is at least one radio bearer on the UE, the data frame further includes bearer information used to indicate a radio bearer that is in the at least one radio bearer and that carries the data packet; and the processing, by the cellular radio access device, the data packet by using a cellular network protocol includes: processing, by the cellular radio access device, the data packet by using the cellular network protocol according to the bearer information and a mapping relationship between the bearer information and the radio bearer that is in the at least one radio bearer and that carries the data packet.

With reference to the sixth aspect and the foregoing possible implementation manners, in another possible implementation manner, the cellular network data packet includes a PDCP data packet or a RLC data packet.

A seventh aspect of the present embodiments provides an uplink offloading and converging method, where the method is applied to a wireless communications system that includes a cellular radio access device and a non-cellular radio access device, and the method includes: receiving, by an AC, a data frame sent by a UE by using the non-cellular radio access device, where the data frame is sent when the UE determines to offload data of the UE in a cellular network to a non-cellular network, the data frame includes a data packet that the UE needs to send to the cellular radio access device, and indication information used to indicate that the data packet is a cellular network data packet, and the indication information is used by the cellular radio access device to process the data packet by using a cellular network protocol; and after determining that the data packet is the cellular network data packet according to the indication information, sending, by the AC, the data frame to the cellular radio access device; or sending, by the AC, the data frame to the cellular radio access device, where the data frame is sent to the AC by the non-cellular radio access device after determining that the data packet is the cellular network data packet according to the indication information.

With reference to the seventh aspect, in a possible implementation manner, the indication information is address information of the cellular radio access device.

With reference to the seventh aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the seventh aspect and the foregoing possible implementation manners, in another possible implementation manner, the cellular network data packet includes a PDCP data packet or a RLC data packet.

An eighth aspect of the present embodiments provides a downlink offloading and converging method, where the method is applied to a wireless communications system that includes a cellular radio access device and a non-cellular radio access device, and the method includes: receiving, by a UE, a data frame sent by the cellular radio access device by using the non-cellular radio access device, where the data frame includes a data packet that the cellular radio access device needs to send to the UE, and the data packet includes a source Internet Protocol (IP) address and a destination IP address; determining, by the UE, that the source IP address is an address used to bear a cellular service, or determining that the destination IP address is assigned by a core network gateway; and processing, by the UE, the data packet by using a cellular network protocol.

A ninth aspect of the present embodiments provides an uplink offloading and converging method, where the method is applied to a wireless communications system that includes a cellular radio access device and a non-cellular radio access device, and the method includes: receiving, by the cellular radio access device, a data frame sent by a UE by using the non-cellular radio access device, where the data frame includes a data packet that the UE needs to send to the cellular radio access device, and the data packet includes a source IP address and a destination IP address; determining, by the cellular radio access device, that the destination IP address is an address used to bear a cellular service, or determining that the source IP address is assigned by a core network gateway; and processing, by the cellular radio access device, the data packet by using a cellular network protocol.

A tenth aspect of the present embodiments provides a downlink offloading and converging method, where the method is applied to a wireless communications system that includes a cellular radio access device and a non-cellular radio access device, and the method includes: receiving, by the non-cellular radio access device, a data frame sent by the cellular radio access device, where the data frame includes a data packet that the cellular radio access device needs to send to a UE, and the data packet includes a source IP address and a destination IP address; determining, by the non-cellular radio access device, that the source IP address is an address used to bear a cellular service, or determining that the destination IP address is assigned by a core network gateway; and sending, by the non-cellular radio access device, the data frame to the UE, so that the UE processes the data packet by using a cellular network protocol.

An eleventh aspect of the present embodiments provides an uplink offloading and converging method, where the method is applied to a wireless communications system that includes a cellular radio access device and a non-cellular radio access device, and the method includes: receiving, by the non-cellular radio access device, a data frame sent by a UE, where the data frame includes a data packet that the UE needs to send to the cellular radio access device, and the data packet includes a source IP address and a destination IP address; determining, by the non-cellular radio access device, that the destination IP address is an address used to bear a cellular service, or determining that the source IP address is assigned by a core network gateway; and sending, by the non-cellular radio access device, the data frame to the cellular radio access device, so that the cellular radio access device processes the data packet by using a cellular network protocol.

A twelfth aspect of the present embodiments provides a downlink offloading and converging method, where the method is applied to a wireless communications system that includes a cellular radio access device and a non-cellular radio access device, and the method includes: receiving, by the non-cellular radio access device, a data frame sent by the cellular radio access device or an AC, where the data frame includes a data packet that the cellular radio access device needs to send to a UE; and adding, by the non-cellular radio access device to the data frame, indication information used to indicate that the data packet is a cellular network data packet, and sending the data frame to the UE, where the indication information is used by the UE to process the data packet by using a cellular network protocol according to the indication information.

With reference to the twelfth aspect, in a possible implementation manner, before the adding, by the non-cellular radio access device to the data frame, indication information used to indicate that the data packet is a cellular network data packet, and sending the data frame to the UE, the method further includes: receiving, by the non-cellular radio access device, the indication information sent by the cellular radio access device.

A thirteenth aspect of the present embodiments provides a cellular radio access device, where the cellular radio access device is applied to a wireless communications system, where the wireless communications system further includes a non-cellular radio access device, and the cellular radio access device includes: a determining module, configured to determine to offload data, in a cellular network, of a UE served by the cellular radio access device to a non-cellular network; and a sending module, configured to send, by using the non-cellular radio access device, a data frame to the UE served by the cellular radio access device, where the data frame includes a data packet that the cellular radio access device needs to send to the UE, and indication information used to indicate that the data packet is a cellular network data packet, where the indication information is used by the UE to process the data packet by using a cellular network protocol according to the indication information.

With reference to the thirteenth aspect, in a possible implementation manner, the indication information is address information of the cellular radio access device.

With reference to the thirteenth aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the thirteenth aspect and the foregoing possible implementation manners, in another possible implementation manner, the sending module is further configured to send a mapping relationship between the bearer information and the radio bearer that is in the at least one radio bearer and that carries the data packet, to the UE by using an air interface message.

With reference to the thirteenth aspect and the foregoing possible implementation manners, in another possible implementation manner, the cellular network data packet includes a PDCP data packet or a RLC data packet.

A fourteenth aspect of the present embodiments provides an AC, where the access controller AC is applied to a wireless communications system that includes a cellular radio access device and a non-cellular radio access device, and the AC includes: a receiving module, configured to receive a data packet that is sent by the cellular radio access device and that the cellular radio access device needs to send to a UE; and a sending module, configured to send a data frame to the UE by using the non-cellular radio access device, where the data frame includes the data packet that the cellular radio access device needs to send to the UE, and indication information used to indicate that the data packet is a cellular network data packet, where the indication information is used by the UE to process the data packet by using a cellular network protocol according to the indication information.

With reference to the fourteenth aspect, in a possible implementation manner, the indication information is address information of the cellular radio access device.

With reference to the fourteenth aspect and the foregoing possible implementation manner, in another possible implementation manner, the receiving module is further configured to: before the sending module sends the data frame to the UE by using the non-cellular radio access device, receive identification information of the non-cellular radio access device that is sent by the cellular radio access device, where the identification information is used by the AC to determine the non-cellular radio access device.

With reference to the fourteenth aspect and the foregoing possible implementation manners, in another possible implementation manner, the data packet is included in an 802.3 frame; and the AC further includes: an addition module, configured to: before the sending module sends the data frame to the UE by using the non-cellular radio access device, add the data packet included in the 802.3 frame to the data frame.

With reference to the fourteenth aspect and the foregoing possible implementation manners, in another possible implementation manner, the identification information of the non-cellular radio access device is a MAC address of the non-cellular radio access device, a BSSID of the non-cellular radio access device, or a SSID of the non-cellular radio access device.

With reference to the fourteenth aspect and the foregoing possible implementation manners, in another possible implementation manner, when there is at least one radio bearer on the UE, the data frame further includes bearer information used to indicate a radio bearer that is in the at least one radio bearer and that carries the data packet.

With reference to the fourteenth aspect and the foregoing possible implementation manners, in another possible implementation manner, the sending module is further configured to send a mapping relationship between the bearer information and the radio bearer that is in the at least one radio bearer and that carries the data packet, to the UE by using the cellular radio access device.

With reference to the fourteenth aspect and the foregoing possible implementation manners, in another possible implementation manner, the cellular network data packet includes a PDCP data packet or a RLC data packet.

A fifteenth aspect of the present embodiments provides a UE, where the UE is applied to a wireless communications system that includes a cellular radio access device and a non-cellular radio access device, and the UE includes: a sending module, configured to: when it is determined to offload data of the UE in a cellular network to a non-cellular network, send a data frame to the cellular radio access device by using the non-cellular radio access device, where the data frame includes a data packet that the UE needs to send to the cellular radio access device, and indication information used to indicate that the data packet is a cellular network data packet, where the indication information is used by the cellular radio access device to process the data packet by using a cellular network protocol.

With reference to the fifteenth aspect, in a possible implementation manner, the indication information is address information of the cellular radio access device.

With reference to the fifteenth aspect and the foregoing possible implementation manner, in another possible implementation manner, the UE further includes: a receiving module, configured to: before the sending module sends the data frame to the cellular radio access device by using the non-cellular radio access device, receive a mapping relationship between a MAC address of the cellular radio access device and function information of the MAC address, where the mapping relationship is sent by the cellular radio access device, and the function information includes offloading and converging; and a determining module, configured to: determine, according to the mapping relationship received by the receiving module, a MAC address whose function information is offloading and converging as the indication information.

With reference to the fifteenth aspect and the foregoing possible implementation manners, in another possible implementation manner, when there is at least one radio bearer on the UE, the data frame further includes bearer information used to indicate a radio bearer that is in the at least one radio bearer and that carries the data packet.

With reference to the fifteenth aspect and the foregoing possible implementation manners, in another possible implementation manner, the cellular network data packet includes a PDCP data packet or RLC data packet.

A sixteenth aspect of the present embodiments provides a UE, where the UE is applied to a wireless communications system that includes a cellular radio access device and a non-cellular radio access device, and the UE includes: a receiving module, configured to: receive a data frame sent by the cellular radio access device by using the non-cellular radio access device, where the data frame is sent after the cellular radio access device determines to offload data of the UE in a cellular network to a non-cellular network, and the data frame includes a data packet that the cellular radio access device needs to send to the UE, and indication information used to indicate that the data packet is a cellular network data packet; a Wireless Fidelity (WiFi) module, configured to determine that the data packet is the cellular network data packet according to the indication information and send the data packet to a Long Term Evolution (LTE) module; and the LTE module, configured to receive the data packet sent by the WiFi module and process the data packet by using a cellular network protocol.

With reference to the sixteenth aspect, in a possible implementation manner, the indication information is address information of the cellular radio access device.

With reference to the sixteenth aspect and the foregoing possible implementation manner, in another possible implementation manner, when there is at least one radio bearer on the UE, the data frame further includes bearer information used to indicate a radio bearer that is in the at least one radio bearer and that carries the data packet; the receiving module is further configured to: before the LTE module processes the data packet by using the cellular network protocol, receive a mapping relationship between the bearer information and the radio bearer that is in the at least one radio bearer and that carries the data packet, where the mapping relationship is sent by the cellular radio access device by using an air interface message; and the WiFi module is specifically configured to transmit the data packet to the LTE module corresponding to the radio bearer according to the mapping relationship and the bearer information that are received by the receiving module.

With reference to the sixteenth aspect and the foregoing possible implementation manners, in another possible implementation manner, the cellular network data packet includes a PDCP data packet or a RLC data packet.

A seventeenth aspect of the present embodiments provides a UE, where the UE is applied to a wireless communications system that includes a cellular radio access device and a non-cellular radio access device, and the UE includes: a receiving module, configured to receive a data frame sent by an AC by using the non-cellular radio access device, where the data frame is sent after the AC receives a data packet that is sent by the cellular radio access device and that the cellular radio access device needs to send to the UE, and the data frame includes the data packet that the cellular radio access device needs to send to the UE, and indication information used to indicate that the data packet is a cellular network data packet; a WiFi module, configured to determine that the data packet is the cellular network data packet according to the indication information and send the data packet to an LTE module; and the LTE module, configured to receive the data packet sent by the WiFi module and process the data packet by using a cellular network protocol.

With reference to the seventeenth aspect, in a possible implementation manner, the indication information is address information of the cellular radio access device.

With reference to the seventeenth aspect and the foregoing possible implementation manner, in another possible implementation manner, when there is at least one radio bearer on the UE, the data frame further includes bearer information used to indicate a radio bearer that is in the at least one radio bearer and that carries the data packet; the receiving module is further configured to: before the LTE module processes the data packet by using the cellular network protocol, receive a mapping relationship between the bearer information and the radio bearer that is in the at least one radio bearer and that carries the data packet, where the mapping relationship is sent by the AC by using the cellular radio access device; and the WiFi module is specifically configured to transmit the data packet to the LTE module corresponding to the radio bearer according to the mapping relationship and the bearer information that are received by the receiving module.

With reference to the seventeenth aspect and the foregoing possible implementation manners, in another possible implementation manner, the cellular network data packet includes a PDCP data packet or a RLC data packet.

An eighteenth aspect of the present embodiments provides a cellular radio access device, where the cellular radio access device is applied to a wireless communications system, where the wireless communications system further includes a non-cellular radio access device, and the cellular radio access device includes: a receiving module, configured to receive a data frame sent by a UE by using the non-cellular radio access device, where the data frame is sent when the UE determines to offload data of the UE in a cellular network to a non-cellular network, and the data frame includes a data packet that the UE needs to send to the cellular radio access device, and indication information used to indicate that the data packet is a cellular network data packet; and an LTE module, configured to process the data packet by using a cellular network protocol.

With reference to the eighteenth aspect, in a possible implementation manner, the indication information is address information of the cellular radio access device.

With reference to the eighteenth aspect and the foregoing possible implementation manner, in another possible implementation manner, the cellular radio access device further includes: a sending module, configured to: before the receiving module receives the data frame sent by the UE by using the non-cellular radio access device, send a mapping relationship between a MAC address of the cellular radio access device and function information of the MAC address to the UE, where the function information includes offloading and converging.

With reference to the eighteenth aspect and the foregoing possible implementation manners, in another possible implementation manner, the data frame is sent after the non-cellular radio access device determines that the data packet is the cellular network data packet; or the cellular radio access device further includes a WiFi module, configured to: before the LTE module processes the data packet by using the cellular network protocol, determine that the data packet is the cellular network data packet according to the indication information, and send the data packet to the LTE module.

With reference to the eighteenth aspect and the foregoing possible implementation manners, in another possible implementation manner, when there is at least one radio bearer on the UE, the data frame further includes bearer information used to indicate a radio bearer that is in the at least one radio bearer and that carries the data packet; the WiFi module is specifically configured to send the data packet to the LTE module corresponding to the radio bearer according to the bearer information and a mapping relationship between the bearer information and the radio bearer that is in the at least one radio bearer and that carries the data packet.

With reference to the eighteenth aspect and the foregoing possible implementation manners, in another possible implementation manner, the cellular network data packet includes a PDCP data packet or a RLC data packet.

A nineteenth aspect of the present embodiments provides an AC, where the access controller AC is applied to a wireless communications system that includes a cellular radio access device and a non-cellular radio access device, and the AC includes: a receiving module, configured to receive a data frame sent by a UE by using the non-cellular radio access device, where the data frame is sent when the UE determines to offload data of the UE in a cellular network to a non-cellular network, the data frame includes a data packet that the UE needs to send to the cellular radio access device, and indication information used to indicate that the data packet is a cellular network data packet, and the indication information is used by the cellular radio access device to process the data packet by using a cellular network protocol; and a sending module, configured to: after it is determined that the data packet is the cellular network data packet according to the indication information, send the data frame to the cellular radio access device; or send the data frame to the cellular radio access device, where the data frame is sent to the AC by the non-cellular radio access device after determining that the data packet is the cellular network data packet according to the indication information.

With reference to the nineteenth aspect, in a possible implementation manner, the indication information is address information of the cellular radio access device.

With reference to the nineteenth aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the nineteenth aspect and the foregoing possible implementation manners, in another possible implementation manner, the cellular network data packet includes a PDCP data packet or a RLC data packet.

A twentieth aspect of the present embodiments provides a UE, where the UE is applied to a wireless communications system that includes a cellular radio access device and a non-cellular radio access device, and the UE includes: a receiving module, configured to receive a data frame sent by the cellular radio access device by using the non-cellular radio access device, where the data frame includes a data packet that the cellular radio access device needs to send to the UE, and the data packet includes a source IP address and a destination IP address; a WiFi module, configured to determine that the source IP address is an address used to bear a cellular service, or determine that the destination IP address is assigned by a core network gateway, and send the data packet to an LTE module; and the LTE module, configured to receive the data packet sent by the WiFi module and process the data packet by using a cellular network protocol.

A twenty-first aspect of the present embodiments provides a cellular radio access device, where the cellular radio access device is applied to a wireless communications system, where the wireless communications system further includes a non-cellular radio access device, and the cellular radio access device includes: a receiving module, configured to receive a data frame sent by a UE by using the non-cellular radio access device, where the data frame includes a data packet that the UE needs to send to the cellular radio access device, and the data packet includes a source IP address and a destination IP address; a WiFi module, configured to determine that the destination IP address is an address used to bear a cellular service, or determine that the source IP address is assigned by a core network gateway, and send the data packet to an LTE module; and the LTE module, configured to receive the data packet sent by the WiFi module and process the data packet by using a cellular network protocol.

A twenty-second aspect of the present embodiments provides a non-cellular radio access device, where the non-cellular radio access device is applied to a wireless communications system, where the wireless communications system further includes a cellular radio access device, and the non-cellular radio access device includes: a receiving module, configured to receive a data frame sent by the cellular radio access device, where the data frame includes a data packet that the cellular radio access device needs to send to a UE, and the data packet includes a source IP address and a destination IP address; a determining module, configured to determine that the source IP address is an address used to bear a cellular service, or determine that the destination IP address is assigned by a core network gateway; and a sending module, configured to send the data frame to the UE, so that the UE processes the data packet by using a cellular network protocol.

A twenty-third aspect of the present embodiments provides a non-cellular radio access device, where the non-cellular radio access device is applied to a wireless communications system, where the wireless communications system further includes a cellular radio access device, and the non-cellular radio access device includes: a receiving module, configured to receive a data frame sent by a UE, where the data frame includes a data packet that the UE needs to send to the cellular radio access device, and the data packet includes a source IP address and a destination IP address; a determining module, configured to determine that the destination IP address is an address used to bear a cellular service, or determine that the source IP address is assigned by a core network gateway; and a sending module, configured to send the data frame to the cellular radio access device, so that the cellular radio access device processes the data packet by using a cellular network protocol.

A twenty-fourth aspect of the present embodiments provides a non-cellular radio access device, where non-cellular radio access device is applied to a wireless communications system, where the wireless communications system further includes a cellular radio access device, and the non-cellular radio access device includes: a receiving module, configured to receive a data frame sent by the cellular radio access device or an AC, where the data frame includes a data packet that the cellular radio access device needs to send to a UE; and a sending module, configured to add, to the data frame, indication information used to indicate that the data packet is a cellular network data packet, and send the data frame to the UE, where the indication information is used by the UE to process the data packet by using a cellular network protocol according to the indication information.

With reference to the twenty-fourth aspect, in a possible implementation manner, the receiving module is further configured to: before the sending module adds, to the data frame, the indication information used to indicate that the data packet is a cellular network data packet, and sends the data frame to the UE, receive the indication information sent by the cellular radio access device.

A twenty-fifth aspect of the present embodiments provides a cellular radio access device, where the cellular radio access device is applied to a wireless communications system, where the wireless communications system further includes a non-cellular radio access device, and the cellular radio access device includes: a processor, configured to determine to offload data, in a cellular network, of a UE served by the cellular radio access device to a non-cellular network; and a transmitter, configured to send, by using the non-cellular radio access device, a data frame to the UE served by the cellular radio access device, where the data frame includes a data packet that the cellular radio access device needs to send to the UE, and indication information used to indicate that the data packet is a cellular network data packet, where the indication information is used by the UE to process the data packet by using a cellular network protocol according to the indication information.

With reference to the twenty-fifth aspect, in a possible implementation manner, the indication information is address information of the cellular radio access device.

With reference to the twenty-fifth aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the twenty-fifth aspect and the foregoing possible implementation manners, in another possible implementation manner, the transmitter is further configured to send a mapping relationship between the bearer information and the radio bearer that is in the at least one radio bearer and that carries the data packet, to the UE by using an air interface message.

With reference to the twenty-fifth aspect and the foregoing possible implementation manners, in another possible implementation manner, the cellular network data packet includes a PDCP data packet or a RLC data packet.

A twenty-sixth aspect of the present embodiments provides an AC, where the access controller AC is applied to a wireless communications system that includes a cellular radio access device and a non-cellular radio access device, and the AC includes: a receiver, configured to receive a data packet that is sent by the cellular radio access device and that the cellular radio access device needs to send to a UE; and a transmitter, configured to send a data frame to the UE by using the non-cellular radio access device, where the data frame includes the data packet that the cellular radio access device needs to send to the UE, and indication information used to indicate that the data packet is a cellular network data packet, where the indication information is used by the UE to process the data packet by using a cellular network protocol according to the indication information.

With reference to the twenty-sixth aspect, in a possible implementation manner, the indication information is address information of the cellular radio access device.

With reference to the twenty-sixth aspect and the foregoing possible implementation manner, in another possible implementation manner, the receiver is further configured to: before the transmitter sends the data frame to the UE by using the non-cellular radio access device, receive identification information of the non-cellular radio access device that is sent by the cellular radio access device, where the identification information is used by the AC to determine the non-cellular radio access device.

With reference to the twenty-sixth aspect and the foregoing possible implementation manners, in another possible implementation manner, the data packet is included in an 802.3 frame; and the AC further includes: a processor, configured to: before the transmitter sends the data frame to the UE by using the non-cellular radio access device, add the data packet included in the 802.3 frame to the data frame.

With reference to the twenty-sixth aspect and the foregoing possible implementation manners, in another possible implementation manner, the identification information of the non-cellular radio access device is a MAC address of the non-cellular radio access device, a BSSID of the non-cellular radio access device, or a SSID of the non-cellular radio access device.

With reference to the twenty-sixth aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the twenty-sixth aspect and the foregoing possible implementation manners, in another possible implementation manner, the transmitter is further configured to send a mapping relationship between the bearer information and the radio bearer that is in the at least one radio bearer and that carries the data packet, to the UE by using the cellular radio access device.

With reference to the twenty-sixth aspect and the foregoing possible implementation manners, in another possible implementation manner, the cellular network data packet includes a PDCP data packet or a RLC data packet.

A twenty-seventh aspect of the present embodiments provides a UE, where the UE is applied to a wireless communications system that includes a cellular radio access device and a non-cellular radio access device, and the UE includes: a transmitter, configured to: when it is determined to offload data of the UE in a cellular network to a non-cellular network, send, by the UE, a data frame to the cellular radio access device by using the non-cellular radio access device, where the data frame includes a data packet that the UE needs to send to the cellular radio access device, and indication information used to indicate that the data packet is a cellular network data packet, where the indication information is used by the cellular radio access device to process the data packet by using a cellular network protocol.

With reference to the twenty-seventh aspect, in a possible implementation manner, the indication information is address information of the cellular radio access device.

With reference to the twenty-seventh aspect and the foregoing possible implementation manner, in another possible implementation manner, the UE further includes: a receiver, configured to: before the transmitter sends the data frame to the cellular radio access device by using the non-cellular radio access device, receive a mapping relationship between a MAC address of the cellular radio access device and function information of the MAC address, where the mapping relationship is sent by the cellular radio access device, and the function information includes offloading and converging; and a processor, configured to: determine, according to the mapping relationship received by the receiver, a MAC address whose function information is offloading and converging as the indication information.

With reference to the twenty-seventh aspect and the foregoing possible implementation manners, in another possible implementation manner, when there is at least one radio bearer on the UE, the data frame further includes bearer information used to indicate a radio bearer that is in the at least one radio bearer and that carries the data packet.

With reference to the twenty-seventh aspect and the foregoing possible implementation manners, in another possible implementation manner, the cellular network data packet includes a PDCP data packet or a RLC data packet.

A twenty-eighth aspect of the present embodiments provides a UE, where the UE is applied to a wireless communications system that includes a cellular radio access device and a non-cellular radio access device, and the UE includes: a receiver, configured to: receive a data frame sent by the cellular radio access device by using the non-cellular radio access device, where the data frame is sent after the cellular radio access device determines to offload data of the UE in a cellular network to a non-cellular network, and the data frame includes a data packet that the cellular radio access device needs to send to the UE, and indication information used to indicate that the data packet is a cellular network data packet; and a processor, configured to determine that the data packet is the cellular network data packet according to the indication information, and process the data packet by using a cellular network protocol.

With reference to the twenty-eighth aspect, in a possible implementation manner, the indication information is address information of the cellular radio access device.

With reference to the twenty-eighth aspect and the foregoing possible implementation manner, in another possible implementation manner, when there is at least one radio bearer on the UE, the data frame further includes bearer information used to indicate a radio bearer that is in the at least one radio bearer and that carries the data packet; the receiver is further configured to: before the processor processes the data packet by using the cellular network protocol, receive a mapping relationship between the bearer information and the radio bearer that is in the at least one radio bearer and that carries the data packet, where the mapping relationship is sent by the cellular radio access device by using an air interface message; and the processor is specifically configured to process the data packet by using the cellular network protocol according to the mapping relationship and the bearer information.

With reference to the twenty-eighth aspect and the foregoing possible implementation manners, in another possible implementation manner, the cellular network data packet includes a PDCP data packet or a RLC data packet.

A twenty-ninth aspect of the present embodiments provides a UE, where the UE is applied to a wireless communications system that includes a cellular radio access device and a non-cellular radio access device, and the UE includes: a receiver, configured to receive a data frame sent by an AC by using the non-cellular radio access device, where the data frame is sent after the AC receives a data packet that is sent by the cellular radio access device and that the cellular radio access device needs to send to the UE, and the data frame includes the data packet that the cellular radio access device needs to send to the UE, and indication information used to indicate that the data packet is a cellular network data packet; and a processor, configured to determine that the data packet is the cellular network data packet according to the indication information, and process the data packet by using a cellular network protocol.

With reference to the twenty-ninth aspect, in a possible implementation manner, the indication information is address information of the cellular radio access device.

With reference to the twenty-ninth aspect and the foregoing possible implementation manner, in another possible implementation manner, when there is at least one radio bearer on the UE, the data frame further includes bearer information used to indicate a radio bearer that is in the at least one radio bearer and that carries the data packet; the receiver is further configured to: before the processor processes the data packet by using the cellular network protocol, receive a mapping relationship between the bearer information and the radio bearer that is in the at least one radio bearer and that carries the data packet, where the mapping relationship is sent by the AC by using the cellular radio access device; and the processor is specifically configured to process the data packet by using the cellular network protocol according to the mapping relationship and the bearer information that are received by the receiver.

With reference to the twenty-ninth aspect and the foregoing possible implementation manners, in another possible implementation manner, the cellular network data packet includes a PDCP data packet or a RLC data packet.

A thirtieth aspect of the present embodiments provides a cellular radio access device, where the cellular radio access device is applied to a wireless communications system, where the wireless communications system further includes a non-cellular radio access device, and the cellular radio access device includes: a receiver, configured to receive a data frame sent by a UE by using the non-cellular radio access device, where the data frame is sent when the UE determines to offload data of the UE in a cellular network to a non-cellular network, and the data frame includes a data packet that the UE needs to send to the cellular radio access device, and indication information used to indicate that the data packet is a cellular network data packet; and a processor, configured to process the data packet by using a cellular network protocol.

With reference to the thirtieth aspect, in a possible implementation manner, the indication information is address information of the cellular radio access device.

With reference to the thirtieth aspect and the foregoing possible implementation manner, in another possible implementation manner, the cellular radio access device further includes: a transmitter, configured to: before the receiver receives the data frame sent by the UE by using the non-cellular radio access device, send a mapping relationship between a MAC address of the cellular radio access device and function information of the MAC address to the UE, where the function information includes offloading and converging.

With reference to the thirtieth aspect and the foregoing possible implementation manners, in another possible implementation manner, the data frame is sent after the non-cellular radio access device determines that the data packet is the cellular network data packet; or the processor is further configured to: before processing the data packet by using the cellular network protocol, determine that the data packet is the cellular network data packet according to the indication information.

With reference to the thirtieth aspect and the foregoing possible implementation manners, in another possible implementation manner, when there is at least one radio bearer on the UE, the data frame further includes bearer information used to indicate a radio bearer that is in the at least one radio bearer and that carries the data packet; and the processor is specifically configured to process the data packet by using the cellular network protocol according to the bearer information and a mapping relationship between the bearer information and the radio bearer that is in the at least one radio bearer and that carries the data packet.

With reference to the thirtieth aspect and the foregoing possible implementation manners, in another possible implementation manner, the cellular network data packet includes a PDCP data packet or a RLC data packet.

A thirty-first aspect of the present embodiments provides an AC, where the access controller AC is applied to a wireless communications system that includes a cellular radio access device and a non-cellular radio access device, and the AC includes: a receiver, configured to receive a data frame sent by a UE by using the non-cellular radio access device, where the data frame is sent when the UE determines to offload data of the UE in a cellular network to a non-cellular network, the data frame includes a data packet that the UE needs to send to the cellular radio access device, and indication information used to indicate that the data packet is a cellular network data packet, and the indication information is used by the cellular radio access device to process the data packet by using a cellular network protocol; and a transmitter, configured to: after it is determined that the data packet is the cellular network data packet according to the indication information, send the data frame to the cellular radio access device; or send the data frame to the cellular radio access device, where the data frame is sent to the AC by the non-cellular radio access device after determining that the data packet is the cellular network data packet according to the indication information.

With reference to the thirty-first aspect, in a possible implementation manner, the indication information is address information of the cellular radio access device.

With reference to the thirty-first aspect and the foregoing possible implementation manner, in another possible implementation manner, when there is at least one radio bearer on the UE, the data frame further includes bearer information used to indicate a radio bearer that is in the at least one radio bearer and that carries the data packet.

With reference to the thirty-first aspect and the foregoing possible implementation manners, in another possible implementation manner, the cellular network data packet includes a PDCP data packet or a RLC data packet.

A thirty-second aspect of the present embodiments provides a UE, where the UE is applied to a wireless communications system that includes a cellular radio access device and a non-cellular radio access device, and the UE includes: a receiver, configured to receive a data frame sent by the cellular radio access device by using the non-cellular radio access device, where the data frame includes a data packet that the cellular radio access device needs to send to the UE, and the data packet includes a source IP address and a destination IP address; and a processor, configured to determine that the source IP address is an address used to bear a cellular service, or determine that the destination IP address is assigned by a core network gateway, and process the data packet by using a cellular network protocol.

A thirty-third aspect of the present embodiments provides a cellular radio access device, where the cellular radio access device is applied to a wireless communications system, where the wireless communications system further includes a non-cellular radio access device, and the cellular radio access device includes: a receiver, configured to receive a data frame sent by a UE by using the non-cellular radio access device, where the data frame includes a data packet that the UE needs to send to the cellular radio access device, and the data packet includes a source IP address and a destination IP address; and a processor, configured to determine that the destination IP address is an address used to bear a cellular service, or determine that the source IP address is assigned by a core network gateway, and process the data packet by using a cellular network protocol.

A thirty-fourth aspect of the present embodiments provides a non-cellular radio access device, where the non-cellular radio access device is applied to a wireless communications system, where the wireless communications system further includes a cellular radio access device, and the non-cellular radio access device includes: a receiver, configured to receive a data frame sent by the cellular radio access device, where the data frame includes a data packet that the cellular radio access device needs to send to a UE, and the data packet includes a source IP address and a destination IP address; a processor, configured to determine that the source IP address is an address used to bear a cellular service, or determine that the destination IP address is assigned by a core network gateway; and a transmitter, configured to send the data frame to the UE, so that the UE processes the data packet by using a cellular network protocol.

A thirty-fifth aspect of the present embodiments provides a non-cellular radio access device, where the non-cellular radio access device is applied to a wireless communications system, where the wireless communications system further includes a cellular radio access device, and the non-cellular radio access device includes: a receiver, configured to receive a data frame sent by a UE, where the data frame includes a data packet that the UE needs to send to the cellular radio access device, and the data packet includes a source IP address and a destination IP address; a processor, configured to determine that the destination IP address is an address used to bear a cellular service, or determine that the source IP address is assigned by a core network gateway; and a transmitter, configured to send the data frame to the cellular radio access device, so that the cellular radio access device processes the data packet by using a cellular network protocol.

A thirty-sixth aspect of the present embodiments provides a non-cellular radio access device, where the non-cellular radio access device is applied to a wireless communications system, where the wireless communications system further includes a cellular radio access device, and the non-cellular radio access device includes: a receiver, configured to receive a data frame sent by the cellular radio access device or an AC, where the data frame includes a data packet that the cellular radio access device needs to send to a UE; and a transmitter, configured to add, to the data frame, indication information used to indicate that the data packet is a cellular network data packet, and send the data frame to the UE, where the indication information is used by the UE to process the data packet by using a cellular network protocol according to the indication information.

With reference to the thirty-sixth aspect, in a possible implementation manner, the receiver is further configured to: before the transmitter adds, to the data frame, the indication information used to indicate that the data packet is a cellular network data packet, and sends the data frame to the UE, receive the indication information sent by the cellular radio access device.

According to the downlink offloading and converging method, the uplink offloading and converging method, and the device provided in the present embodiments, after determining to offload data, in a cellular network, of UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

Figure 1:
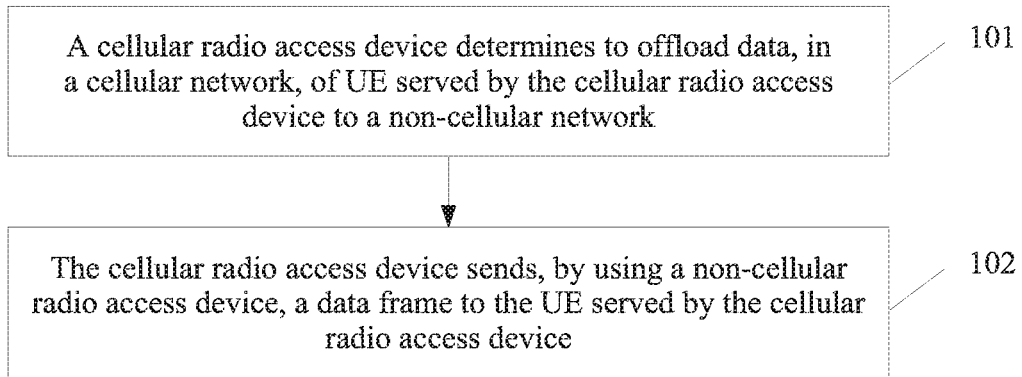
FIG. 1 is a flowchart of a downlink offloading and converging method according to an embodiment.

The following clearly and describes the technical solutions in the embodiments with reference to the accompanying drawings in the embodiments. Apparently, the described embodiments are merely some but not all of the embodiments. All other embodiments obtained by a person of ordinary skill in the art based on the embodiments without creative efforts shall fall within the protection scope.

A cellular network described in this specification may be various communications systems, for example, the current second generation mobile communication technology (2G) and third generation mobile communication technology (3G) communications systems, and a next-generation communications system, such as: a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, an LTE system, and other communications systems.

Various aspects are described in this specification with reference to a terminal and/or a base station and/or a base station node.

User equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, or user equipment.

The base station (for example, an access point) may refer to a device in communication with a wireless terminal via one or more sectors at an air interface in an access network. The base station may be configured to mutually convert a received over-the-air frame and an Internet protocol (IP) packet and serve as a router between the wireless terminal and a rest portion of the access network, where the rest portion of the access network may include an IP network. The base station may coordinate attribute management of the air interface. For example, the base station may be a base station (BTS) in GSM or CDMA, may be a base station (NodeB) in WCDMA, or may be an evolved NodeB (eNB, or e-NodeB) in LTE, which is not limited in the this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Mobile operators relieve a burden on a current cellular network by means of inter-network cooperation between the cellular network and a non-cellular network. It is known to all that in a process of implementing inter-network cooperation between the cellular network and the non-cellular network, service offloading needs to be implemented first. A key point considered during service offloading is when to offload all or some services of a user from one radio access technology (RAT) to another RAT, so as to relieve a network burden on the current RAT and provide better user experience. However, after the services of the user are switched from one RAT to another RAT, the services of the user cannot be converged to the RAT-before-offloading for processing. Therefore, user service continuity cannot be ensured, and service quality is deteriorated, thereby affecting user experience.

Therefore, it can be learned that in the process of implementing inter-network cooperation between the cellular network and the non-cellular network, to provide better user experience, not only service offloading needs to be implemented, but also services need to be converged on the network-before-offloading again after service offloading is implemented, so as to continue to serve the user, thereby ensuring user service continuity and further improving user experience.

Inter-network cooperation between the cellular network and the non-cellular network can be implemented in technical solutions provided herein in embodiments. Specifically, in a process in which the non-cellular network bears some or all mobile data traffic of the cellular network, user service continuity is ensured to improve service quality and user experience. For convenience of understanding of a person skilled in the art, for specific implementation processes of the technical solutions provided in the present embodiments, refer to the following embodiments.

An embodiment provides a downlink offloading and converging method, where the method is applied to a wireless communications system that includes a cellular radio access device and a non-cellular radio access device. As shown in FIG. 1, the method may include the following steps.

101. The cellular radio access device determines to offload data, in a cellular network, of a user equipment (UE) served by the cellular radio access device to a non-cellular network.

The cellular radio access device may determine according to a pre-configured policy whether it is necessary to offload the data, in the cellular network, of the UE served by the cellular radio access device to the non-cellular network.

For example, the cellular radio access device may determine whether the cellular network is in a service overloaded state according to the preset policy, so as to determine whether it is necessary to offload the data, in the cellular network, of the UE served by the cellular radio access device to the non-cellular network. For example, the cellular radio access device may determine whether the cellular network is in the service overloaded state according to a relationship between a key performance indicator (KPI) and/or measurement information and a corresponding preset threshold. In a possible implementation manner, when the KPI and/or the measurement information are/is greater than the corresponding preset threshold, it may be considered that the cellular network is in the service overloaded state. In this case, the cellular radio access device may determine that it is necessary to offload the data, in the cellular network, of the UE served by the cellular radio access device to the non-cellular network.

The KPI and/or the measurement information may be obtained by the cellular radio access device by means of measurement, or may be obtained by the UE or an access point (AP) and sent to the cellular radio access device. This embodiment does not impose a specific limitation on a specific obtaining manner of the KPI and/or the measurement information. The KPI may be a performance indicator for an association success rate, a re-association success rate, a packet loss rate, or the like of a service. The measurement information may be a performance indicator such as an average transmission delay, WLAN downlink signal strength, interference, a WLAN rate limit, allowed WLAN access duration, or a UE motion status.

In addition, after determining that it is necessary to offload the data, in the cellular network, of the UE served by the cellular radio access device to the non-cellular network, the cellular radio access device may select, according to a load status and an air interface channel condition of the cellular radio access device, a proper non-cellular radio access device with coverage of the cellular radio access device to perform offloading. The load status may be a status such as a proportion of duration in which a channel is busy to a total channel time, a remaining backhaul capacity, a remaining Dynamic Host Configuration Protocol (DHCP) resource, or a remaining domain name server (DNS) resource.

102. The cellular radio access device sends, by using the non-cellular radio access device, a data frame to the UE served by the cellular radio access device.

The data frame includes a data packet that the cellular radio access device needs to send to the UE, and indication information used to indicate that the data packet is a cellular network data packet, where the indication information is used by the UE to process the data packet by using a cellular network protocol according to the indication information.

Specifically, after determining to offload the data, in the cellular network, of the UE served by the cellular radio access device to the non-cellular network, and selecting a proper non-cellular radio access device within coverage of the cellular radio access device, the cellular radio access device may send, by using the selected non-cellular radio access device, the data frame to the UE served by the cellular radio access device. After receiving the data frame, the UE may process the data packet in the data frame by using the cellular network protocol according to the indication information included in the data frame, so as to ensure service continuity.

According to the downlink offloading and converging method provided in this embodiment, after determining to offload data, in a cellular network, of UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 2:
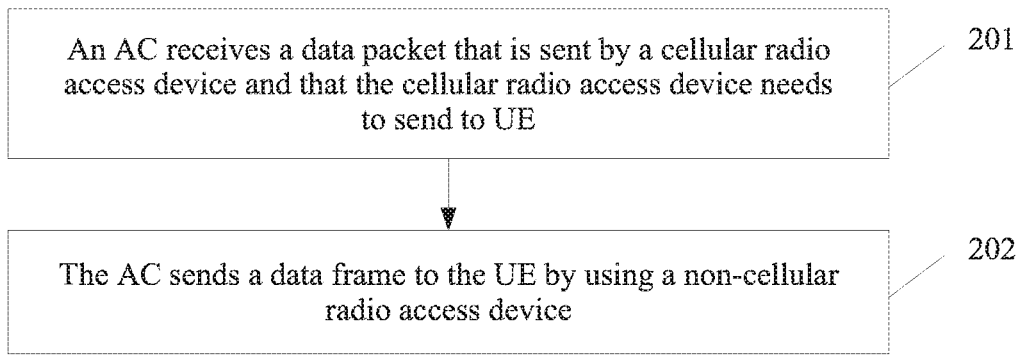
FIG. 2 is a flowchart of a downlink offloading and converging method according to another embodiment.

Another embodiment provides a downlink offloading and converging method, where the method is applied to a wireless communications system that includes a cellular radio access device and a non-cellular radio access device. As shown in FIG. 2, the method may include the following steps.

201. An access controller (AC) receives a data packet that is sent by the cellular radio access device and that the cellular radio access device needs to send to UE.

After determining that it is necessary to offload data, in a cellular network, of the UE served by the cellular radio access device to a non-cellular network, the cellular radio access device may send the AC the data packet that the cellular radio access device needs to send to the UE. In this case, the AC may receive the data packet that is sent by the cellular radio access device and that the cellular radio access device needs to send to the UE.

202. The AC sends a data frame to the UE by using the non-cellular radio access device.

The data frame includes the data packet that the cellular radio access device needs to send to the UE, and indication information used to indicate that the data packet is a cellular network data packet, where the indication information is used by the UE to process the data packet by using a cellular network protocol according to the indication information.

Specifically, after receiving the data packet that is sent by the cellular radio access device and needs to be sent to the UE, the AC may add, to the data frame, the data packet and the indication formation used to indicate that the data packet is a cellular network data packet, and send the data frame to the UE by using the non-cellular radio access device, so that the UE processes the data packet by using the cellular network protocol according to the indication information carried in the data frame, so as to ensure service continuity.

According to the downlink offloading and converging method provided in this embodiment, after receiving a data packet that is sent by a cellular radio access device and that the cellular radio access device needs to send to UE, an AC may add, to a data frame, the data packet and indication formation used to indicate that the data packet is a cellular network data packet, and send the data frame to the UE by using a non-cellular radio access device. Because the data frame includes the indication information used to indicate that the data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 3:
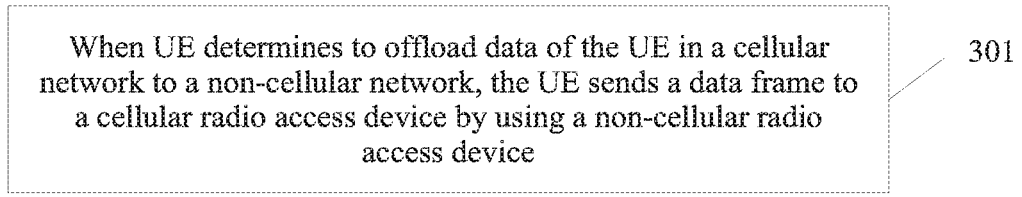
FIG. 3 is a flowchart of an uplink offloading and converging method according to another embodiment.

Another embodiment provides an uplink offloading and converging method, where the method is applied to a wireless communications system that includes a cellular radio access device and a non-cellular radio access device. As shown in FIG. 3, the method may include.

301. When UE determines to offload data of the UE in a cellular network to a non-cellular network, the UE sends a data frame to the cellular radio access device by using the non-cellular radio access device.

The data frame includes a data packet that the UE needs to send to the cellular radio access device, and indication information used to indicate that the data packet is a cellular network data packet, where the indication information is used by the cellular radio access device to process the data packet by using a cellular network protocol.

Specifically, the UE may determine, according to a pre-configured policy, whether it is necessary to offload the data of the UE in the cellular network to the non-cellular network, or the UE may determine, according to indication information that is sent by the cellular radio access device and used to indicate that it is necessary to offload the data of the UE in the cellular network to the non-cellular network, that it is necessary to offload the data of the UE in the cellular network to the non-cellular network. In this embodiment, for specific implementation in which the UE determines, according to the pre-configured policy, whether it is necessary to offload the data of the UE in the cellular network to the non-cellular network, reference may be made to the specific implementation in which the cellular radio access device determines whether it is necessary to offload the data, in the cellular network, of the UE served by the cellular radio access device to the non-cellular network in another embodiment. Details are not described herein in this embodiment.

When the UE determines that it is necessary to offload the data of the UE in the cellular network to the non-cellular network, the UE may add, to the data frame, the data packet that needs to be sent to the cellular radio access device and the indication information used to indicate that the data packet is a cellular network data packet, and send the data frame to the cellular radio access device by using the non-cellular radio access device. Because the data packet is a cellular network data packet, after receiving the data frame, the cellular radio access device may process the data packet by using the cellular network protocol, so as to ensure service continuity.

According to the uplink offloading and converging method provided in this embodiment, when determining to offload data of UE in a cellular network to a non-cellular network, the UE sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 4:
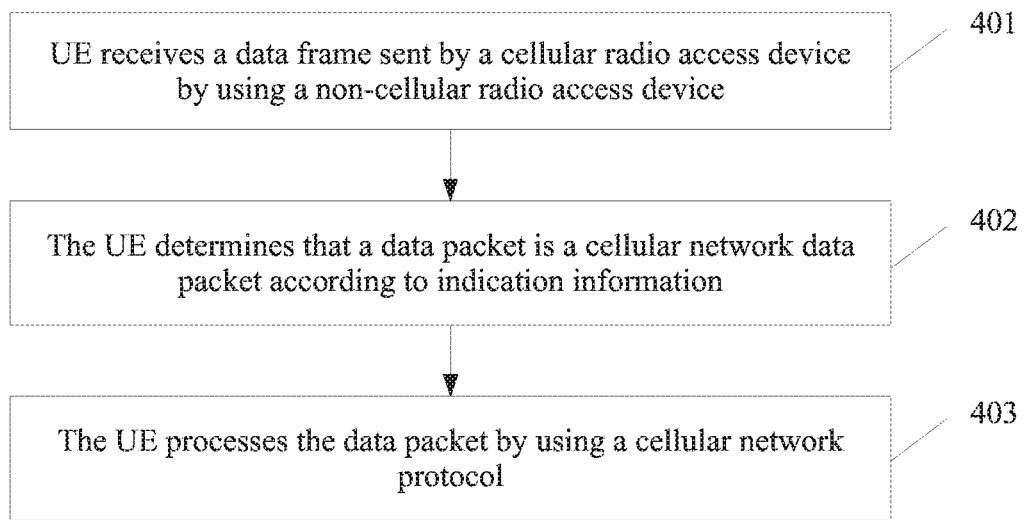
FIG. 4 is a flowchart of a downlink offloading and converging method according to another embodiment.

Another embodiment provides a downlink offloading and converging method, where the method is applied to a wireless communications system that includes a cellular radio access device and a non-cellular radio access device. As shown in FIG. 4, the method may include the following steps.

401. UE receives a data frame sent by the cellular radio access device by using the non-cellular radio access device.

The data frame is sent after the cellular radio access device determines to offload data of the UE in a cellular network to a non-cellular network. The data frame includes a data packet that the cellular radio access device needs to send to the UE, and indication information used to indicate that the data packet is a cellular network data packet.

402. The UE determines that a data packet is a cellular network data packet according to indication information.

403. The UE processes the data packet by using a cellular network protocol.

According to the downlink offloading and converging method provided in this embodiment, after determining to offload data, in a cellular network, of UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may determine that the data packet is a cellular network data packet according to the indication information, and process the data packet by using a cellular network protocol. The indication information is used to indicate that the data packet is a cellular network data packet, so that the UE processes the data packet by using the cellular network protocol. Therefore, service continuity is ensured, thereby improving service quality and user experience.

Figure 5:
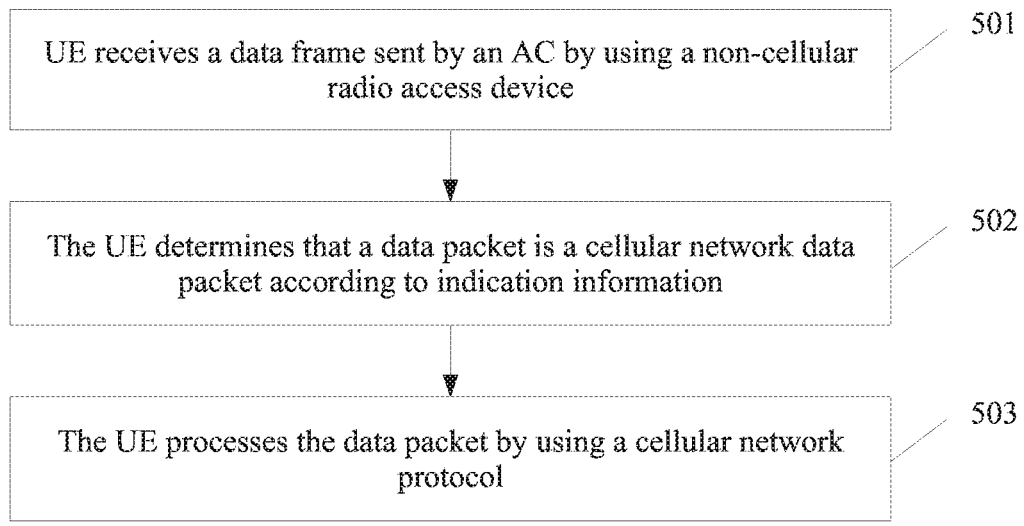
FIG. 5 is a flowchart of a downlink offloading and converging method according to another embodiment.

Another embodiment provides a downlink offloading and converging method, where the method is applied to a wireless communications system that includes a cellular radio access device and a non-cellular radio access device. As shown in FIG. 5, the method may include the following steps.

501. UE receives a data frame sent by an AC by using the non-cellular radio access device.

The data frame is sent after the AC receives a data packet that is sent by the cellular radio access device and that the cellular radio access device needs to send to the UE. The data frame includes the data packet that the cellular radio access device needs to send to the UE, and indication information used to indicate that the data packet is a cellular network data packet.

502. The UE determines that a data packet is a cellular network data packet according to indication information.

503. The UE processes the data packet by using a cellular network protocol.

According to the downlink offloading and converging method provided in this embodiment, after receiving a data packet that is sent by a cellular radio access device and that the cellular radio access device needs to send to UE, an AC may add, to a data frame, the data packet and indication formation used to indicate that the data packet is a cellular network data packet, and send the data frame to the UE by using a non-cellular radio access device. Because the data frame includes the indication information used to indicate that the data packet is a cellular network data packet, after receiving the data frame, the UE may determine that the data packet is a cellular network data packet according to the indication information, and process the data packet by using a cellular network protocol. The indication information is used to indicate that the data packet is a cellular network data packet, so that the UE processes the data packet by using the cellular network protocol. Therefore, service continuity is ensured, thereby improving service quality and user experience.

Figure 6:
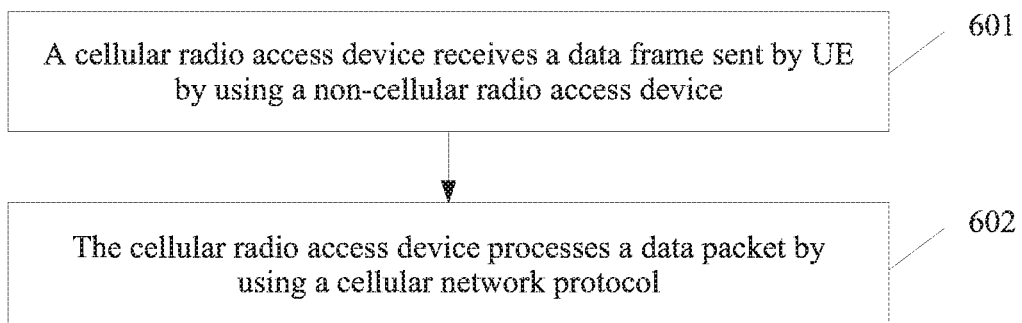
FIG. 6 is a flowchart of an uplink offloading and converging method according to another embodiment.

Another embodiment provides an uplink offloading and converging method, where the method is applied to a wireless communications system that includes a cellular radio access device and a non-cellular radio access device. As shown in FIG. 6, the method may include the following steps.

601. The cellular radio access device receives a data frame sent by UE by using the non-cellular radio access device.

The data frame is sent when the UE determines to offload data of the UE in a cellular network to a non-cellular network. The data frame includes a data packet that the UE needs to send to the cellular radio access device, and indication information used to indicate that the data packet is a cellular network data packet.

602. The cellular radio access device processes a data packet by using a cellular network protocol.

According to the uplink offloading and converging method provided in this embodiment, when determining to offload data of UE in a cellular network to a non-cellular network, the UE sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 7:
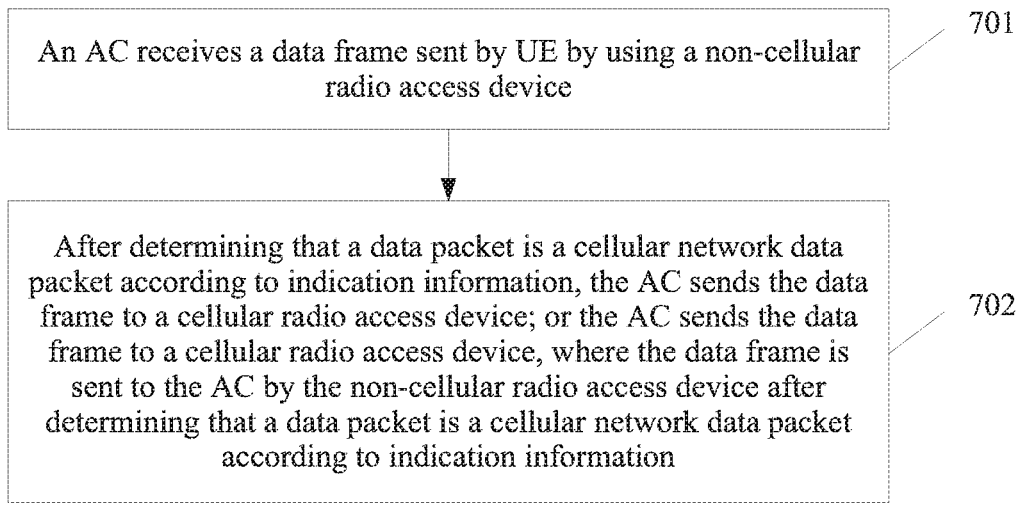
FIG. 7 is a flowchart of an uplink offloading and converging method according to another embodiment.

Another embodiment provides an uplink offloading and converging method, where the method is applied to a wireless communications system that includes a cellular radio access device and a non-cellular radio access device. As shown in FIG. 7, the method may include the following steps.

701. An AC receives a data frame sent by UE by using the non-cellular radio access device.

The data frame is sent when the UE determines to offload data of the UE in a cellular network to a non-cellular network. The data frame includes a data packet that the UE needs to send to the cellular radio access device, and indication information used to indicate that the data packet is a cellular network data packet, where the indication information is used by the cellular radio access device to process the data packet by using a cellular network protocol.

702. After determining that a data packet is a cellular network data packet according to indication information, the AC sends the data frame to the cellular radio access device; or the AC sends the data frame to the cellular radio access device, where the data frame is sent to the AC by the non-cellular radio access device after determining that a data packet is a cellular network data packet according to indication information.

In a possible implementation manner, after receiving the data frame sent by the UE by using the non-cellular radio access device, the AC may determine whether the data packet included in the data frame is a cellular network data packet according to the indication information included in the data frame, and after determining that the data packet is a cellular network data packet, send the data frame to the cellular radio access device, so that the cellular radio access device processes, by using the cellular network protocol, the data packet included in the data frame.

In another possible implementation manner, if the data frame that is received by the AC and sent by the UE by using the non-cellular radio access device is sent to the AC by the non-cellular radio access device after the non-cellular radio access device determines that the data packet included in the data frame is a cellular network data packet according to the indication information included in the data frame, in this case, the AC may directly send the data frame to the cellular radio access device, so that the cellular radio access device processes, by using the cellular network protocol, the data packet included in the data frame.

According to the uplink offloading and converging method provided in this embodiment, after receiving a data frame sent by UE by using a non-cellular radio access device, an AC may send the data frame to a cellular radio access device after determining that a data packet is a cellular network data packet according to indication information; or may directly send the data frame to a cellular radio access device. Because the data frame is sent to the cellular radio access device after the AC or the non-cellular radio access device determines that the data packet included in the data frame is a cellular network data packet, after receiving the data frame, the cellular radio access device needs to process the data packet by using a cellular network protocol. The indication information is used to indicate that the data packet is a cellular network data packet, so that the cellular radio access device can process the data packet by using the cellular network protocol. Therefore, service continuity is ensured, thereby improving service quality and user experience.

For convenience of understanding of a person skilled in the art, inter-network cooperation between a WLAN network (non-cellular network) and an LTE network (cellular network) is used as an example for description in the present embodiments. In addition, implementation processes of technical solutions provided in the present embodiments are described by using an example in which an eNB in the LTE network is used as the cellular radio access device in the present embodiments, and an AP in the WLAN network is used as the non-cellular radio access device in the present embodiments. Specifically, when the LTE network is overloaded, services on the LTE network may be offloaded by using the WLAN network. That is, data, in the LTE network, of UE served by the eNB is offloaded to the WLAN network. To ensure service continuity, after offloading, the services need to be converged again on the LTE network for processing. In addition, it is assumed that in the embodiments of the present embodiments, the UE can work on both the LTE network and the WLAN network. An architecture of the WLAN network in the present embodiments is an infrastructure architecture. That is, the UE can access the WLAN network only by using the access point (AP). For implementation processes in which the technical solutions provided in the present embodiments are applied to inter-network cooperation between the WLAN network and the LTE network, reference may be made to specific description of the following embodiments in the present embodiments.

Figure 8:
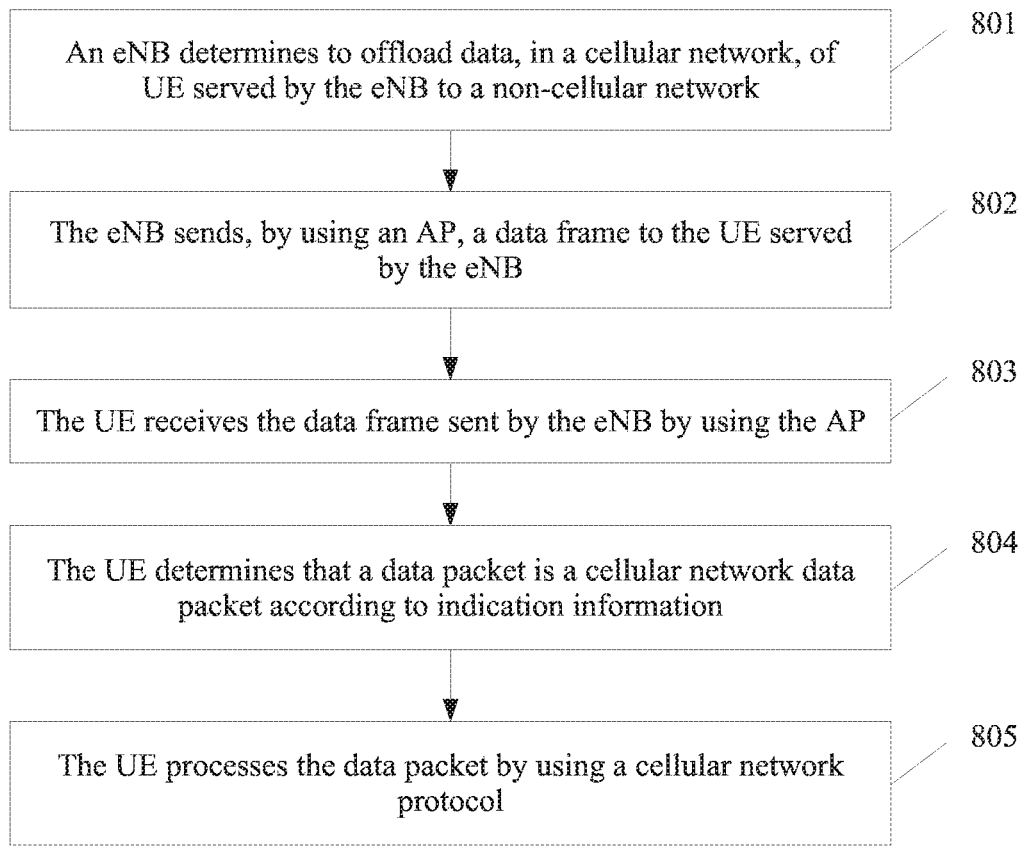
FIG. 8 is a flowchart of a downlink offloading and converging method according to another embodiment.

Another embodiment of the present embodiments provides a downlink offloading and converging method, where the method is applied to a wireless communications system that includes an eNB (cellular radio access device) and an AP (non-cellular radio access device). In addition, that indication information used to indicate that a data packet is a cellular network data packet is type code of the data packet is used as an example for specific description herein in this embodiment of the present embodiments. The data packet is a data packet that the eNB needs to send to UE. As shown in FIG. 8, the method may include the following steps.

801. The eNB determines to offload data, in a cellular network, of UE served by the eNB to a non-cellular network.

It should be noted that for a specific implementation process in which the eNB determines to offload the data, in the cellular network, of the UE served by the eNB to the non-cellular network in step 801 in this embodiment of the present embodiments, reference may be made to specific description of corresponding content in step 101 in another embodiment of the present embodiments. Details are not described herein in this embodiment of the present embodiments.

After determining to offload the data, in the cellular network, of the UE served by the eNB to the non-cellular network, and when needing to send a data packet to the UE served by the eNB, the eNB may generate a data frame that carries the data packet.

For example, the eNB may generate a data frame by assembling an 802.3 frame and a Control and Provisioning of Wireless Access Points (CAPWAP) header.

The 802.3 frame includes a data packet and indication information used to indicate that the data packet needing to be sent to the UE is a cellular network data packet, and the indication information may be type code of the data packet. The 802.3 frame further includes a Media Access Control (MAC) address of the UE and a MAC address of the eNB; the control and provisioning of wireless access points (CAPWAP) header includes a MAC address of the AP. The cellular network data packet may include a Packet Data Convergence Protocol (PDCP) data packet or a Radio Link Control (RLC) data packet. In addition, when the data packet is a PDCP data packet, the indication information is specifically type code corresponding to the PDCP data packet; when the data packet is an RLC data packet, the indication information is specifically type code corresponding to the RLC data packet. A correspondence between a data packet and type code may be pre-stored in the eNB. For example, the type code corresponding to the PDCP data packet is 08-XX, and the type code corresponding to the RLC data packet is 08-YY.

Specifically, the eNB may first perform processing such as encryption on the data packet; then generate, according to stipulations of the Institute of Electrical and Electronics Engineers (IEEE) 802.3 standard, the 802.3 frame that includes a destination address, a source address, the data packet, and the indication information; and generate the data frame by assembling the 802.3 frame and the CAPWAP header. A format of the generated data frame may be shown in FIG. 9. The destination address is the MAC address of the UE, and the source address is the MAC address of the eNB.

Figure 10:
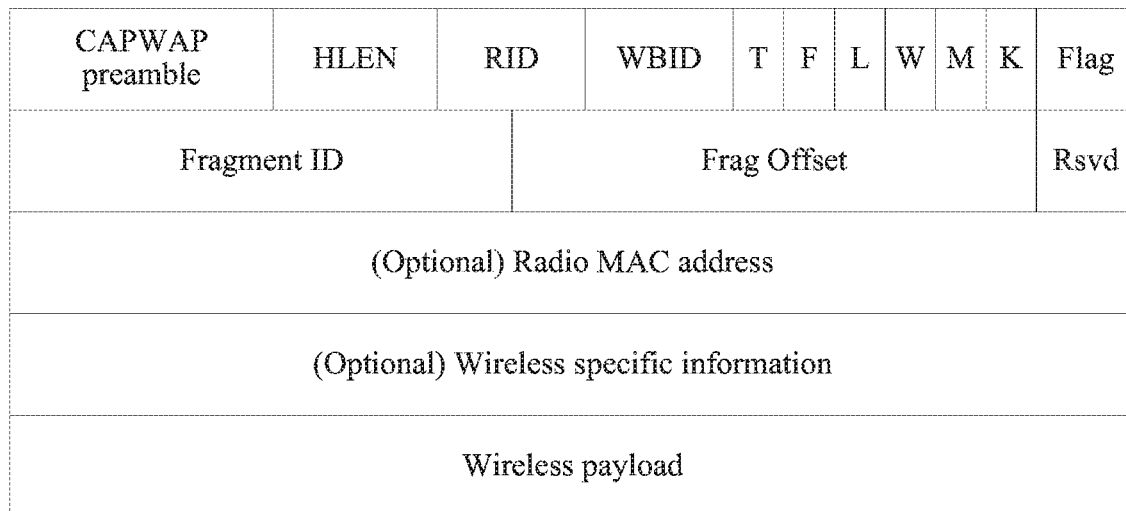
FIG. 10 is a schematic composition diagram of a format of a control and provisioning of wireless access points (CAPWAP) header according to another embodiment.

A specific format of the CAPWAP header may be shown in FIG. 10. The CAPWAP header includes the MAC address of the AP, and the MAC address of the AP may be filled in a radio MAC address field. In the CAPWAP header shown in FIG. 10, a CAPWAP preamble (CAPWAP Preamble) field is used to indicate a header type following this field; a header length (HLEN) field is used to indicate a length of the CAPWAP header; a radio identifier (RID) field is used to indicate a wireless device associated with the data frame; a wireless binding identifier (WBID) field is used to indicate a type of a radio packet associated with the wireless device; a type (T) field is used to indicate a format of a frame being transmitted in a payload; a fragment (F) field is used to indicate whether a fragment is a fragment of the radio packet; a last (L) field is used to indicate whether a fragment is the last fragment; a wireless (W) field is used to indicate whether the CAPWAP header includes a wireless specific information (wireless specific information) field; a radio MAC (M) field is used to indicate whether the CAPWAP header includes a radio MAC address field; a keep-alive (K) field is used to indicate that a packet is a data channel keep-alive packet; a flag field is a reserved bit for a future flag; a fragment ID is used to identify a fragment; a fragment offset is used to indicate affiliation of the fragment in the payload during reassembly; a reserved (Rsvd) field is reserved for future use; and a radio MAC address field is used to indicate a MAC address of a wireless device that receives the packet.

It should be noted that the indication information in the 802.3 frame may be a type code field in the 802.3 frame stipulated in the IEEE 802.3 standard or a newly added field in the 802.3 frame. If the indication information in the 802.3 frame is the type code field in the 802.3 frame stipulated in the IEEE 802.3 standard, the type code field needs to be changed to type code corresponding to the data packet. For example, if the data packet is a PDCP data packet, the type code corresponding to the PDCP data packet may be filled in the type code field in the 802.3 frame. If the indication information in the 802.3 frame is a newly added field, the type code corresponding to the data packet may be filled in the newly added field.

Figure 9:
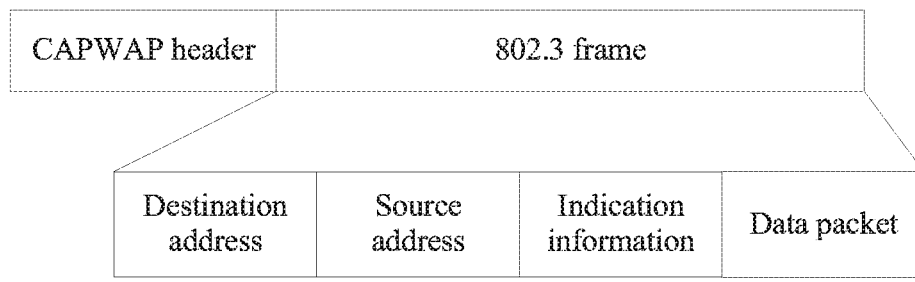
FIG. 9 is a schematic composition diagram of a format of a data frame according to another embodiment.

It should be noted that the schematic diagram of the format of the data frame provided in this embodiment describes only fields that can be included in the data frame, and does not impose a specific limitation on a length of each field. A length of each field shown in FIG. 9 is only an example. That is, types of fields included in the data frame and the length of each field are not specifically limited in this embodiment of the present embodiments. Specifically, the types of the fields included in the data frame and the length of each field may be set according to a requirement of an actual application scenario. In addition, the schematic diagram of the format of the CAPWAP header provided in this embodiment describes only fields that can be included in the CAPWAP header, and does not impose a specific limitation on a length of each field. A length of each field shown in FIG. 10 is only an example. That is, types of fields included in the CAPWAP header and the length of each field are not specifically limited in this embodiment. Specifically, the types of the fields included in the CAPWAP header and the length of each field may be set according to a requirement of an actual application scenario.

In addition, in this embodiment, the eNB may support multiple offloading manners. For example, the eNB supports offloading at a PDCP layer and offloading at an RLC layer. When the eNB performs offloading at the PDCP layer, a type of the data packet is a PDCP data packet; when the eNB performs offloading at the RLC layer, the type of the data packet is an RLC data packet. That is, after the eNB determines that it is necessary to offload the data, in the cellular network, of the UE served by the eNB to the non-cellular network, the data packet that the eNB needs to send to the UE served by the eNB may be a data packet of a different type. In this case, the eNB may pre-store a mapping table that includes data packets of different types and corresponding code types; and when needing to send a data packet to the UE served by the eNB, search the mapping table according to a type of the data packet that actually needs to be sent, so as to obtain type code corresponding to the data packet and fill the type code in the indication information. The eNB may support only one offloading manner. That is, after the eNB determines that it is necessary to offload the data, in the cellular network, of the UE served by the eNB to the non-cellular network, the data packet that the eNB needs to send to the UE served by the eNB is a data packet of only one type. For example, the eNB supports only offloading at the PDCP layer or offloading at the RLC layer; then, when needing to send a data packet to the UE served by the eNB, the eNB may directly fill type code corresponding to the data packet in the indication information. Certainly, a correspondence between a protocol number of a protocol (corresponding to an offloading manner) used by a data packet and corresponding type code may be added to a conversion table of IEEE 802.3 to IEEE 802.11 in current standards. For example, when the eNB supports offloading at the PDCP layer and offloading at the RLC layer, a protocol number PDCP of a protocol used by a data packet during offloading at the PDCP layer and corresponding type code, and a protocol number RLC of a protocol used by a data packet during offloading at the RLC layer and corresponding type code may be added to a correspondence table, as shown in Table 1.

TABLE 1

| Protocol Number | Type Code |
| --- | --- |
| IP | 08-00 |
| IP 802.3a | Length |
| IP ARP (IP Address Resolution Protocol) | 08-06 |
| AppleTalk (AppleTalk) (1) | 80-9B |
| AppleTalk (2) | length |
| AppleTalk AARP (AppleTalk Address Resolution Protocol) (1) | 80-F3 |
| AppleTalk AARP (2) | length |
| IPX (Internetwork Packet Exchange) Ethernet (Ethernet) II | 81-37 |
| IPX SNAP (IPX Subnetwork Access Protocol) | length |
| IPX 802.2 | length |
| IPX 802.3b | length |
| VLAN-tagged IP (Virtual Local Area Network-tagged IP) | 81-00 |
| PDCP | 08-XX |
| RLC | 08-YY |

In this embodiment, further, when there is at least one radio bearer on the UE, bearer information used to indicate a radio bearer that is in the at least one radio bearer and that carries the data packet needs to be added to the data frame shown in FIG. 9. The bearer information may be a mapping value corresponding to the radio bearer that is in the at least one radio bearer and that carries the data packet. In a possible implementation manner, the bearer information (such as a mapping value) used to indicate the radio bearer that is in the at least one radio bearer and that carries the data packet may be added to the CAPWAP header. Specifically, the mapping value may be filled in a field shown in FIG. 10. For example, a value of Reserved may be extended, that is, the mapping value corresponding to the radio bearer that carries the data packet may be filled in the Reserved field; or a data field in the wireless specific information field may be extended. In another possible implementation manner, a new field may be added to the 802.3 frame, and the field includes the bearer information used to indicate the radio bearer that is in the at least one radio bearer and that carries the data packet. In another possible implementation manner, the bearer information used to indicate the radio bearer that is in the at least one radio bearer and that carries the data packet may be added to the address field in the 802.3 frame. For example, eight MAC addresses are extended, mapping is performed between radio bearers and the MAC addresses, and then the bearer information used to indicate the radio bearer that is in the at least one radio bearer and that carries the data packet is filled in the address field. When the bearer information is a mapping value, the mapping value may be a MAC address or another value that can uniquely identify the radio bearer that carries the data packet. When the data packet is a PDCP data packet, the bearer information may be a data bearer identifier (DRB ID); when the data packet is an RLC data packet, the bearer information may be a logical channel identifier (LC ID). In addition, the eNB may further send a mapping relationship between the bearer information and the radio bearer that is in the at least one radio bearer and that carries the data packet, to the UE by using an air interface message.

802. The eNB sends, by using the AP, a data frame to the UE served by the eNB.

After the eNB determines to offload the data, in the cellular network, of the UE served by the eNB to the non-cellular network and generates the data frame when needing to send the data packet to the UE served by the eNB, the eNB may first send the data frame to the AP according to the MAC address of the AP that is included in the CAPWAP header and by using a CAPWAP tunnel interface or an interface Z (interface-Z) between the eNB and the AP. A data encapsulation format during data transmission between the eNB and the AP is different from a data encapsulation format during data transmission between the AP and the UE. Therefore, after receiving the data frame sent by the eNB, the AP needs to convert an encapsulation format of the data frame and sends the data frame to the UE after the conversion. Specifically, the data frame may be sent to a Wireless Fidelity (WiFi) module of the UE.

For example, the AP may generate a MAC header of an 802.11 frame by assembling identification information of the AP, and the MAC address of the UE and the MAC address of the eNB that are included in the data frame; generate a data frame by reassembling the generated MAC header of the 802.11 frame, and the indication information and the data packet that are included in the data frame; and then send the data frame to the UE.

According to the received data frame, the AP may copy the MAC address of the UE and the MAC address of the eNB that are in the 802.3 frame in the data frame, and generate the MAC header of the 802.11 frame by assembling the MAC address of the UE, the MAC address of the eNB, and the identification information of the AP according to stipulations of the IEEE 802.11 standard. A format of the MAC header of the 802.11 frame may be shown in FIG. 11. Specifically, the AP may copy the destination address in the 802.3 frame included in the data frame, that is, the MAC address of the UE, to address bit 1 in the MAC header of the 802.11 frame; copy the source address in the 802.3 frame included in the data frame, that is, the MAC address of the eNB, to address bit 3 in the MAC header of the 802.11 frame; fill the identification information of the AP in address bit 2 in the MAC header of the 802.11 frame, where the AP is used as a transmitter of the data frame; and further fill other fields according to the stipulations of the IEEE 802.11 standard, such as frame control, duration, sequence control, address bit 4, and quality of service control (QoS control) shown in FIG. 11, so as to finally generate the MAC header of the 802.11 frame. The identification information of the AP may be the MAC address of the AP, a basic service set identifier (BSSID) of the AP, or a service set identifier (SSID) of the AP, and this is not limited herein in this embodiment.

In addition, after generating the MAC header of the 802.11 frame, the AP may generate a data frame by reassembling the MAC header of the 802.11 frame, the indication information included in the data frame, and the data packet included in the 802.3 frame according to the stipulations of the IEEE 802.11 standard. Specifically, the data frame generated in this case may use a structure of the 802.11 frame shown in FIG. 11, that is, the indication information included in the data frame may be copied to the indication information field shown in FIG. 11, and the data packet may be copied to the data packet field shown in FIG. 11. In addition, the data frame shown in FIG. 11 further includes a destination service access point (DSAP) field, a source service access point (SSAP) field, a control field, and an Ethernet tunnel field.

Figure 11:
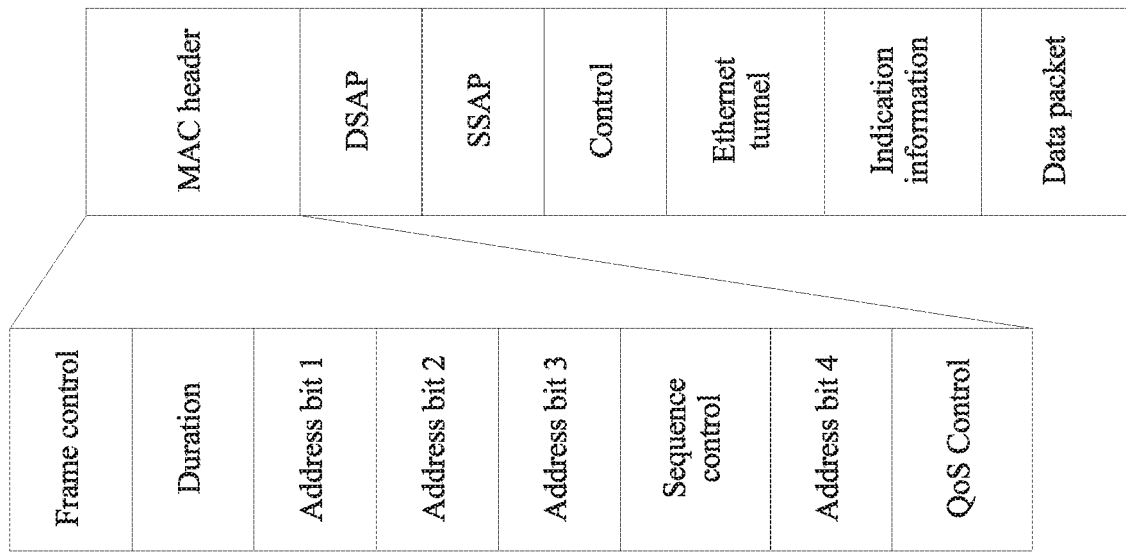
FIG. 11 is a schematic composition diagram of a format of a data frame and a media access control (MAC) header of an 802.11 frame according to another embodiment.

It should be noted that the schematic diagram of the format of the data frame shown in FIG. 11 provided in this embodiment describes only fields that can be included in the data frame, and does not impose a specific limitation on a length of each field. A length of each field shown in FIG. 11 is only an example. That is, types of fields included in the data frame shown in FIG. 11 and the length of each field are not specifically limited in this embodiment. Specifically, the types of the fields included in the data frame shown in FIG. 11 and the length of each field may be set according to a requirement of an actual application scenario.

Further, when there is at least one radio bearer on the UE, the bearer information that is included in the data frame shown in FIG. 9 and that is used to indicate the radio bearer that is in the at least one radio bearer and that carries the data packet needs to be mapped to the data frame shown in FIG. 11. When the bearer information (such as a mapping value) used to indicate the radio bearer that is in the at least one radio bearer and that carries the data packet is added to the CAPWAP header, the AP may map the bearer information to the MAC header of the 802.11 frame, for example, may map the bearer information to the type reserved field in the frame control field in the MAC header of the 802.11 frame. In the prior art, reserved field has 16 optional values 0000 to 1111, and DRB ID has eight optional values. For example, a type/subtype value or range corresponding to a radio bearer may be provided. For example, DRB IDo is corresponding to 0000. When the bearer information used to indicate the radio bearer that is in the at least one radio bearer and that carries the data packet is included in a newly added field in the 802.3 frame, in this case, a new field may be added to the data frame shown in FIG. 11, and the bearer information is mapped to the newly added field. When the bearer information (such as a mapping value) used to indicate the radio bearer that is in the at least one radio bearer and that carries the data packet is added to the address field of the 802.3 frame, in this case, the bearer information may be mapped to the address field of the MAC header of the 802.11 frame. The AP may notify the UE of a mapping relationship between the bearer information and the radio bearer that is in the at least one radio bearer and that carries the data packet.

803. The UE receives the data frame sent by the eNB by using the AP.

804. The UE determines that a data packet is a cellular network data packet according to indication information.

For example, the WiFi module of the UE may receive the data frame sent by the eNB by using the AP, and remove the MAC header of the 802.11 frame in the data frame after receiving the data frame; determine whether the data packet is a cellular network data packet according to the indication information, that is, determine whether the data packet is a cellular network data packet according to the type code; and after determining that the data packet is a cellular network data packet, transmit the data packet to an LTE module of the UE. For example, when the indication information is the type code corresponding to the PDCP data packet, in this case, the WiFi module can determine that the data packet is a PDCP data packet according to the indication information, that is, a cellular network data packet, and therefore, can transmit the data packet to the LTE module of the UE. If the WiFi module of the UE determines that the data packet is not a cellular network data packet, the WiFi module may directly send the data packet to a processor of the UE for processing.

Further, when there is at least one radio bearer on the UE, the data frame further includes bearer information used to indicate a radio bearer that is in the at least one radio bearer and that carries the data packet. Therefore, before processing the data packet by using a cellular network protocol, the UE may first receive a mapping relationship between the bearer information and the radio bearer that is in the at least one radio bearer and that carries the data packet, where the mapping relationship is sent by the eNB by using an air interface message. Then, the WiFi module of the UE transmits the data packet to the LTE module, of the UE, corresponding to the radio bearer according to the mapping relationship and the bearer information.

805. The UE processes the data packet by using a cellular network protocol.

The LTE module of the UE may process the data packet by using the cellular network protocol; for example, if the data packet is a PDCP data packet, process the data packet by using a PDCP layer protocol; or if the data packet is an RLC data packet, process the data packet by using an RLC layer protocol.

It should be noted that this embodiment describes the technical solutions of the present embodiments by using only an example that the eNB is the cellular radio access device, but does not limit the cellular radio access device. The cellular radio access device may be a network node such as a converged access network coordinator (SRC), an RNC, or a radio network controller. This embodiment does not impose a specific limitation on the cellular radio access device herein.

It should be noted that in this embodiment, the eNB is integrated with a function of an AC, that is, the eNB and the AC are a same node or a same physical entity.

When the eNB is not integrated with the function of the AC, that is, the eNB and the AC are not a same node or a same physical entity, the eNB may send a data frame to the AP by using the AC, and the AP sends the data frame to the UE.

In another application scenario, this embodiment provides another downlink offloading and converging method herein. In the process in which the eNB sends, by using the AP, the data frame to the UE served by the eNB, the data frame received by the AP and sent by the eNB includes the data packet that the eNB needs to send to the UE but does not include the indication information used to indicate that the data packet is a cellular network data packet. In this case, after receiving the data frame sent by the eNB, the AP may add, to the data frame, the indication information used to indicate that the data packet is a cellular network data packet, and then send the data frame that carries the indication information to the UE, so that the UE processes the data packet by using the cellular network protocol according to the indication information. The cellular network data packet may include a PDCP data packet or an RLC data packet.

Further, before adding, to the data frame, the indication information used to indicate that the data packet is a cellular network data packet and sending the data frame to the UE, the AP may first receive the indication information sent by the eNB.

It should be noted that a difference between a specific implementation process of downlink offloading and converging in this application scenario and an implementation process of step 801 to step 805 in this embodiment is as follows: The AP adds, to the data frame, the indication information used to indicate that the data packet is a cellular network data packet, but the eNB does not add the indication information. Another implementation process is the same as an implementation process of corresponding content in step 801 to step 805. Therefore, for specific description of the implementation process in this application scenario, reference may be made to specific description of corresponding content in step 801 to step 805 in this embodiment. Details are not described herein in this embodiment.

In another application scenario, this embodiment provides another downlink offloading and converging method herein. In this application scenario, the eNB supports offloading at an IP layer; in this case, the data packet is an IP data packet an IP data packet. Specifically, the UE receives the data frame sent by the eNB by using the AP; in this case, the data frame includes the data packet that the eNB needs to send to the UE, where the data packet includes a source IP address and a destination IP address. In addition, in this case, the data frame does not include the indication information used to indicate that the data packet that the eNB needs to send to the UE is a cellular network data packet. The destination IP address (that is, an IP address of the UE) included in the data packet forwarded to the UE by the eNB by using the AP is assigned by a core network gateway, and a destination IP address (that is, the IP address of the UE) included in a data packet directly sent by the AP to the UE is assigned by the AP. Therefore, after receiving the data frame that includes the data packet, the UE may determine, according to the destination IP address included in the data packet, whether the destination IP address is assigned by the core network gateway. If the destination IP address is assigned by the core network gateway, the UE needs to process the data packet by using the cellular network protocol; or if the destination IP address is not assigned by the core network gateway but assigned by the AP, the UE directly processes the data packet in this case. This is specifically as follows: The WiFi module of the UE determines, according to the destination IP address included in the data packet, whether the destination IP address is assigned by the core network gateway. If the destination IP address is assigned by the core network gateway, the WiFi module of the UE transmits the data packet to the LTE module of the UE, and the LTE module of the UE processes the data packet by using the cellular network protocol; or if the destination IP address is not assigned by the core network gateway but assigned by the AP, the processor of the UE may directly process the data packet in this case. Alternatively, after receiving the data frame, the UE cannot determine whether the destination IP address is assigned by the core network gateway or the AP. In this case, the source IP address in the data packet forwarded to the UE by the eNB by using the AP is an address used to bear a cellular service, but a source IP address in the data packet directly sent by the AP to the UE is an AP server address. Therefore, the UE may determine, according to the source IP address included in the data packet, whether the source IP address is an address used to bear the cellular service. If the source IP address is an address used to bear the cellular service, the UE needs to process the data packet by using the cellular network protocol. This is specifically as follows: The WiFi module of the UE determines, according to the source IP address included in the data packet, whether the source IP address is an address used to bear the cellular service. If the source IP address is an address used to bear the cellular service, the WiFi module of the UE transmits the data packet to the LTE module of the UE, and the LTE module of the UE processes the data packet by using the cellular network protocol. The data packet in the foregoing scenario refers to an IP data packet. When the data packet is an IP data packet and there is at least one radio bearer on the UE, bearer information of a radio bearer that carries the data packet needs to be added to the data frame. In this case, the bearer information may be a radio access bearer identifier (E-RABID) or a tunnel endpoint identifier (TEID).

It should be noted that when the data packet is an IP data packet, the UE specifically processes the data packet by using an IP layer protocol.

It should be noted that a difference between a specific implementation process of downlink offloading and converging in this application scenario and an implementation process of step 801 to step 805 in this embodiment is as follows: The eNB does not add the indication information (that is, the data frame does not include the indication information used to indicate that the data packet is a cellular network data packet), but the UE determines, according to the IP address included in the received data packet, whether it is necessary to process the data packet by using the cellular network protocol. Another implementation process is the same as an implementation process of corresponding content in step 801 to step 805. Therefore, for specific description of the implementation process in this application scenario, reference may be made to specific description of corresponding content in step 801 to step 805 in this embodiment. Details are not described herein in this embodiment.

In another application scenario, this embodiment provides another downlink offloading and converging method herein. In this application scenario, the eNB supports offloading at an IP layer; in this case, the data packet is an IP data packet an IP data packet. Specifically, the AP receives the data frame sent by the eNB; in this case, the data frame includes the data packet that the eNB needs to send to the UE, where the data packet includes a source IP address and a destination IP address. In addition, in this case, the data frame does not include the indication information used to indicate that the data packet needing to be sent to the UE is a cellular network data packet. Therefore, after receiving the data frame that includes the data packet, the AP may determine, according to the source IP address included in the data packet, whether the source IP address is an address used to bear a cellular service. If the source IP address is an address used to bear the cellular service, the AP sends the data frame to the UE, so that the UE processes the data packet by using the cellular network protocol (specifically, when determining that the source IP address is an address used to bear the cellular service, the AP may send the data frame to the LTE module of the UE by using the WiFi module of the UE); or if the source IP address is not an address used to bear the cellular service, the AP directly transmits the data packet to the WiFi module of the UE in this case, and the processor of the UE processes the data packet. Alternatively, after receiving the data frame that includes the data packet, the AP may determine, according to the destination IP address included in the data packet, whether the destination IP address is assigned by the core network gateway. If the destination IP address is assigned by the core network gateway, the AP sends the data frame to the UE, so that the UE processes the data packet by using the cellular network protocol (specifically, when determining that the destination IP address is assigned by the core network gateway, the AP may send the data frame to the LTE module of the UE by using the WiFi module of the UE, so that the LTE module of the UE processes the data packet by using the cellular network protocol); or if the destination IP address is not assigned by the core network gateway, the AP directly transmits the data packet to the WiFi module of the UE in this case, and the processor of the UE processes the data packet. The data packet in the foregoing scenario refers to an IP data packet.

It should be noted that when the data packet is an IP data packet, the UE specifically processes the data packet by using an IP layer protocol.

It should be noted that a difference between a specific implementation process of downlink offloading and converging in this application scenario and an implementation process of step 801 to step 805 in this embodiment is as follows: The eNB does not add the indication information (that is, the data frame does not include the indication information used to indicate that the data packet is a cellular network data packet), but the AP determines whether the data packet is a cellular network data packet according to the IP address included in the received data packet. Another implementation process is the same as an implementation process of corresponding content in step 801 to step 805. Therefore, for specific description of the implementation process in this application scenario, reference may be made to specific description of corresponding content in step 801 to step 805 in this embodiment. Details are not described herein in this embodiment.

According to the downlink offloading and converging method provided in this embodiment, after determining to offload data, in a cellular network, of UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 12:
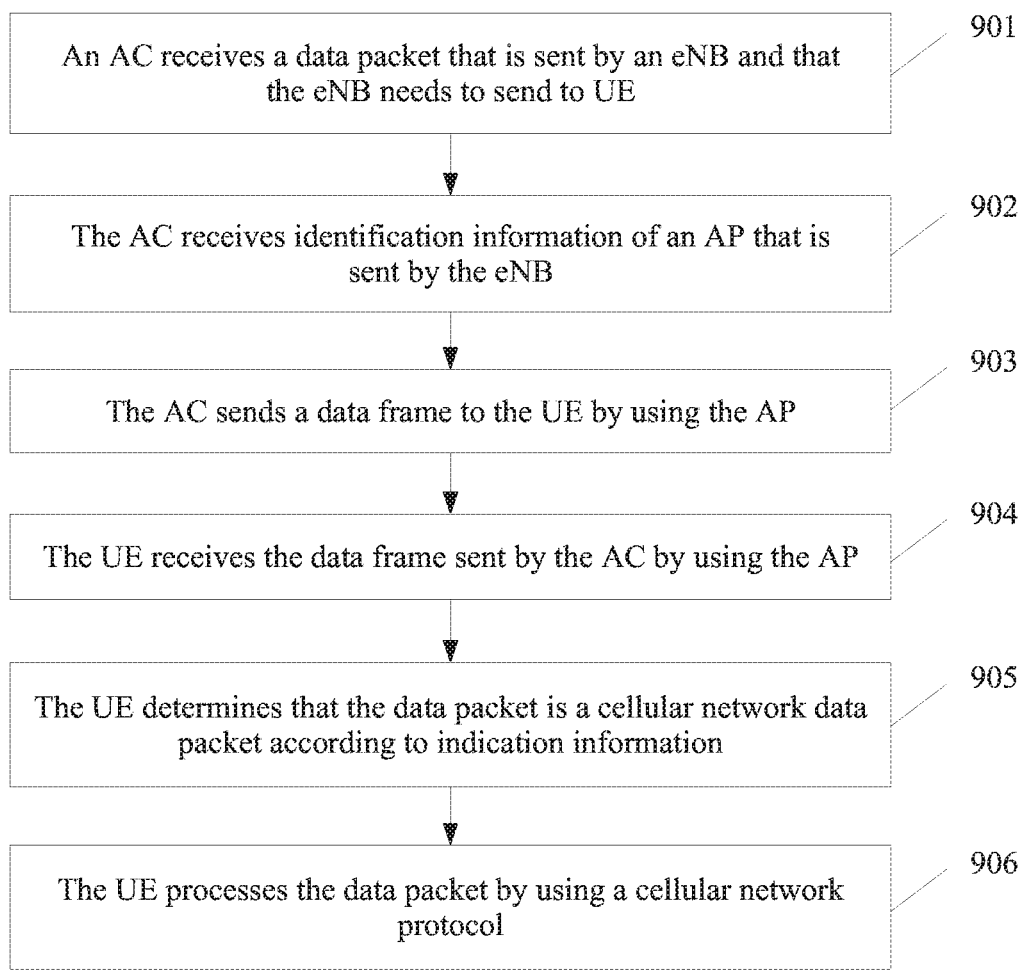
FIG. 12 is a flowchart of a downlink offloading and converging method according to another embodiment.

Another embodiment provides a downlink offloading and converging method, where the method is applied to a wireless communications system that includes an eNB (cellular radio access device) and an AP (non-cellular radio access device). In addition, that indication information used to indicate that a data packet is a cellular network data packet is type code of the data packet is used as an example for specific description herein in this embodiment. The data packet is a data packet that the eNB needs to send to UE. As shown in FIG. 12, the method may include the following steps.

901. An AC receives a data packet that is sent by the eNB and that the eNB needs to send to the UE.

The data packet is sent after the eNB determines to offload data, in a cellular network, of the UE served by the eNB to a non-cellular network. Specifically, after determining that an LTE network is in a service overloaded state according to a preset policy, that is, determining that it is necessary to offload the data, in the cellular network, of the UE served by the eNB to the non-cellular network, and when needing to send the data packet to the UE served by the eNB, the eNB may first perform processing such as encryption on the data packet; and then send a processed data packet to the AC. Specifically, the eNB may send the data packet to the AC by using a CAPWAP tunnel interface or an interface-Z between the eNB and the AC.

Further, the eNB may encapsulate the data packet into an 802.3 frame according to the 802.3 standard (in addition, the 802.3 frame may include indication information used to indicate that the data packet needing to be sent to the UE is a cellular network data packet, or may not include indication information used to indicate that the data packet needing to be sent to the UE is a cellular network data packet), and send the 802.3 frame in which the data packet is encapsulated to the AC. Certainly, the eNB may encapsulate the data packet by using a new frame format, and this is not limited in this embodiment.

902. The AC receives identification information of the AP that is sent by the eNB.

The identification information is used by the AC to determine the AP. The identification information of the AP may be a MAC address of the AP, a BSSID of the AP, or an SSID of the AP, and this is not limited herein in this embodiment. For example, the eNB may select, according to a load status and an air interface channel condition of the eNB, a proper AP within coverage of the eNB to perform offloading, and after selecting the proper AP, send identification information of the AP to the AC, so that the AC determines the AP according to the received identification information of the AP.

After receiving the data packet that is sent by the eNB and that the eNB needs to send to the UE, and the identification information of the AP that is sent by the eNB, the AC may generate a data frame that carries the data packet. For example, the AC may generate the data frame by assembling an 802.3 frame and a CAPWAP header. The 802.3 frame includes the data packet and the indication information used to indicate that the data packet that the eNB needs to send to the UE is a cellular network data packet. The 802.3 frame further includes a MAC address of the UE and a MAC address of the eNB; the CAPWAP header includes the MAC address of the AP (the MAC address of the AP may be determined by the AC according to the received identification information of the AP). Further, if the data packet that is received by the AC, sent by the eNB, and that the eNB needs to send to the UE is included in the 802.3 frame, that the AC generates the data frame by assembling an 802.3 frame and a CAPWAP header may be specifically that the AC adds, to the data frame, the CAPWAP header, and the data packet, the MAC address of the UE, and the MAC address of the eNB that are included in the 802.3 frame.

903. The AC sends a data frame to the UE by using the AP.

The data frame includes the data packet that the eNB needs to send to the UE, and the indication information used to indicate that the data packet is a cellular network data packet, where the indication information is used by the UE to process the data packet by using a cellular network protocol according to the indication information. The AC may first send the data frame to the AP according to the MAC address of the AP that is included in the CAPWAP header and by using a CAPWAP tunnel interface between the AC and the AP. A data encapsulation format during data transmission between the AC and the AP is different from a data encapsulation format during data transmission between the AP and the UE. Therefore, after receiving the data frame sent by the AC, the AP needs to convert an encapsulation format of the data frame and sends the data frame to the UE after the conversion. Specifically, the data frame may be sent to a WiFi module of the UE.

The cellular network data packet includes a PDCP data packet or an RLC data packet.

For example, the AP may generate a MAC header of an 802.11 frame by assembling the identification information of the AP, and the MAC address of the UE and the MAC address of the eNB that are included in the data frame; generate a data frame by reassembling the MAC header of the 802.11 frame, and the indication information and the data packet that are included in the data frame; and then send the data frame to the UE.

Further, when there is at least one radio bearer on the UE, the data frame further includes bearer information used to indicate a radio bearer that is in the at least one radio bearer and that carries the data packet. In addition, the AC may send a mapping relationship between the bearer information and the radio bearer that is in the at least one radio bearer and that carries the data packet, to the UE by using the eNB.

904. The UE receives the data frame sent by the AC by using the AP.

905. The UE determines that the data packet is a cellular network data packet according to indication information.

Further, when there is at least one radio bearer on the UE, the data frame further includes bearer information used to indicate a radio bearer that is in the at least one radio bearer and that carries the data packet. Therefore, before processing the data packet by using the cellular network protocol, the UE may first receive a mapping relationship between the bearer information and the radio bearer that is in the at least one radio bearer and that carries the data packet, where the mapping relationship is sent by the AC by using the eNB. Then, the WiFi module of the UE transmits the data packet to an LTE module, of the UE, corresponding to the radio bearer according to the mapping relationship and the bearer information.

906. The UE processes the data packet by using a cellular network protocol.

It should be noted that this embodiment describes the technical solutions of the present embodiments by using only an example that the eNB is the cellular radio access device, but does not limit the cellular radio access device. The cellular radio access device may be a network node such as an SRC, an RNC, or a radio network controller. This embodiment does not impose a specific limitation on the cellular radio access device herein.

It should be noted that for specific description of content in step 901 to step 906 in this embodiment, reference may be made to specific description of corresponding content in step 801 to step 805 in another embodiment. Details are not described herein in this embodiment.

In another application scenario, this embodiment provides another downlink offloading and converging method herein. In the process in which the AC sends, by using the AP, the data frame to the UE served by the eNB, the data frame received by the AP and sent by the AC includes the data packet that the eNB needs to send to the UE but does not include the indication information used to indicate that the data packet is a cellular network data packet. After receiving the data frame sent by the AC, the AP may add, to the data frame, the indication information used to indicate that the data packet is a cellular network data packet, and then send the data frame that carries the indication information to the UE, so that the UE processes the data packet by using the cellular network protocol according to the indication information. The cellular network data packet may include a PDCP data packet or an RLC data packet.

Further, before adding, to the data frame, the indication information used to indicate that the data packet is a cellular network data packet and sending the data frame to the UE, the AP may first receive the indication information sent by the eNB.

It should be noted that a difference between a specific implementation process of downlink offloading and converging in this application scenario and an implementation process of step 901 to step 906 in this embodiment is as follows: The AP adds, to the data frame, the indication information used to indicate that the data packet is a cellular network data packet, but the AC does not add the indication information. Another implementation process is the same as an implementation process of corresponding content in step 901 to step 906. Therefore, for specific description of the implementation process in this application scenario, reference may be made to specific description of corresponding content in step 901 to step 906 in this embodiment. Details are not described herein in this embodiment.

In another application scenario, this embodiment provides another downlink offloading and converging method herein. In this application scenario, the eNB supports offloading at an IP layer; in this case, the data packet is an IP data packet an IP data packet. Specifically, the UE receives the data frame sent by the AC by using the AP; in this case, the data frame includes the data packet that the eNB needs to send to the UE, where the data packet includes a source IP address and a destination IP address. In addition, in this case, the data frame does not include the indication information used to indicate that the data packet that the eNB needs to send to the UE is a cellular network data packet. The destination IP address (that is, an IP address of the UE) included in the data packet forwarded to the UE by the eNB by using the AC and the AP is assigned by a core network gateway, and a destination IP address (that is, the IP address of the UE) included in a data packet directly sent by the AP to the UE is assigned by the AP. Therefore, after receiving the data frame that includes the data packet, the UE may determine, according to the destination IP address included in the data packet, whether the destination IP address is assigned by the core network gateway. If the destination IP address is assigned by the core network gateway, the UE needs to process the data packet by using the cellular network protocol; or if the destination IP address is not assigned by the core network gateway but assigned by the AP, the UE directly processes the data packet in this case. This is specifically as follows: The WiFi module of the UE determines, according to the destination IP address included in the data packet, whether the destination IP address is assigned by the core network gateway. If the destination IP address is assigned by the core network gateway, the WiFi module of the UE transmits the data packet to the LTE module of the UE, and the LTE module of the UE processes the data packet by using the cellular network protocol; or if the destination IP address is not assigned by the core network gateway but assigned by the AP, a processor of the UE may directly process the data packet in this case. Alternatively, after receiving the data frame, the UE cannot determine whether the destination IP address is assigned by the core network gateway or the AP. In this case, the source IP address in the data packet forwarded to the UE by the eNB by using the AC and the AP is an address used to bear a cellular service, but a source IP address in the data packet directly sent by the AP to the UE is an AP server address. Therefore, the UE may determine, according to the source IP address included in the data packet, whether the source IP address is an address used to bear the cellular service. If the source IP address is an address used to bear the cellular service, the UE needs to process the data packet by using the cellular network protocol. This is specifically as follows: The WiFi module of the UE determines, according to the source IP address included in the data packet, whether the source IP address is an address used to bear the cellular service. If the source IP address is an address used to bear the cellular service, the WiFi module of the UE transmits the data packet to the LTE module of the UE, and the LTE module of the UE processes the data packet by using the cellular network protocol. The data packet in the foregoing scenario refers to an IP data packet. When the data packet is an IP data packet and there is at least one radio bearer on the UE, bearer information corresponding to a radio bearer that carries the data packet needs to be added to the data frame. In this case, the bearer information may be an E-RABID or a TEID.

It should be noted that a difference between a specific implementation process of downlink offloading and converging in this application scenario and an implementation process of step 901 to step 906 in this embodiment is as follows: The eNB does not add the indication information (that is, the data frame does not include the indication information used to indicate that the data packet is a cellular network data packet), but the UE determines, according to the IP address included in the received data packet, whether it is necessary to process the data packet by using the cellular network protocol. Another implementation process is the same as an implementation process of corresponding content in step 901 to step 906. Therefore, for specific description of the implementation process in this application scenario, reference may be made to specific description of corresponding content in step 901 to step 906 in this embodiment. Details are not described herein in this embodiment.

According to the downlink offloading and converging method provided in this embodiment, after receiving a data packet that is sent by a cellular radio access device and that the cellular radio access device needs to send to UE, an AC may add, to a data frame, the data packet and indication formation used to indicate that the data packet is a cellular network data packet, and send the data frame to the UE by using a non-cellular radio access device. Because the data frame includes the indication information used to indicate that the data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 13:
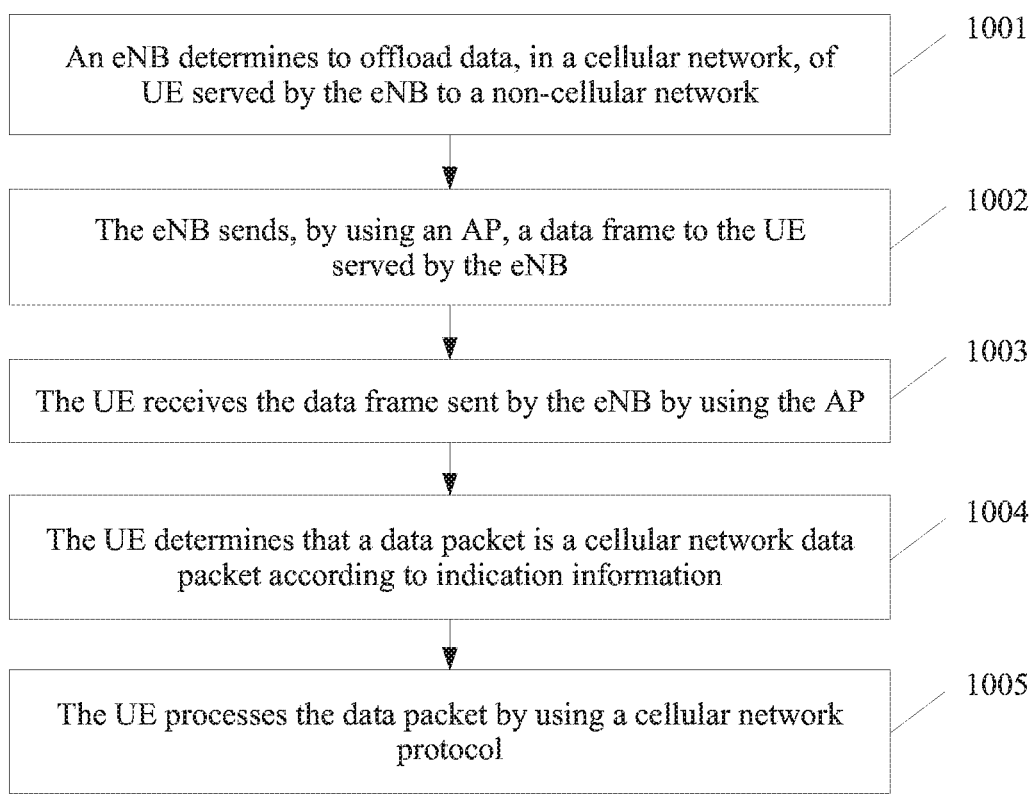
FIG. 13 is a flowchart of a downlink offloading and converging method according to another embodiment.

Another embodiment provides a downlink offloading and converging method, where the method is applied to a wireless communications system that includes an eNB (cellular radio access device) and an AP (non-cellular radio access device). In addition, that indication information used to indicate that a data packet needing to be sent to UE is a cellular network data packet is address information of the eNB is used as an example for description herein in this embodiment. As shown in FIG. 13, the method may include the following steps.

1001. The eNB determines to offload data, in a cellular network, of UE served by the eNB to a non-cellular network.

After determining to offload the data, in the cellular network, of the UE served by the eNB to the non-cellular network, and when needing to send a data packet to the UE served by the eNB, the eNB may generate a data frame that carries the data packet.

For example, the eNB may generate the data frame by assembling an 802.3 frame and a CAPWAP header.

The 802.3 frame includes the data packet and the indication information used to indicate that the data packet needing to be sent to the UE is a cellular network data packet, and the indication information is the address information of the eNB. In this embodiment, the eNB supports at least two MAC addresses, and there is a mapping relationship between each MAC address and function information of the MAC address. For example, the eNB supports two MAC addresses, a function of MAC address 1 is an Internet local breakout, and a function of MAC address 2 is offloading and converging. In addition, the UE may be notified of the mapping relationship between each MAC address and function information of the MAC address by using a radio resource control (RRC) connection reconfiguration message.

Specifically, after determining to offload the data, in the cellular network, of the UE served by the eNB to the non-cellular network, the eNB may first perform processing such as encryption on the data packet; then generate, according to stipulations of the IEEE 802.3 standard, the 802.3 frame that includes a destination address, indication information (the indication information may be used as a specified source address in the IEEE 802.3 standard), and the data packet; and generate the data frame by assembling the 802.3 frame and the CAPWAP header. The destination address in the 802.3 frame is a MAC address of the UE. The data packet is a data packet that needs to be offloaded to the non-cellular network, that is, the data packet can be transmitted from the eNB to the UE only after undergoing offloading and converging processing. Therefore, the indication information in the 802.3 frame is a MAC address corresponding to function information that is offloading and converging.

Further optionally, the CAPWAP header may include a MAC address of the AP.

In this embodiment, further, when there is at least one radio bearer on the UE, bearer information used to indicate a radio bearer that is in the at least one radio bearer and that carries the data packet needs to be added to the data frame. The bearer information may be a mapping value corresponding to the radio bearer that is in the at least one radio bearer and that carries the data packet. In a possible implementation manner, the bearer information (such as a mapping value) used to indicate the radio bearer that is in the at least one radio bearer and that carries the data packet may be added to the CAPWAP header. Specifically, the mapping value may be filled in a field shown in FIG. 10. For example, a value of Reserved may be extended, that is, the mapping value corresponding to the radio bearer that carries the data packet may be filled in a Reserved field; or a data field in a wireless specific information field may be extended. In another possible implementation manner, a new field may be added to the 802.3 frame, and the field includes the bearer information used to indicate the radio bearer that is in the at least one radio bearer and that carries the data packet. In another possible implementation manner, the bearer information used to indicate the radio bearer that is in the at least one radio bearer and that carries the data packet may be added to an address field in the 802.3 frame. For example, eight MAC addresses are extended, mapping is performed between radio bearers and the MAC addresses, and then the bearer information used to indicate the radio bearer that is in the at least one radio bearer and that carries the data packet is filled in the address field.

1002. The eNB sends, by using the AP, a data frame to the UE served by the eNB.

After the eNB determines to offload the data, in the cellular network, of the UE served by the eNB to the non-cellular network and generates the data frame when needing to send the data packet to the UE served by the eNB, the eNB may first send the data frame to the AP by using a CAPWAP tunnel interface or an interface-Z. A data encapsulation format during data transmission between the eNB and the AP is different from a data encapsulation format during data transmission between the AP and the UE. Therefore, after receiving the data frame sent by the eNB, the AP needs to convert an encapsulation format of the data frame and sends the data frame to the UE after the conversion.

For example, the AP may generate a MAC header of an 802.11 frame by assembling identification information of the AP, and the indication information and the MAC address of the UE that are included in the data frame; generate a data frame by reassembling the generated MAC header of the 802.11 frame and the data packet included in the data frame; and then send the data frame to the UE.

According to the received data frame, the AP may copy the MAC address of the UE and the indication information that are in the 802.3 frame included in the data frame, where the indication information is the address information (MAC address whose function is offloading and converging) of the eNB; and generate the MAC header of the 802.11 frame by assembling the MAC address of the UE, the address information of the eNB, and the identification information of the AP according to stipulations of the IEEE 802.11 standard. A format of the MAC header of the 802.11 frame may be shown in FIG. 11. Specifically, the AP may copy the destination address in the 802.3 frame included in the data frame, that is, the MAC address of the UE, to address bit 1 in the MAC header of the 802.11 frame; copy the indication information in the 802.3 frame included in the data frame, that is, the address information of the eNB, to address bit 3 in the MAC header of the 802.11 frame; fill the identification information of the AP in address bit 2 in the MAC header of the 802.11 frame, where the AP is used as a transmitter of the data frame; and further fill other fields according to the stipulations of the IEEE 802.11 standard, so as to finally generate the MAC header of the 802.11 frame. The identification information of the AP may be a MAC address of the AP, a BSSID of the AP, or an SSID of the AP, and this is not limited herein in this embodiment.

In addition, after generating the MAC header of the 802.11 frame, the AP may generate a data frame by reassembling the MAC header of the 802.11 frame, and the data packet in the 802.3 frame included in the data frame according to the stipulations of the IEEE 802.11 standard.

Further, when there is at least one radio bearer on the UE, the bearer information that is included in the data frame shown in FIG. 9 and that is used to indicate the radio bearer that is in the at least one radio bearer and that carries the data packet needs to be mapped to the data frame shown in FIG. 11. When the bearer information (such as a mapping value) used to indicate the radio bearer that is in the at least one radio bearer and that carries the data packet is added to the CAPWAP header, the AP may map the bearer information to the MAC header of the 802.11 frame, for example, may map the bearer information to the type reserved field in the frame control field in the MAC header of the 802.11 frame. In the prior art, reserved field has 16 optional values 0000 to 1111, and DRB ID has eight optional values. For example, a type/subtype (Type/subType) value or range corresponding to a radio bearer may be provided. For example, DRB IDo is corresponding to 0000. When the bearer information used to indicate the radio bearer that is in the at least one radio bearer and that carries the data packet is included in a newly added field in the 802.3 frame, in this case, a new field may be added to the data frame shown in FIG. 11, and the bearer information is mapped to the newly added field. When the bearer information (such as a mapping value) used to indicate the radio bearer that is in the at least one radio bearer and that carries the data packet is added to the address field of the 802.3 frame, in this case, the bearer information may be mapped to the address field of the MAC header of the 802.11 frame.

1003. The UE receives the data frame sent by the eNB by using the AP.

1004. The UE determines that a data packet is a cellular network data packet according to indication information.

For example, a WiFi module of the UE may receive the data frame sent by the eNB by using the AP; after receiving the data frame, determine whether the data packet is a cellular network data packet according to the source address (that is, the indication information) in the MAC header of the 802.11 frame in the data frame and a mapping relationship between the MAC address and a function of the MAC address, that is, determine whether the source address in the MAC header of the 802.11 frame is a MAC address, of the eNB, whose function is offloading and converging; and after determining that the data packet is a cellular network data packet (that is, determining that the source address is the MAC address, of the eNB, whose function is offloading and converging), transmit the data packet to an LTE module of the UE. If the WiFi module of the UE determines that the data packet is not a cellular network data packet (that is, determines that the source address is not the MAC address, of the eNB, whose function is offloading and converging), the WiFi module may directly send the data packet to a processor of the UE for processing.

The eNB may notify the UE in advance of a mapping relationship between each MAC address and a function of the MAC address.

Further, when there is at least one radio bearer on the UE, the data frame further includes bearer information used to indicate a radio bearer that is in the at least one radio bearer and that carries the data packet. Therefore, before processing the data packet by using a cellular network protocol, the UE may first receive a mapping relationship between the bearer information and the radio bearer that is in the at least one radio bearer and that carries the data packet, where the mapping relationship is sent by the eNB by using an air interface message. Then, the WiFi module of the UE transmits the data packet to the LTE module, of the UE, corresponding to the radio bearer according to the mapping relationship and the bearer information.

1005. The UE processes the data packet by using a cellular network protocol.

In this embodiment, further, when the eNB supports three or more MAC addresses, if the eNB supports multiple offloading manners in this case, the eNB may assign one corresponding MAC address to each offloading manner. For example, the eNB supports three MAC addresses, and supports two offloading manners: PDCP layer offloading and RLC layer offloading. In this case, it may be defined that a function of MAC address 1 is local breakout, a function of MAC address 2 is PDCP offloading and converging, and a function of MAC address 3 is RLC offloading and converging. In this way, when the eNB determines that it is necessary to offload the data, in the cellular network, of the UE served by the eNB to the non-cellular network, the indication information in the 802.3 frame included in the data frame may be determined according to a type of the data packet. For example, when the data packet is a PDCP data packet, the indication information included in the 802.3 frame in this case is MAC address 2 that is used as the address information of the eNB.

It should be noted that in this embodiment, the eNB is integrated with a function of an AC, that is, the eNB and the AC are a same node or a same physical entity.

When the eNB is not integrated with the function of the AC, that is, the eNB and the AC are not a same node or a same physical entity, the eNB may send a data frame to the AP by using the AC, and the AP sends the data frame to the UE.

It should be noted that this embodiment describes the technical solutions of the present embodiments by using only an example that the eNB is the cellular radio access device, but does not limit the cellular radio access device. The cellular radio access device may be a network node such as an SRC, an RNC, or a radio network controller. This embodiment does not impose a specific limitation on the cellular radio access device herein.

It should be noted that for specific description of content in step 1001 to step 1005 in this embodiment, reference may be made to specific description of corresponding content in step 801 to step 805 in another embodiment.

According to the downlink offloading and converging method provided in this embodiment, after determining to offload data, in a cellular network, of UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Another embodiment provides a downlink offloading and converging method, where the method is applied to a wireless communications system that includes an eNB (cellular radio access device) and an AP (non-cellular radio access device). In addition, that indication information used to indicate that a data packet is a cellular network data packet is address information of the eNB is used as an example for description herein in this embodiment.

Figure 14:
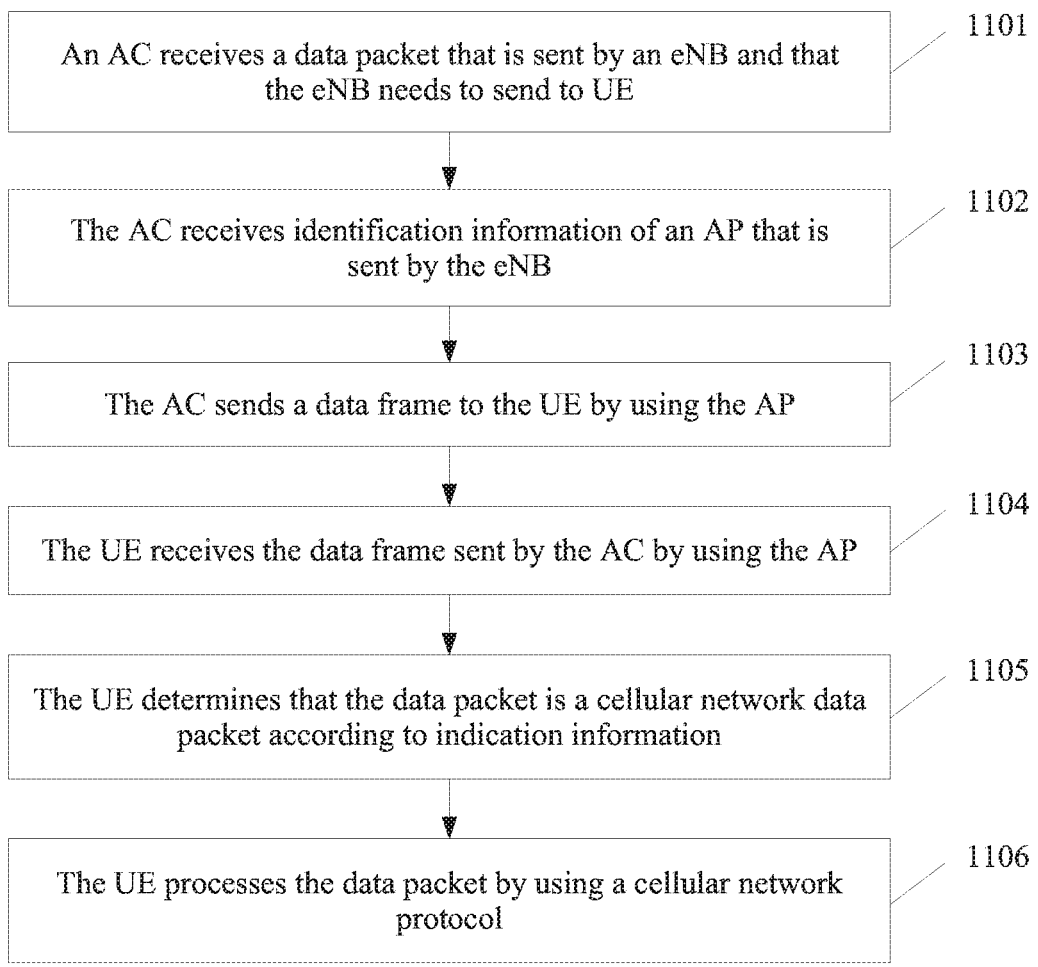
FIG. 14 is a flowchart of a downlink offloading and converging method according to another embodiment.

The data packet is a data packet that the eNB needs to send to UE. As shown in FIG. 14, the method may include the following steps.

1101. An AC receives the data packet that is sent by the eNB and that the eNB needs to send to the UE.

The data packet is sent after the eNB determines to offload data, in a cellular network, of the UE served by the eNB to a non-cellular network. Specifically, after determining that an LTE network is in a service overloaded state according to a preset policy, that is, determining that it is necessary to offload the data, in the cellular network, of the UE served by the eNB to the non-cellular network, and when needing to send the data packet to the UE served by the eNB, the eNB may first perform processing such as encryption on the data packet; and then encapsulate a processed data packet according to stipulations of the IEEE 802.3 standard (a newly created frame format may be used for encapsulation), and send the encapsulated data packet to the AC by using a CAPWAP tunnel interface or an interface-Z. Certainly, after performing processing such as encryption on the data packet, the eNB may directly send the processed data packet to the AC by using the CAPWAP tunnel interface or the interface-Z between the eNB and the AC.

1102. The AC receives identification information of the AP that is sent by the eNB.

The identification information is used by the AC to determine the AP. The identification information of the AP may be a MAC address of the AP, a BSSID of the AP, or an SSID of the AP, and this is not limited herein in this embodiment. For example, the eNB may select, according to a load status and an air interface channel condition of the eNB, a proper AP within coverage of the eNB to perform offloading, and after selecting the proper AP, send identification information of the AP to the AC, so that the AC determines the AP according to the received identification information of the AP.

After receiving the data packet that is sent by the eNB and that the eNB needs to send to the UE, and the identification information of the AP that is sent by the eNB, the AC may generate a data frame that carries the data packet. For example, the AC may generate a data frame by assembling an 802.3 frame and a CAPWAP header. The 802.3 frame includes the data packet and the indication information used to indicate that the data packet needing to be sent to the UE is a cellular network data packet. The indication information is the address information of the eNB. The 802.3 frame further includes a MAC address of the UE; the CAPWAP header includes the MAC address of the AP.

Further, if the data packet that is received by the AC, sent by the eNB, and that the eNB needs to send to the UE is included in the 802.3 frame, that the AC generates the data frame by assembling an 802.3 frame and a CAPWAP header may be specifically that the AC adds, to the data frame, the CAPWAP header, and the data packet, the indication information, and the MAC address of the UE that are included in the 802.3 frame.

1103. The AC sends a data frame to the UE by using the AP.

The data frame includes the data packet that the eNB needs to send to the UE, and the indication information used to indicate that the data packet is a cellular network data packet (the indication information is the address information of the eNB), where the indication information is used by the UE to process the data packet by using a cellular network protocol according to the indication information. The AC may first send the data frame to the AP according to the MAC address of the AP that is included in the CAPWAP header and by using a CAPWAP tunnel interface between the AC and the AP. A data encapsulation format during data transmission between the AC and the AP is different from a data encapsulation format during data transmission between the AP and the UE. Therefore, after receiving the data frame sent by the AC, the AP needs to convert an encapsulation format of the data frame and sends the data frame to the UE after the conversion. Specifically, the data frame may be sent to a WiFi module of the UE. The cellular network data packet includes a PDCP data packet or an RLC data packet.

For example, the AP may generate a MAC header of an 802.11 frame by assembling the identification information of the AP, and the indication information (the indication information is the address information of the eNB) and the MAC address of the UE that are included in the data frame; generate a data frame by reassembling the generated MAC header of the 802.11 frame and the data packet included in the data frame; and then send the data frame to the UE.

Further, when there is at least one radio bearer on the UE, the data frame further includes bearer information used to indicate a radio bearer that is in the at least one radio bearer and that carries the data packet. In addition, the AC may send a mapping relationship between the bearer information and the radio bearer that is in the at least one radio bearer and that carries the data packet, to the UE by using the eNB.

1104. The UE receives the data frame sent by the AC by using the AP.

1105. The UE determines that the data packet is a cellular network data packet according to indication information.

Further, when there is at least one radio bearer on the UE, the data frame further includes bearer information used to indicate a radio bearer that is in the at least one radio bearer and that carries the data packet. Therefore, before processing the data packet by using the cellular network protocol, the UE may first receive a mapping relationship between the bearer information and the radio bearer that is in the at least one radio bearer and that carries the data packet, where the mapping relationship is sent by the AC by using the eNB. Then, the WiFi module of the UE transmits the data packet to an LTE module, of the UE, corresponding to the radio bearer according to the mapping relationship and the bearer information.

1106. The UE processes the data packet by using a cellular network protocol.

It should be noted that this embodiment describes the technical solutions of the present embodiments by using only an example that the eNB is the cellular radio access device, but does not limit the cellular radio access device. The cellular radio access device may be a network node such as an SGW, a PGW, or an RNC. This embodiment does not impose a specific limitation on the cellular radio access device herein.

It should be noted that for specific description of content in step 1101 to step 1106 in this embodiment, reference may be made to specific description of corresponding content in step 1001 to step 1005 in another embodiment.

According to the downlink offloading and converging method provided in this embodiment, after determining to offload data, in a cellular network, of UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 15:
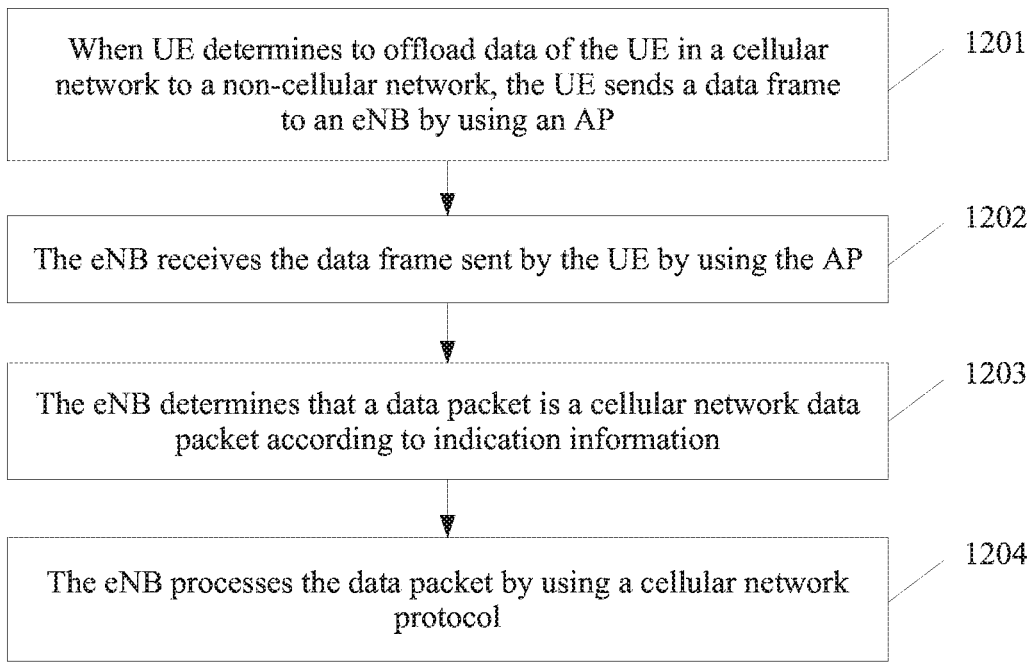
FIG. 15 is a flowchart of an uplink offloading and converging method according to another embodiment.

Another embodiment provides an uplink offloading and converging method, where the method is applied to a wireless communications system that includes an eNB (cellular radio access device) and an AP (non-cellular radio access device). In addition, that indication information used to indicate that a data packet is a cellular network data packet is type code of the data packet is used as an example for specific description herein in this embodiment. The data packet is a data packet that UE needs to send to the eNB. As shown in FIG. 15, the method may include the following steps.

1201. When the UE determines to offload data of the UE in a cellular network to a non-cellular network, the UE sends a data frame to the eNB by using the AP.

The data frame includes the data packet that the UE needs to send to the eNB, and the indication information used to indicate that the data packet is a cellular network data packet, where the indication information is used by the eNB to process the data packet by using a cellular network protocol. The cellular network data packet includes a PDCP data packet or an RLC data packet. The UE may determine, according to a pre-configured policy, whether it is necessary to offload the data of the UE in the cellular network to the non-cellular network, or the UE may determine, according to indication information that is sent by the eNB and used to indicate that it is necessary to offload the data of the UE in the cellular network to the non-cellular network, that it is necessary to offload the data of the UE in the cellular network to the non-cellular network.

It should be noted that for specific implementation of step 1201, reference may be made to specific description of corresponding content in step 801 in another embodiment. Details are not described herein in this embodiment.

When determining to offload the data of the UE in the cellular network to the non-cellular network, and needing to send a data packet to the eNB, the UE may generate a data frame that carries the data packet, and send the generated data frame to the eNB by using the AP.

For example, the UE may generate the data frame by assembling a MAC header of an 802.11 frame, the indication information, and the data packet. A format of the MAC header of the 802.11 frame may be shown in FIG. 11. Specifically, the UE may fill a destination address, that is, a MAC address of the eNB, in address bit 3 in the MAC header of the 802.11 frame; fill a source address, that is, a MAC address of the UE, in address bit 2 in the MAC header of the 802.11 frame; fill identification information of the AP in address bit 1 in the MAC header of the 802.11 frame; fill other fields according to stipulations of the IEEE 802.11 standard, so as to finally generate the MAC header of the 802.11 frame; and then may generate the data frame shown in FIG. 11 by assembling the MAC header of the 802.11 frame, the indication information, and the data packet according to the stipulations of the IEEE 802.11 standard.

It should be noted that for specific description of the indication information included in the data frame, reference may be made to specific description of corresponding content in step 801 in another embodiment. Details are not described herein in this embodiment.

In this embodiment, further, when there is at least one radio bearer on the UE, bearer information used to indicate a radio bearer that is in the at least one radio bearer and that carries the data packet needs to be added to the data frame shown in FIG. 11. The bearer information may be a mapping value corresponding to the radio bearer that is in the at least one radio bearer and that carries the data packet. In a possible implementation manner, the bearer information (such as a mapping value) used to indicate the radio bearer that is in the at least one radio bearer and that carries the data packet may be added to the MAC header of the 802.11 frame. Specifically, the bearer information may be filled in a field in the MAC header of the 802.11 frame. For example, the bearer information is filled in a type reserved field in a frame control field in the MAC header of the 802.11 frame. In the prior art, reserved field has 16 optional values 0000 to 1111, and DRB ID has eight optional values. For example, a type/subtype (Type/subType) value or range corresponding to a radio bearer may be provided. For example, DRB ID0 is corresponding to 0000. In another possible implementation manner, a new field may be added to the data frame, and the field includes the bearer information used to indicate the radio bearer that is in the at least one radio bearer and that carries the data packet. In another possible implementation manner, the bearer information used to indicate the radio bearer that is in the at least one radio bearer and that carries the data packet may be added to the address field in the MAC header of the 802.11 frame. For example, eight MAC addresses are extended, mapping is performed between radio bearers and the MAC addresses, and then the bearer information used to indicate the radio bearer that is in the at least one radio bearer and that carries the data packet is filled in the address field.

A data encapsulation format during data transmission between the UE and the AP is different from a data encapsulation format during data transmission between the AP and the eNB. Therefore, after receiving the data frame sent by the UE, the AP needs to convert an encapsulation format of the data frame and sends the data frame to the eNB after the conversion.

For example, the AP may generate an 802.3 frame by assembling the MAC address of the eNB, the MAC address of the UE, the data packet, and the indication information that are included in the data frame; generate a data frame by reassembling the generated 802.3 frame and a CAPWAP header; and then send the data frame to the eNB.

According to the received data frame, the AP may copy the destination address, that is, the MAC address of the eNB, and the source address, that is, the MAC address of the UE that are in the MAC header of the 802.11 frame included in the data frame, and the indication information included in the data frame; and generate the 802.3 frame by assembling the MAC address of the eNB, the MAC address of the UE, the data packet, and the indication information according to stipulations of the IEEE 802.3 standard. Specifically, the AP may copy the MAC address of the eNB that is filled in address bit 3 in the MAC header of the 802.11 frame, to a destination address field in the 802.3 frame shown in FIG. 9; copy the MAC address of the UE that is filled in address bit 2 in the MAC header of the 802.11 frame, to a source address field in the 802.3 frame shown in FIG. 9; copy the indication information included in the data frame to an indication information field in the 802.3 frame shown in FIG. 9; and copy the data packet to a data packet field in the 802.3 frame shown in FIG. 9, so as to finally generate the 802.3 frame. After generating the 802.3 frame, the AP generates the data frame shown in FIG. 9 by reassembling the 802.3 frame and the CAPWAP header, where the CAPWAP header may include a MAC address of the AP.

Further, when there is at least one radio bearer on the UE, the bearer information that is included in the data frame shown in FIG. 11 and that is used to indicate the radio bearer that is in the at least one radio bearer and that carries the data packet needs to be mapped to the data frame shown in FIG. 9. When the bearer information (such as a mapping value) used to indicate the radio bearer that is in the at least one radio bearer and that carries the data packet is added to the MAC header of the 802.11 frame, the AP may map the bearer information to a field, included in the CAPWAP header, shown in FIG. 10. For example, a value of Reserved may be extended, so that the bearer information can be mapped to the Reserved field; or a data field in a wireless specific information field may be extended. When a new field is added to the data frame, and the field includes the bearer information used to indicate the radio bearer that is in the at least one radio bearer and that carries the data packet, a new field may be added to the 802.3 frame, and the bearer information is mapped to the newly added field in the 802.3 frame. When the bearer information used to indicate the radio bearer that is in the at least one radio bearer and that carries the data packet is added to the address field in the MAC header of the 802.11 frame, the bearer information may be mapped to the address field in the 802.3 frame in this case. The bearer information may be a MAC address or another value that can uniquely identify the radio bearer that carries the data packet.

In this embodiment, further optionally, after receiving the data frame sent by the UE, the AP may determine whether the data packet included in the data frame is a cellular network data packet according to the indication information included in the data frame. If the data packet included in the data frame is a cellular network data packet, the AP may send the data frame to the eNB; or if the data packet included in the data frame is not a cellular network data packet, the AP may directly transmit the data frame to the Internet in this case.

The AP may send the data frame to the eNB by using a CAPWAP tunnel interface or an interface-Z between the AP and the eNB and according to the MAC address of the AP that is included in the CAPWAP header included in the data frame.

1202. The eNB receives the data frame sent by the UE by using the AP.

1203. The eNB determines that a data packet is a cellular network data packet according to indication information.

For example, a WiFi module of the eNB may receive the data frame sent by the UE by using the AP; after receiving the data frame, determine whether the data packet is a cellular network data packet according to the indication information in the 802.3 frame in the data frame, that is, determine whether the data packet is a cellular network data packet according to the type code; and after determining that the data packet is a cellular network data packet, transmit the data packet to an LTE module of the eNB. If the WiFi module of the eNB determines that the data packet is not a cellular network data packet, the WiFi module may directly transmit the data packet to the Internet.

Further, when there is at least one radio bearer on the UE, the data frame further includes bearer information used to indicate a radio bearer that is in the at least one radio bearer and that carries the data packet. Therefore, the WiFi module of the eNB may transmit the data packet to the LTE module, of the eNB, corresponding to the radio bearer according to the bearer information and a mapping relationship between the bearer information and the radio bearer that is in the at least one radio bearer and that carries the data packet.

In this embodiment, further optionally, after receiving the data frame sent by the UE, the AP first determines that the data packet included in the data frame is a cellular network data packet according to the indication information included in the data frame; in this case, after receiving the data frame, the eNB may directly process the data packet by using the cellular network protocol, that is, directly perform step 1204 without performing step 1203.

1204. The eNB processes the data packet by using a cellular network protocol.

It should be noted that this embodiment describes the technical solutions by using only an example that the eNB is the cellular radio access device, but does not limit the cellular radio access device. The cellular radio access device may be a network node such as an SRC, an RNC, or a radio network controller. This embodiment does not impose a specific limitation on the cellular radio access device herein.

It should be noted that for specific description of content in step 1201 to step 1204 in this embodiment, reference may be made to specific description of corresponding content in step 801 to step 805 in another embodiment. Details are not described herein in this embodiment.

In another application scenario, this embodiment provides another uplink offloading and converging method herein. In this application scenario, the eNB supports offloading at an IP layer; in this case, the data packet is an IP data packet an IP data packet. Specifically, the eNB receives the data frame sent by the UE by using the AP; in this case, the data frame includes the data packet that the UE needs to send to the eNB, where the data packet includes a source IP address and a destination IP address. In addition, in this case, the data frame does not include the indication information used to indicate that the data packet that the UE needs to send to the eNB is a cellular network data packet. Therefore, after receiving the data frame that includes the data packet, the eNB may determine, according to the destination IP address included in the data packet, whether the destination IP address is an address used to bear a cellular service. If the destination IP address is an address used to bear the cellular service, the eNB needs to process the data packet by using the cellular network protocol; or if the destination IP address is not an address used to bear the cellular service, the eNB directly transmits the data packet to the Internet in this case. This is specifically as follows: The WiFi module of the eNB determines, according to the destination IP address included in the data packet, whether the destination IP address is an address used to bear the cellular network service. If the destination IP address is an address used to bear the cellular network service, the WiFi module of the eNB transmits the data packet to the LTE module of the eNB, and the LTE module of the eNB processes the data packet by using the cellular network protocol; or if the destination IP address is not an address used to bear the cellular network service, the WiFi module of the eNB directly transmits the data packet to the Internet in this case. Alternatively, after receiving the data frame that includes the data packet, the eNB determines, according to the source IP address included in the data packet, whether the source IP address is assigned by a core network gateway. If the source IP address is assigned by the core network gateway, the eNB needs to process the data packet by using the cellular network protocol; or if the source IP address is not assigned by the core network gateway, the eNB directly transmits the data packet to the Internet in this case. This is specifically as follows: The WiFi module of the eNB determines, according to the source IP address included in the data packet, whether the source IP address is assigned by the core network gateway. If the source IP address is assigned by the core network gateway, the WiFi module of the eNB transmits the data packet to the LTE module of the eNB, and the LTE module of the eNB processes the data packet by using the cellular network protocol; or if the source IP address is not assigned by the core network gateway, the WiFi module of the eNB directly transmits the data packet to the Internet in this case. The data packet in the foregoing scenario refers to an IP data packet. When the data packet is an IP data packet and there is at least one radio bearer on the UE, bearer information of a radio bearer that carries the data packet needs to be added to the data frame. In this case, the bearer information may be an E-RABID or a TEID.

It should be noted that a difference between a specific implementation process of uplink offloading and converging in this application scenario and an implementation process of step 1201 to step 1204 in this embodiment is as follows: The UE does not add the indication information (that is, the data frame does not include the indication information used to indicate that the data packet is a cellular network data packet), but the eNB determines, according to the IP address included in the received data packet, whether it is necessary to process the data packet by using the cellular network protocol. Another implementation process is the same as an implementation process of corresponding content in step 1201 to step 1204. Therefore, for specific description of the implementation process in this application scenario, reference may be made to specific description of corresponding content in step 1201 to step 1204 in this embodiment. Details are not described herein in this embodiment.

In another application scenario, this embodiment provides another uplink offloading and converging method herein. In this application scenario, the eNB supports offloading at an IP layer; in this case, the data packet is an IP data packet an IP data packet. Specifically, the AP receives the data frame sent by the UE; in this case, the data frame includes the data packet that the UE needs to send to the eNB, where the data packet includes the source IP address and the destination IP address. In addition, in this case, the data frame does not include the indication information used to indicate that the data packet needing to be sent to the eNB is a cellular network data packet. Therefore, after receiving the data frame that includes the data packet, the AP may determine, according to the destination IP address included in the data packet, whether the destination IP address is an address used to bear the cellular service. If the destination IP address is an address used to bear the cellular service, the AP sends the data frame to the eNB, so that the eNB processes the data packet by using the cellular network protocol (specifically, when determining that the destination IP address is an address used to bear the cellular service, the AP directly sends the data frame to the LTE module of the eNB, so that the LTE module of the eNB processes the data packet by using the cellular network protocol); or if the destination IP address is not an address used to bear the cellular service, the AP directly transmits the data packet to the Internet in this case. Alternatively, after receiving the data frame that includes the data packet, the AP may determine, according to the source IP address included in the data packet, whether the source IP address is assigned by the core network gateway. If the source IP address is assigned by the core network gateway, the AP sends the data frame to the eNB, so that the eNB processes the data packet by using the cellular network protocol (specifically, when determining that the source IP address is assigned by the core network gateway, the AP directly sends the data frame to the LTE module of the eNB, so that the LTE module of the eNB processes the data packet by using the cellular network protocol); or if the source IP address is not assigned by the core network gateway, the AP directly transmits the data packet to the Internet in this case. The data packet in the foregoing scenario refers to an IP data packet.

It should be noted that a difference between a specific implementation process of uplink offloading and converging in this application scenario and an implementation process of step 1201 to step 1204 in this embodiment is as follows: The UE does not add the indication information (that is, the data frame does not include the indication information used to indicate that the data packet is a cellular network data packet), but the AP determines whether the data packet is a cellular network data packet according to the IP address included in the received data packet. Another implementation process is the same as an implementation process of corresponding content in step 1201 to step 1204. Therefore, for specific description of the implementation process in this application scenario, reference may be made to specific description of corresponding content in step 1201 to step 1204 in this embodiment. Details are not described herein in this embodiment.

It should be noted that in this embodiment, the eNB is integrated with a function of an AC, that is, the eNB and the AC are a same node or a same physical entity.

According to the uplink offloading and converging method provided in this embodiment, when determining to offload data of UE in a cellular network to a non-cellular network, the UE sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 16:
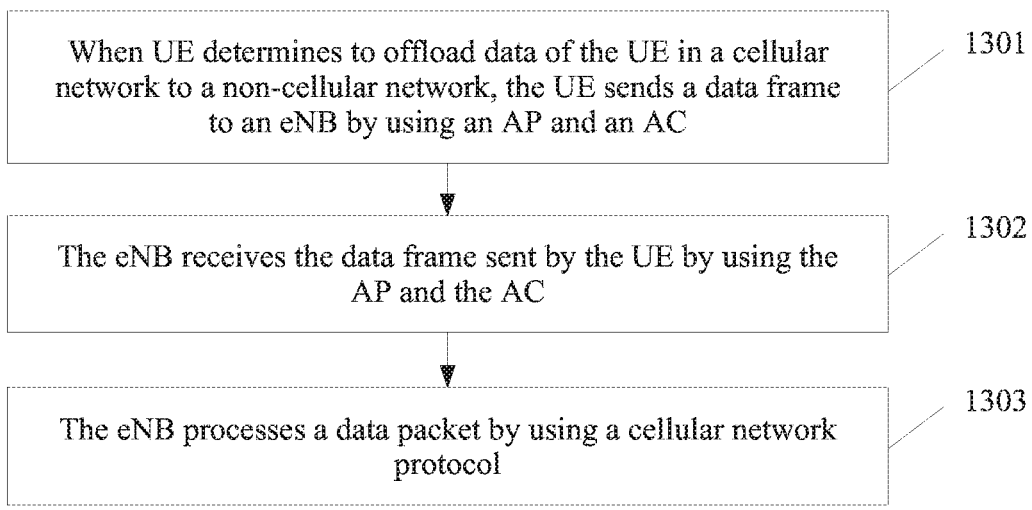
FIG. 16 is a flowchart of an uplink offloading and converging method according to another embodiment.

Another embodiment provides an uplink offloading and converging method, where the method is applied to a wireless communications system that includes an eNB (cellular radio access device) and an AP (non-cellular radio access device). In addition, that indication information used to indicate that a data packet is a cellular network data packet is type code of the data packet is used as an example for specific description herein in this embodiment. The data packet is a data packet that UE needs to send to the eNB. As shown in FIG. 16, the method may include the following steps.

1301. When the UE determines to offload data of the UE in a cellular network to a non-cellular network, the UE sends a data frame to the eNB by using the AP and an AC.

The data frame includes the data packet that the UE needs to send to the eNB, and the indication information used to indicate that the data packet is a cellular network data packet, where the indication information is used by the eNB to process the data packet by using a cellular network protocol. The cellular network data packet includes a PDCP data packet or an RLC data packet. When determining to offload the data of the UE in the cellular network to the non-cellular network, and needing to send a data packet to the eNB, the UE may generate a data frame that carries the data packet, and first send the generated data frame to the AP; then, the AP sends the data frame to the eNB by using the AC.

For example, the UE may generate the data frame by assembling a MAC header of an 802.11 frame, the indication information, and the data packet, and send the data frame to the AP. A data encapsulation format during data transmission between the UE and the AP is different from a data encapsulation format during data transmission between the AP and the AC. Therefore, after receiving the data frame sent by the UE, the AP needs to convert an encapsulation format of the data frame and sends the data frame to the AC after the conversion, and the AC sends the data frame to the eNB.

For example, the AP may generate an 802.3 frame by assembling a MAC address of the eNB, a MAC address of the UE, the data packet, and the indication information that are included in the data frame; generate a data frame by reassembling the generated 802.3 frame and a CAPWAP header; and then send the data frame to the AC, so that the AC sends the data frame to the eNB.

In this embodiment, further optionally, after receiving the data frame sent by the UE, the AP may determine whether the data packet included in the data frame is a cellular network data packet according to the indication information included in the data frame. If the data packet included in the data frame is a cellular network data packet, the AP may send the data frame to the AC, and the AC sends the data frame to the eNB; or if the data packet included in the data frame is not a cellular network data packet, the AP may directly transmit the data frame to the Internet in this case.

The AP may send the data frame to the AC by using a CAPWAP tunnel interface between the AP and the AC; after receiving the data frame, the AC may send the data frame to the eNB by using a CAPWAP tunnel interface or an interface-Z between the AC and the eNB.

Further, in an application scenario in this embodiment, if the data frame is sent to the AC after the AP determines that the data packet is a cellular network data packet according to the indication information, the AC may directly send the data frame to the eNB in this case. Alternatively, in an application scenario in this embodiment, if the AP does not determine whether the data packet included in the data frame is a cellular network data packet, after receiving the data packet in this case, the AC send the data frame to the eNB after determining that the data packet included in the data frame is a cellular network data packet according to the indication information. In addition, in this application scenario, if the AC determines that the data packet included in the data frame is not a cellular network data packet, the AC may directly transmit the data frame to the Internet in this case.

1302. The eNB receives the data frame sent by the UE by using the AP and the AC.

1303. The eNB processes a data packet by using a cellular network protocol.

It should be noted that this embodiment describes the technical solutions of the present embodiments by using only an example that the eNB is the cellular radio access device, but does not limit the cellular radio access device. The cellular radio access device may be a network node such as an SRC, an RNC, or a radio network controller. This embodiment of the present embodiments does not impose a specific limitation on the cellular radio access device herein.

It should be noted that for specific description of content in step 1301 to step 1303 in this embodiment, reference may be made to specific description of corresponding content in step 1201 to step 1204 in another embodiment. Details are not described herein in this embodiment.

According to the uplink offloading and converging method provided in this embodiment, when determining to offload data of UE in a cellular network to a non-cellular network, the UE sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 17:
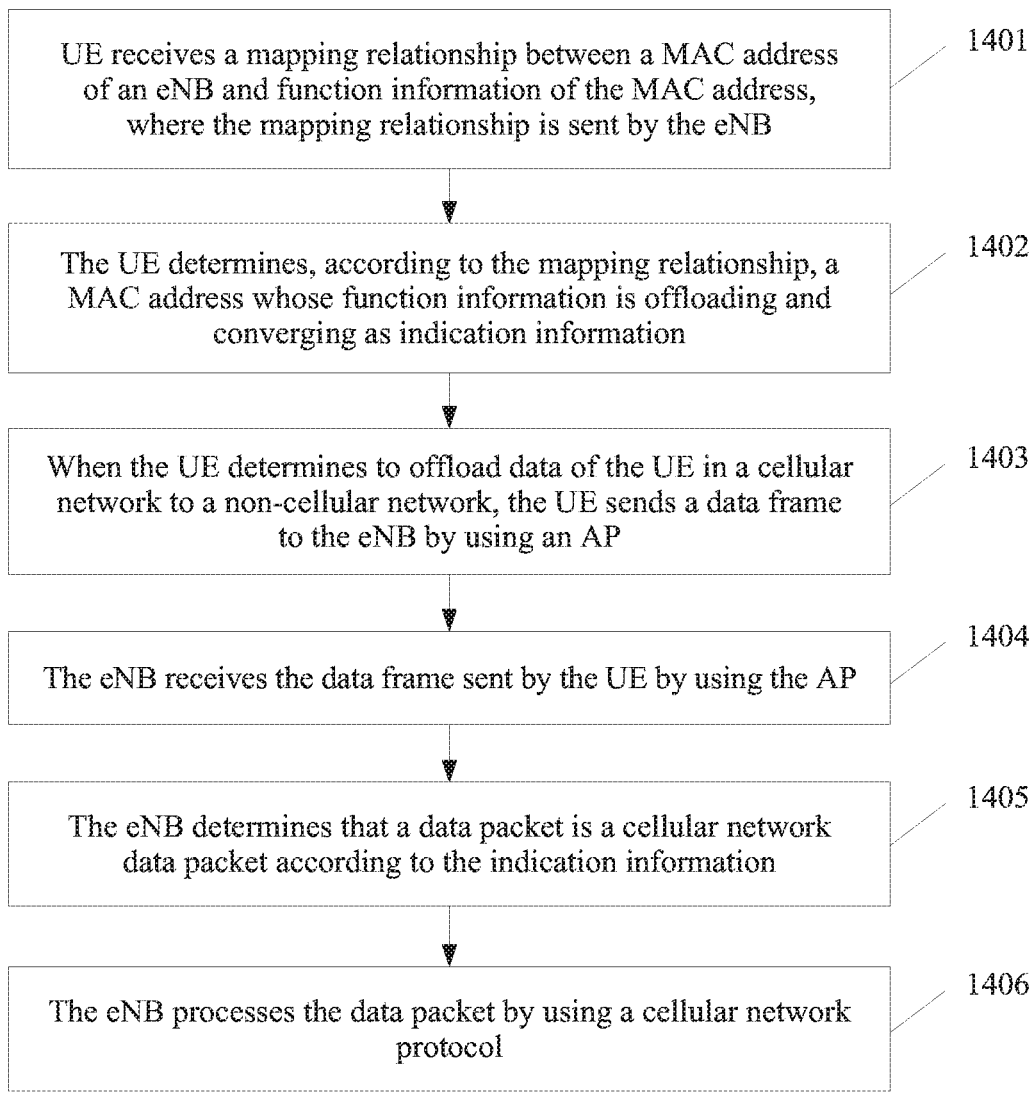
FIG. 17 is a flowchart of an uplink offloading and converging method according to another embodiment.

Another embodiment provides an uplink offloading and converging method, where the method is applied to a wireless communications system that includes an eNB (cellular radio access device) and an AP (non-cellular radio access device). In addition, that indication information used to indicate that a data packet is a cellular network data packet is address information of the eNB is used as an example for description herein in this embodiment. The data packet is a data packet that UE needs to send to the eNB. As shown in FIG. 17, the method may include the following steps.

1401. The UE receives a mapping relationship between a MAC address of the eNB and function information of the MAC address, where the mapping relationship is sent by the eNB.

In this embodiment, the eNB may support at least two MAC addresses, and there is a mapping relationship between each MAC address and function information of the MAC address. The function information includes offloading and converging. For example, the eNB supports two MAC addresses, a function of MAC address 1 is a local breakout address, and a function of MAC address 2 is offloading and converging.

1402. The UE determines, according to the mapping relationship, a MAC address whose function information is offloading and converging as the indication information.

Because the UE determines that it is necessary to offload data of the UE in a cellular network to a non-cellular network, the UE needs to determine a MAC address whose function information is offloading and converging as the indication information.

1403. When the UE determines to offload data of the UE in a cellular network to a non-cellular network, the UE sends a data frame to the eNB by using the AP.

The data frame includes the data packet that the UE needs to send to the eNB, and the indication information used to indicate that the data packet is a cellular network data packet, where the indication information is used by the eNB to process the data packet by using a cellular network protocol. When determining to offload the data of the UE in the cellular network to the non-cellular network, and needing to send a data packet to the eNB, after determining the indication information, the UE may generate a data frame that carries the data packet, and send the generated data frame to the eNB by using the AP.

For example, the UE may generate the data frame by assembling a MAC header of an 802.11 frame and the data packet. The MAC header of the 802.11 frame includes the indication information, and the indication information is the address information of the eNB (that is, a MAC address, of the eNB, whose function information is offloading and converging). Specifically, after determining the indication information (the MAC address, of the eNB, whose function information is offloading and converging), the UE may fill the indication information (the MAC address, of the eNB, whose function information is offloading and converging, where the indication information may be used as a destination address specified in the IEEE 802.11 standard) in address bit 3 in the MAC header of the 802.11 frame; fill a source address, that is, a MAC address of the UE, in address bit 2 in the MAC header of the 802.11 frame; fill identification information of the AP in address bit 1 in the MAC header of the 802.11 frame; fill other fields according to stipulation of the IEEE 802.11 standard, so as to finally generate the MAC header of the 802.11 frame; then can generate the data frame by assembling the MAC header of the 802.11 frame and the data packet according to the stipulation of the IEEE 802.11 standard; and send the generated data frame to the eNB by using the AP.

In this embodiment, further, when there is at least one radio bearer on the UE, bearer information used to indicate a radio bearer that is in the at least one radio bearer and that carries the data packet needs to be added to the data frame shown in FIG. 11. The bearer information may be a mapping value corresponding to the radio bearer that is in the at least one radio bearer and that carries the data packet. In a possible implementation manner, the bearer information (such as a mapping value) used to indicate the radio bearer that is in the at least one radio bearer and that carries the data packet may be added to the MAC header of the 802.11 frame. Specifically, the bearer information may be filled in a field in the MAC header of the 802.11 frame. For example, the bearer information is filled in a type reserved field in a frame control field in the MAC header of the 802.11 frame. In the prior art, reserved field has 16 optional values 0000 to 1111, and DRB ID has eight optional values. For example, a type/subtype (Type/subType) value or range corresponding to a radio bearer may be provided. For example, DRB IDo is corresponding to 0000. In another possible implementation manner, a new field may be added to the data frame, and the field includes the bearer information used to indicate the radio bearer that is in the at least one radio bearer and that carries the data packet. In another possible implementation manner, the bearer information used to indicate the radio bearer that is in the at least one radio bearer and that carries the data packet may be added to the address field in the MAC header of the 802.11 frame. For example, eight MAC addresses are extended, mapping is performed between radio bearers and the MAC addresses, and then the bearer information used to indicate the radio bearer that is in the at least one radio bearer and that carries the data packet is filled in the address field.

A data encapsulation format during data transmission between the UE and the AP is different from a data encapsulation format during data transmission between the AP and the eNB. Therefore, after receiving the data frame sent by the UE, the AP needs to convert an encapsulation format of the data frame and sends the data frame to the eNB after the conversion.

For example, the AP may generate an 802.3 frame by assembling the indication information, the MAC address of the UE, and the data packet that are included in the data frame; generate a data frame by reassembling the generated 802.3 frame and a CAPWAP header; and then send the data frame to the eNB.

According to the received data frame, the AP may copy the indication information (the MAC address, of the eNB, whose function information is offloading and converging) and the MAC address of the UE that are in the MAC header of the 802.11 frame included in the data frame; and then generate the 802.3 frame by assembling the indication information, the MAC address of the UE, and the data packet according to stipulations of the IEEE 802.3 standard. Specifically, the AP copies the indication information (the MAC address, of the eNB, whose function information is offloading and converging) filled in address bit 3 in the MAC header of the 802.11 frame, to a destination address field in the 802.3 frame; copies the MAC address of the UE that is filled in address bit 2 in the MAC header of the 802.11 frame, to a source address field in the 802.3 frame; and copies the data packet to a data packet field in the 802.3 frame, so as to finally generate the 802.3 frame. After generating the 802.3 frame, the AP generates the data frame shown in FIG. 9 by reassembling the 802.3 frame and the CAPWAP header, where the CAPWAP header may include a MAC address of the AP.

Further, when there is at least one radio bearer on the UE, the bearer information that is included in the data frame shown in FIG. 11 and that is used to indicate the radio bearer that is in the at least one radio bearer and that carries the data packet needs to be mapped to the data frame shown in FIG. 9. When the bearer information (such as a mapping value) used to indicate the radio bearer that is in the at least one radio bearer and that carries the data packet is added to the MAC header of the 802.11 frame, the AP may map the bearer information to a field, included in the CAPWAP header, shown in FIG. 10. For example, a value of Reserved may be extended, so that the bearer information can be mapped to the Reserved field; or a data field in a wireless specific information field may be extended. When a new field is added to the data frame, and the field includes the bearer information used to indicate the radio bearer that is in the at least one radio bearer and that carries the data packet, a new field may be added to the 802.3 frame, and the bearer information is mapped to the newly added field in the 802.3 frame. When the bearer information used to indicate the radio bearer that is in the at least one radio bearer and that carries the data packet is added to the address field in the MAC header of the 802.11 frame, the bearer information may be mapped to the address field in the 802.3 frame in this case. The bearer information may be a MAC address or another value that can uniquely identify the radio bearer that carries the data packet.

In this embodiment, further optionally, after receiving the data frame sent by the UE, the AP may determine whether the data packet included in the data frame is a cellular network data packet according to the indication information included in the data frame. If the data packet included in the data frame is a cellular network data packet, the AP may send the data frame to the eNB; or if the data packet included in the data frame is not a cellular network data packet, the AP may directly transmit the data frame to the Internet in this case.

The AP may send the data frame to the eNB by using a CAPWAP tunnel interface or an interface-Z between the AP and the eNB.

1404. The eNB receives the data frame sent by the UE by using the AP.

1405. The eNB determines that a data packet is a cellular network data packet according to indication information.

For example, a WiFi module of the eNB may receive the data frame sent by the UE by using the AP; after receiving the data frame, determine whether the data packet is a cellular network data packet according to the destination address (that is, the indication information) in the 802.3 frame in the data frame and a mapping relationship between the MAC address and a function of the MAC address, that is, determine whether the destination address in the 802.3 frame is the MAC address, of the eNB, whose function information is offloading and converging; and after determining that the data packet is a cellular network data packet (that is, determining that the destination address is the MAC address, of the eNB, whose function is offloading and converging), transmit the data packet to an LTE module of the eNB. If the WiFi module of the eNB determines that the data packet is not a cellular network data packet (that is, determines that the destination address is not the MAC address, of the eNB, whose function information is offloading and converging), the WiFi module may directly transmit the data packet to the Internet.

Further, when there is at least one radio bearer on the UE, the data frame further includes bearer information used to indicate a radio bearer that is in the at least one radio bearer and that carries the data packet. Therefore, the WiFi module of the eNB may transmit the data packet to the LTE module, of the eNB, corresponding to the radio bearer according to the bearer information and a mapping relationship between the bearer information and the radio bearer that is in the at least one radio bearer and that carries the data packet.

In this embodiment, further optionally, after receiving the data frame sent by the UE, the AP first determines that the data packet included in the data frame is a cellular network data packet according to the indication information included in the data frame; in this case, after receiving the data frame, the eNB may directly process the data packet by using the cellular network protocol, that is, directly perform step 1406 without performing step 1405.

1406. The eNB processes the data packet by using a cellular network protocol.

It should be noted that this embodiment describes the technical solutions by using only an example that the eNB is the cellular radio access device, but does not limit the cellular radio access device. The cellular radio access device may be a network node such as an SRC, an RNC, or a radio network controller. This embodiment does not impose a specific limitation on the cellular radio access device herein.

It should be noted that for specific description of content in step 1401 to step 1406 in this embodiment, reference may be made to specific description of corresponding content in step 1201 to step 1204 in another embodiment. Details are not described herein in this embodiment.

It should be noted that in this embodiment, the eNB is integrated with a function of an AC, that is, the eNB and the AC are a same node or a same physical entity.

According to the uplink offloading and converging method provided in this embodiment, when determining to offload data of UE in a cellular network to a non-cellular network, the UE sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 18:
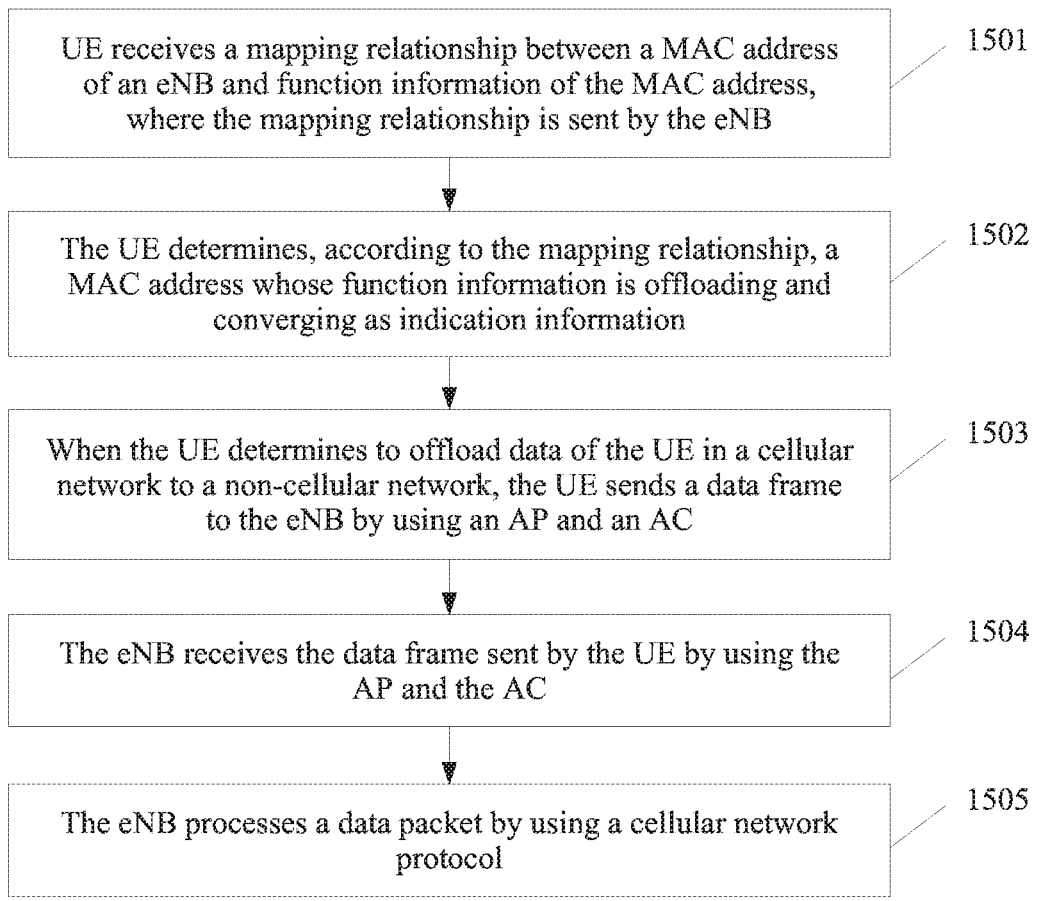
FIG. 18 is a flowchart of an uplink offloading and converging method according to another embodiment.

Another embodiment provides an uplink offloading and converging method, where the method is applied to a wireless communications system that includes an eNB (cellular radio access device) and an AP (non-cellular radio access device). In addition, that indication information used to indicate that a data packet is a cellular network data packet is address information of the eNB is used as an example for specific description herein in this embodiment. The data packet is a data packet that UE needs to send to the eNB. As shown in FIG. 18, the method may include the following steps.

1501. The UE receives a mapping relationship between a MAC address of the eNB and function information of the MAC address, where the mapping relationship is sent by the eNB.

1502. The UE determines, according to the mapping relationship, a MAC address whose function information is offloading and converging as the indication information.

1503. When the UE determines to offload data of the UE in a cellular network to a non-cellular network, the UE sends a data frame to the eNB by using the AP and an AC.

The data frame includes the data packet that the UE needs to send to the eNB, and the indication information used to indicate that the data packet is a cellular network data packet, where the indication information is used by the eNB to process the data packet by using a cellular network protocol. When determining to offload the data of the UE in the cellular network to the non-cellular network, and needing to send a data packet to the eNB, after determining the indication information, the UE may generate a data frame that carries the data packet, and send the generated data frame to the eNB by using the AP and the AC.

For example, the UE may generate the data frame by assembling a MAC header of an 802.11 frame and the data packet, and send the generated data frame to the eNB by using the AP and the AC.

A data encapsulation format during data transmission between the UE and the AP is different from a data encapsulation format during data transmission between the AP and the AC. Therefore, after receiving the data frame sent by the UE, the AP needs to convert an encapsulation format of the data frame and sends the data frame to the AC after the conversion, and the AC sends the data frame to the eNB.

For example, the AP may generate an 802.3 frame by assembling the indication information, a MAC address of the UE, and the data packet that are included in the data frame; generate a data frame by reassembling the 802.3 frame and a CAPWAP header; and then send the data frame to the AC, so that the AC sends the data frame to the eNB.

In this embodiment, further optionally, after receiving the data frame sent by the UE, the AP may determine whether the data packet included in the data frame is a cellular network data packet according to the indication information included in the data frame. If the data packet included in the data frame is a cellular network data packet, the AP may send the data frame to the eNB by using the AC; or if the data packet included in the data frame is not a cellular network data packet, the AP may directly transmit the data frame to the Internet in this case.

The AP may send the data frame to the AC by using a CAPWAP tunnel interface between the AP and the AC; after receiving the data frame, the AC may send the data frame to the eNB by using a CAPWAP tunnel interface or an interface-Z between the AC and the eNB.

In an application scenario in this embodiment, if the data frame is sent to the AC after the AP determines that the data packet is a cellular network data packet according to the indication information, the AC may directly send the data frame to the eNB in this case. Alternatively, in an application scenario in this embodiment, if the AP does not determine whether the data packet included in the data frame is a cellular network data packet, after receiving the data packet in this case, the AC send the data frame to the eNB after determining that the data packet included in the data frame is a cellular network data packet according to the indication information. In addition, in this application scenario, if the AC determines that the data packet included in the data frame is not a cellular network data packet, the AC may directly transmit the data frame to the Internet in this case.

1504. The eNB receives the data frame sent by the UE by using the AP and the AC.

1505. The eNB processes a data packet by using a cellular network protocol.

It should be noted that this embodiment describes the technical solutions of the present embodiments by using only an example that the eNB is the cellular radio access device, but does not limit the cellular radio access device. The cellular radio access device may be a network node such as an SRC, an RNC, or a radio network controller. This embodiment does not impose a specific limitation on the cellular radio access device herein.

It should be noted that for specific description of content in step 1501 to step 1505 in this embodiment, reference may be made to specific description of corresponding content in step 1401 to step 1406 in another embodiment. Details are not described herein in this embodiment.

According to the offloading and converging method provided in this embodiment, when determining to offload data of UE in a cellular network to a non-cellular network, the UE sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 19:
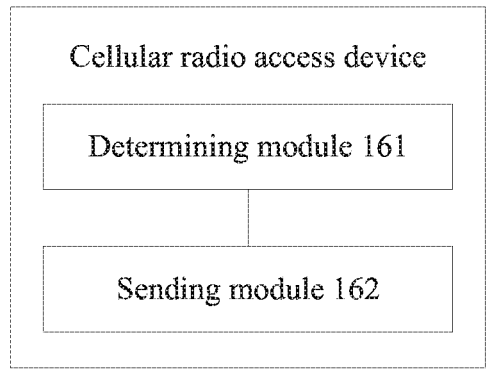
FIG. 19 is a schematic composition diagram of a cellular radio access device according to another embodiment.

Another embodiment provides a cellular radio access device, where the cellular radio access device is applied to a wireless communications system, where the wireless communications system further includes a non-cellular radio access device. As shown in FIG. 19, the cellular radio access device includes a determining module 161 and a sending module 162.

The determining module 161 is configured to determine to offload data, in a cellular network, of a UE served by the cellular radio access device to a non-cellular network; and the sending module 162 is configured to send, by using the non-cellular radio access device, a data frame to the UE served by the cellular radio access device.

The data frame includes a data packet that the cellular radio access device needs to send to the UE, and indication information used to indicate that the data packet is a cellular network data packet, where the indication information is used by the UE to process the data packet by using a cellular network protocol according to the indication information.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

In this embodiment, further optionally, the sending module 162 is further configured to send a mapping relationship between the bearer information and the radio bearer that is in the at least one radio bearer and that carries the data packet, to the UE by using an air interface message.

In this embodiment, further optionally, the cellular network data packet includes a PDCP data packet or a RLC data packet.

It should be noted that for specific working processes of function modules in the cellular radio access device provided in this embodiment, reference may be made to specific description of corresponding processes in a method embodiment. Details are not described herein in this embodiment.

After determining to offload data, in a cellular network, of UE served by the cellular radio access device to a non-cellular network, the cellular radio access device provided in this embodiment sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 20:
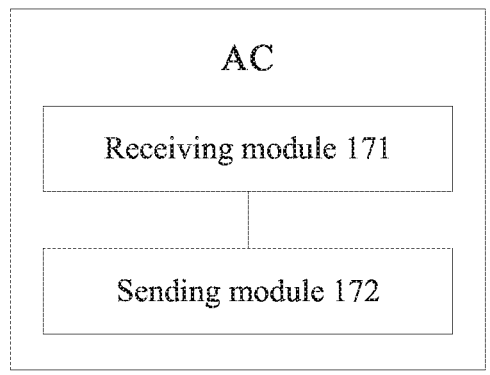
FIG. 20 is a schematic composition diagram of an AC according to another embodiment.

Another embodiment provides an AC, where the access controller AC is applied to a wireless communications system that includes a cellular radio access device and a non-cellular radio access device. As shown in FIG. 20, the AC includes a receiving module 171 and a sending module 172.

The receiving module 171 is configured to receive a data packet that is sent by the cellular radio access device and that the cellular radio access device needs to send to a UE; and the sending module 172 is configured to send a data frame to the UE by using the non-cellular radio access device.

The data frame includes the data packet that the cellular radio access device needs to send to the UE, and indication information used to indicate that the data packet is a cellular network data packet, where the indication information is used by the UE to process the data packet by using a cellular network protocol according to the indication information.

In this embodiment, further optionally, the indication information is address information of the cellular radio access device.

In this embodiment, further optionally, the receiving module 171 is further configured to: before the sending module 172 sends the data frame to the UE by using the non-cellular radio access device, receive identification information of the non-cellular radio access device that is sent by the cellular radio access device, where the identification information is used by the AC to determine the non-cellular radio access device.

In this embodiment, further optionally, the data packet is included in an 802.3 frame.

Figure 21:
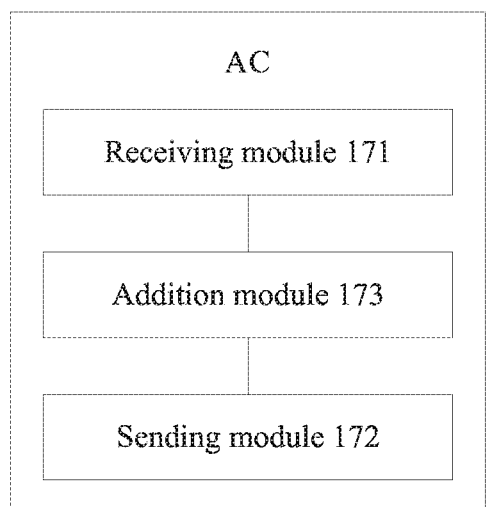
FIG. 21 is a schematic composition diagram of another AC according to another embodiment.

As shown in FIG. 21, the AC further includes an addition module 173.

The addition module 173 is configured to: before the sending module 172 sends the data frame to the UE by using the non-cellular radio access device, add the data packet included in the 802.3 frame to the data frame.

In this embodiment, further optionally, the identification information of the non-cellular radio access device is a MAC address of the non-cellular radio access device, a BSSID of the non-cellular radio access device, or a service set identifier (SSID) of the non-cellular radio access device.

In this embodiment, further optionally, when there is at least one radio bearer on the UE, the data frame further includes bearer information used to indicate a radio bearer that is in the at least one radio bearer and that carries the data packet.

In this embodiment, further optionally, the sending module 172 is further configured to send a mapping relationship between the bearer information and the radio bearer that is in the at least one radio bearer and that carries the data packet, to the UE by using the cellular radio access device.

In this embodiment, further optionally, the cellular network data packet includes a PDCP data packet or a RLC data packet.

It should be noted that for specific working processes of function modules in the AC provided in this embodiment, reference may be made to specific description of corresponding processes in a method embodiment. Details are not described herein in this embodiment.

After receiving a data packet that is sent by a cellular radio access device and that the cellular radio access device needs to send to UE, the AC provided in this embodiment may add, to a data frame, the data packet and indication formation used to indicate that the data packet is a cellular network data packet, and send the data frame to the UE by using a non-cellular radio access device. Because the data frame includes the indication information used to indicate that the data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 22:
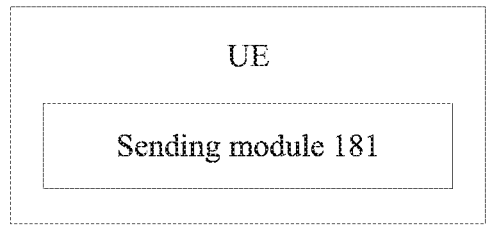
FIG. 22 is a schematic composition diagram of UE according to another embodiment.

Another embodiment provides a UE, where the UE is applied to a wireless communications system that includes a cellular radio access device and a non-cellular radio access device. As shown in FIG. 22, the UE includes a sending module 181.

The sending module 181 is configured to: when it is determined to offload data of the UE in a cellular network to a non-cellular network, send a data frame to the cellular radio access device by using the non-cellular radio access device.

The data frame includes a data packet that the UE needs to send to the cellular radio access device, and indication information used to indicate that the data packet is a cellular network data packet, where the indication information is used by the cellular radio access device to process the data packet by using a cellular network protocol.

In this embodiment, further optionally, the indication information is address information of the cellular radio access device.

Figure 23:
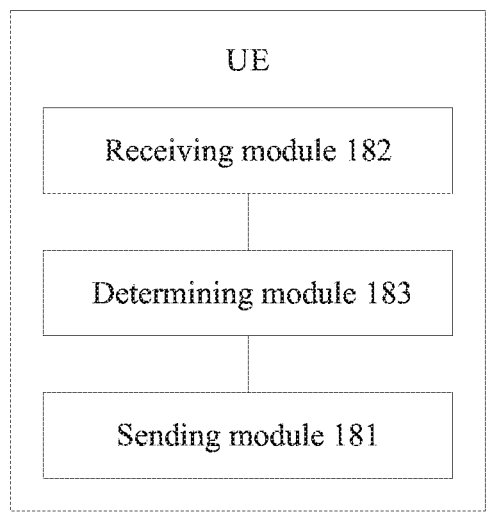
FIG. 23 is a schematic composition diagram of another UE according to another embodiment.

In this embodiment, further optionally, as shown in FIG. 23, the UE further includes: a receiving module 182 and a determining module 183.

The receiving module 182 is configured to: before the sending module 181 sends the data frame to the cellular radio access device by using the non-cellular radio access device, receive a mapping relationship between a MAC address of the cellular radio access device and function information of the MAC address, where the mapping relationship is sent by the cellular radio access device, and the function information includes offloading and converging; and the determining module 183 is configured to: determine, according to the mapping relationship received by the receiving module 182, a MAC address whose function information is offloading and converging as the indication information.

In this embodiment, further optionally, when there is at least one radio bearer on the UE, the data frame further includes bearer information used to indicate a radio bearer that is in the at least one radio bearer and that carries the data packet.

In this embodiment, further optionally, the cellular network data packet includes a PDCP data packet or a RLC data packet.

It should be noted that for specific working processes of function modules in the UE provided in this embodiment, reference may be made to specific description of corresponding processes in a method embodiment. Details are not described herein in this embodiment.

When determining to offload data of the UE in a cellular network to a non-cellular network, the UE provided in this embodiment sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 24:
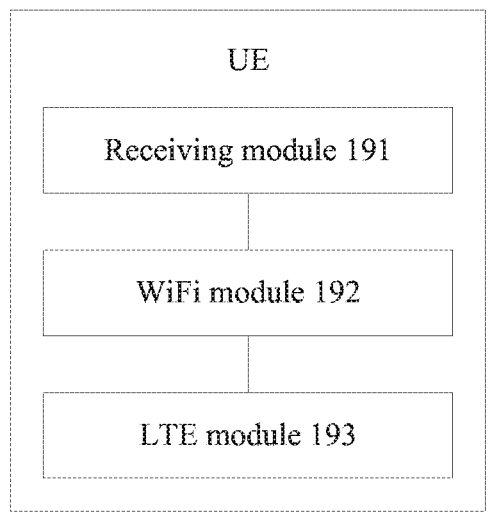
FIG. 24 is a schematic composition diagram of UE according to another embodiment.

Another embodiment provides a UE, where the UE is applied to a wireless communications system that includes a cellular radio access device and a non-cellular radio access device. As shown in FIG. 24, the UE includes a receiving module 191, a WiFi module 192, and an LTE module 193.

The receiving module 191 is configured to: receive a data frame sent by the cellular radio access device by using the non-cellular radio access device, where the data frame is sent after the cellular radio access device determines to offload data of the UE in a cellular network to a non-cellular network, and the data frame includes a data packet that the cellular radio access device needs to send to the UE, and indication information used to indicate that the data packet is a cellular network data packet; the WiFi module 192 is configured to determine that the data packet is the cellular network data packet according to the indication information and send the data packet to the LTE module 193; and the LTE module 193 is configured to receive the data packet sent by the WiFi module 192 and process the data packet by using a cellular network protocol.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

The receiving module 191 is further configured to: before the LTE module 193 processes the data packet by using the cellular network protocol, receive a mapping relationship between the bearer information and the radio bearer that is in the at least one radio bearer and that carries the data packet, where the mapping relationship is sent by the cellular radio access device by using an air interface message; and the WiFi module 192 is specifically configured to transmit the data packet to the LTE module 193 corresponding to the radio bearer according to the mapping relationship and the bearer information that are received by the receiving module 191.

In this embodiment, further optionally, the cellular network data packet includes a PDCP data packet or a RLC data packet.

It should be noted that for specific working processes of function modules in the UE provided in this embodiment, reference may be made to specific description of corresponding processes in a method embodiment. Details are not described herein in this embodiment.

According to the UE provided in this embodiment, after determining to offload data, in a cellular network, of the UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may determine that the data packet is a cellular network data packet according to the indication information, and process the data packet by using a cellular network protocol. The indication information is used to indicate that the data packet is a cellular network data packet, so that the UE processes the data packet by using the cellular network protocol. Therefore, service continuity is ensured, thereby improving service quality and user experience.

Figure 25:
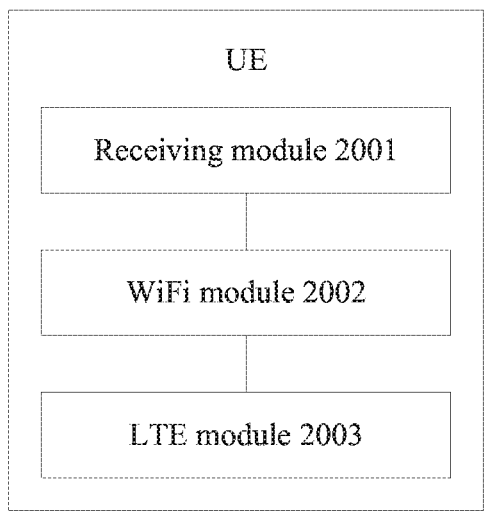
FIG. 25 is a schematic composition diagram of UE according to another embodiment.

Another embodiment provides a UE, where the UE is applied to a wireless communications system that includes a cellular radio access device and a non-cellular radio access device. As shown in FIG. 25, the UE includes a receiving module 2001, a WiFi module 2002, and an LTE module 2003.

The receiving module 2001 is configured to receive a data frame sent by an AC by using the non-cellular radio access device, where the data frame is sent after the AC receives a data packet that is sent by the cellular radio access device and that the cellular radio access device needs to send to the UE, and the data frame includes the data packet that the cellular radio access device needs to send to the UE, and indication information used to indicate that the data packet is a cellular network data packet; the WiFi module 2002 is configured to determine that the data packet is the cellular network data packet according to the indication information and send the data packet to the LTE module 2003; and the LTE module 2003 is configured to receive the data packet sent by the WiFi module 2002 and process the data packet by using a cellular network protocol.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

The receiving module 2001 is further configured to: before the LTE module 2003 processes the data packet by using the cellular network protocol, receive a mapping relationship between the bearer information and the radio bearer that is in the at least one radio bearer and that carries the data packet, where the mapping relationship is sent by the AC by using the cellular radio access device; and the WiFi module 2002 is specifically configured to transmit the data packet to the LTE module 2003 corresponding to the radio bearer according to the mapping relationship and the bearer information that are received by the receiving module 2001.

In this embodiment, further optionally, the cellular network data packet includes a PDCP data packet or a RLC data packet.

It should be noted that for specific working processes of function modules in the UE provided in this embodiment, reference may be made to specific description of corresponding processes in a method embodiment. Details are not described herein in this embodiment.

According to the UE provided in this embodiment, after determining to offload data, in a cellular network, of the UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may determine that the data packet is a cellular network data packet according to the indication information, and process the data packet by using a cellular network protocol. The indication information is used to indicate that the data packet is a cellular network data packet, so that the UE processes the data packet by using the cellular network protocol. Therefore, service continuity is ensured, thereby improving service quality and user experience.

Figure 26:
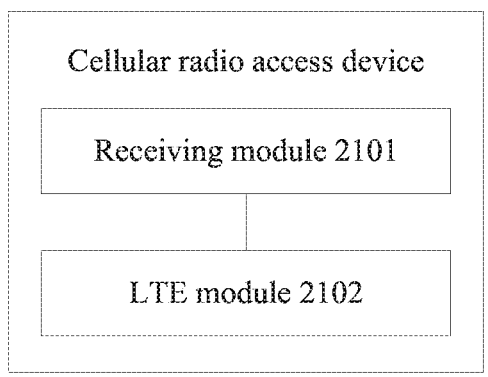
FIG. 26 is a schematic composition diagram of a cellular radio access device according to another embodiment.

Another embodiment provides a cellular radio access device, where the cellular radio access device is applied to a wireless communications system, and the wireless communications system further includes a non-cellular radio access device. As shown in FIG. 26, the cellular radio access device includes a receiving module 2101 and an LTE module 2102.

The receiving module 2101 is configured to receive a data frame sent by a UE by using the non-cellular radio access device, where the data frame is sent when the UE determines to offload data of the UE in a cellular network to a non-cellular network, and the data frame includes a data packet that the UE needs to send to the cellular radio access device, and indication information used to indicate that the data packet is a cellular network data packet; and the LTE module 2102 is configured to process the data packet by using a cellular network protocol.

In this embodiment, further optionally, the indication information is address information of the cellular radio access device.

Figure 27:
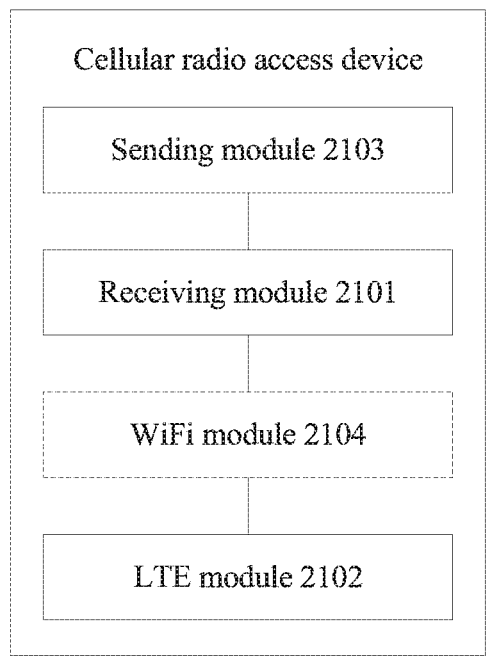
FIG. 27 is a schematic composition diagram of another cellular radio access device according to another embodiment.

In this embodiment, further optionally, as shown in FIG. 27, the cellular radio access device may further include a sending module 2103.

The sending module 2103 is configured to: before the receiving module 2101 receives the data frame sent by the UE by using the non-cellular radio access device, send a mapping relationship between a MAC address of the cellular radio access device and function information of the MAC address to the UE, where the function information includes offloading and converging.

In this embodiment, further optionally, the data frame is sent after the non-cellular radio access device determines that the data packet is the cellular network data packet; or the cellular radio access device may further include a WiFi module 2104.

The WiFi module 2104 is configured to: before the LTE module 2102 processes the data packet by using the cellular network protocol, determine that the data packet is the cellular network data packet according to the indication information, and send the data packet to the LTE module 2102.

In this embodiment, further optionally, when there is at least one radio bearer on the UE, the data frame further includes bearer information used to indicate a radio bearer that is in the at least one radio bearer and that carries the data packet.

The WiFi module 2104 is specifically configured to send the data packet to the LTE module 2102 corresponding to the radio bearer according to the bearer information and a mapping relationship between the bearer information and the radio bearer that is in the at least one radio bearer and that carries the data packet.

In this embodiment, further optionally, the cellular network data packet includes a PDCP data packet or a RLC data packet.

It should be noted that for specific working processes of function modules in the cellular radio access device provided in this embodiment, reference may be made to specific description of corresponding processes in a method embodiment. Details are not described herein in this embodiment.

According to the cellular radio access device provided in this embodiment, when determining to offload data of UE in a cellular network to a non-cellular network, the UE sends a data frame to the cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 28:
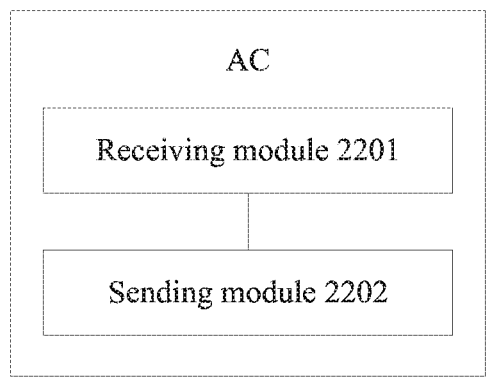
FIG. 28 is a schematic composition diagram of an AC according to another embodiment.

Another embodiment provides an AC, where the access controller AC is applied to a wireless communications system that includes a cellular radio access device and a non-cellular radio access device. As shown in FIG. 28, the AC includes a receiving module 2201 and a sending module 2202.

The receiving module 2201 is configured to receive a data frame sent by a UE by using the non-cellular radio access device, where the data frame is sent when the UE determines to offload data of the UE in a cellular network to a non-cellular network, the data frame includes a data packet that the UE needs to send to the cellular radio access device, and indication information used to indicate that the data packet is a cellular network data packet, and the indication information is used by the cellular radio access device to process the data packet by using a cellular network protocol; and the sending module 2202 is configured to: after it is determined that the data packet is the cellular network data packet according to the indication information, send the data frame to the cellular radio access device; or send the data frame to the cellular radio access device, where the data frame is sent to the AC by the non-cellular radio access device after determining that the data packet is the cellular network data packet according to the indication information.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

In this embodiment, further optionally, the cellular network data packet includes a PDCP data packet or a RLC data packet.

It should be noted that for specific working processes of function modules in the AC provided in this embodiment, reference may be made to specific description of corresponding processes in a method embodiment. Details are not described herein in this embodiment.

After receiving a data frame sent by UE by using a non-cellular radio access device, the AC provided in this embodiment may send the data frame to a cellular radio access device after determining that a data packet is a cellular network data packet according to indication information; or may directly send the data frame to a cellular radio access device. Because the data frame is sent to the cellular radio access device by the AC or the non-cellular radio access device after determining that the data packet included in the data frame is a cellular network data packet, after receiving the data frame, the cellular radio access device needs to process the data packet by using a cellular network protocol. The indication information is used to indicate that the data packet is a cellular network data packet, so that the cellular radio access device can process the data packet by using the cellular network protocol.

Therefore, service continuity is ensured, thereby improving service quality and user experience.

Figure 29:
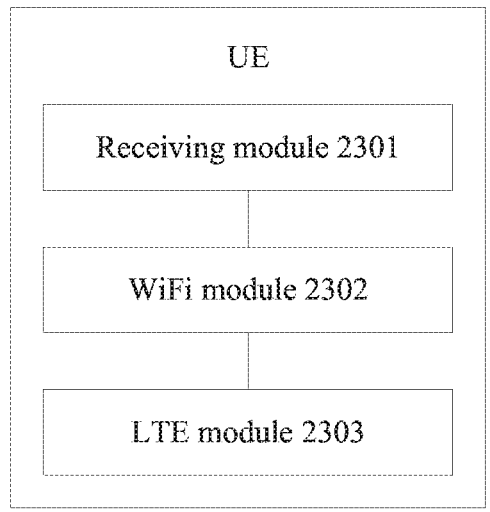
FIG. 29 is a schematic composition diagram of UE according to another embodiment.

Another embodiment provides a UE, where the UE is applied to a wireless communications system that includes a cellular radio access device and a non-cellular radio access device. As shown in FIG. 29, the UE includes a receiving module 2301, a WiFi module 2302, and an LTE module 2303.

The receiving module 2301 is configured to receive a data frame sent by the cellular radio access device by using the non-cellular radio access device, where the data frame includes a data packet that the cellular radio access device needs to send to the UE, and the data packet includes a source Internet Protocol (IP) address and a destination IP address; the WiFi module 2302 is configured to determine that the source IP address is an address used to bear a cellular service, or determine that the destination IP address is assigned by a core network gateway, and send the data packet to the LTE module 2303; and the LTE module 2303 is configured to receive the data packet sent by the WiFi module 2302 and process the data packet by using a cellular network protocol.

It should be noted that for specific working processes of function modules in the UE provided in this embodiment, reference may be made to specific description of corresponding processes in a method embodiment. Details are not described herein in this embodiment.

After receiving a data frame sent by a cellular radio access device by using a non-cellular radio access device, the UE provided in this embodiment may determine whether a data packet is a cellular network data packet according to a source IP address or a destination IP address included in the data packet; and after determining that the data packet is a cellular network data packet, process the data packet by using a cellular network protocol. When determining that the data packet is a cellular network data packet by using the IP address, the UE processes the data packet by using the cellular network protocol. Therefore, service continuity is ensured, thereby improving service quality and user experience.

Figure 30:
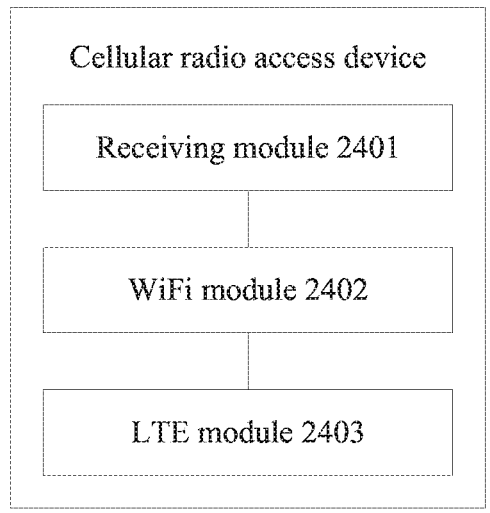
FIG. 30 is a schematic composition diagram of a cellular radio access device according to another embodiment.

Another embodiment provides a cellular radio access device, where the cellular radio access device is applied to a wireless communications system, and the wireless communications system further includes a non-cellular radio access device. As shown in FIG. 30, the cellular radio access device includes a receiving module 2401, a WiFi module 2402, and an LTE module 2403.

The receiving module 2401 is configured to receive a data frame sent by a UE by using the non-cellular radio access device, where the data frame includes a data packet that the UE needs to send to the cellular radio access device, and the data packet includes a source IP address and a destination IP address; the WiFi module 2402 is configured to determine that the destination IP address is an address used to bear a cellular service, or determine that the source IP address is assigned by a core network gateway, and send the data packet to the LTE module 2403; and the LTE module 2403 is configured to receive the data packet sent by the WiFi module 2402 and process the data packet by using a cellular network protocol.

It should be noted that for specific working processes of function modules in the cellular radio access device provided in this embodiment, reference may be made to specific description of corresponding processes in a method embodiment. Details are not described herein in this embodiment.

After receiving a data frame sent by UE by using a non-cellular radio access device, the cellular radio access device provided in this embodiment may determine whether a data packet is a cellular network data packet according to a source IP address or a destination IP address included in the data packet; and after determining that the data packet is a cellular network data packet, process the data packet by using a cellular network protocol. When determining that the data packet is a cellular network data packet by using the IP address, the cellular radio access device processes the data packet by using the cellular network protocol. Therefore, service continuity is ensured, thereby improving service quality and user experience.

Figure 31:
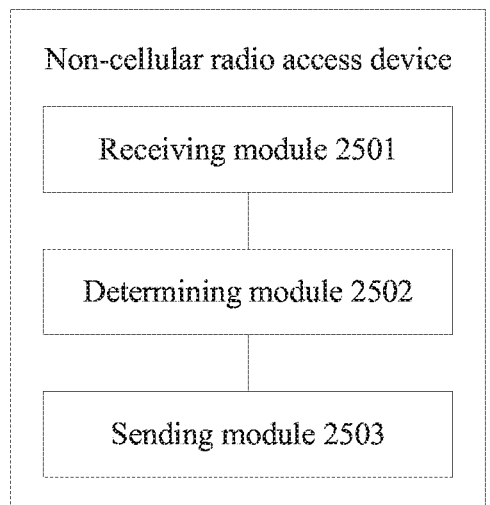
FIG. 31 is a schematic composition diagram of a non-cellular radio access device according to another embodiment.

Another embodiment provides a non-cellular radio access device, where the non-cellular radio access device is applied to a wireless communications system, and the wireless communications system further includes a cellular radio access device. As shown in FIG. 31, the non-cellular radio access device includes a receiving module 2501, a determining module 2502, and a sending module 2503.

The receiving module 2501 is configured to receive a data frame sent by the cellular radio access device, where the data frame includes a data packet that the cellular radio access device needs to send to a UE, and the data packet includes a source IP address and a destination IP address; the determining module 2502 is configured to determine that the source IP address is an address used to bear a cellular service, or determine that the destination IP address is assigned by a core network gateway; and the sending module 2503 is configured to send the data frame to the UE, so that the UE processes the data packet by using a cellular network protocol.

It should be noted that for specific working processes of function modules in the non-cellular radio access device provided in this embodiment, reference may be made to specific description of corresponding processes in a method embodiment. Details are not described herein in this embodiment.

After receiving a data frame sent by a cellular radio access device, the non-cellular radio access device provided in this embodiment may determine whether a data packet is a cellular network data packet according to a source IP address or a destination IP address included in the data packet; and after determining that the data packet is a cellular network data packet, send the data frame to UE, so that the UE processes the data packet by using a cellular network protocol. When determining that the data packet is a cellular network data packet by using the IP address, the non-cellular radio access device sends the data frame to the UE, so that the UE processes the data packet by using the cellular network protocol. Therefore, service continuity is ensured, thereby improving service quality and user experience.

Figure 32:
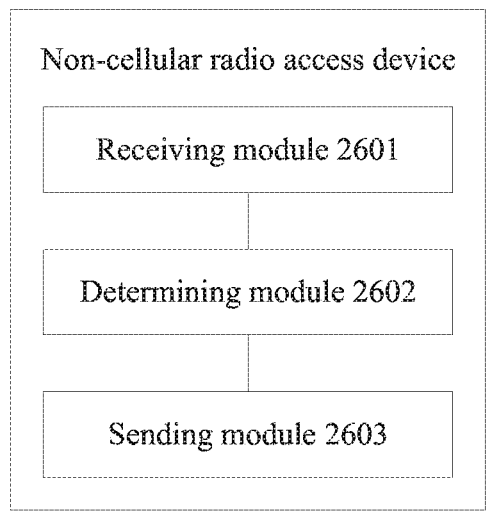
FIG. 32 is a schematic composition diagram of a non-cellular radio access device according to another embodiment.

Another embodiment provides a non-cellular radio access device, where the non-cellular radio access device is applied to a wireless communications system, and the wireless communications system further includes a cellular radio access device. As shown in FIG. 32, the non-cellular radio access device includes a receiving module 2601, a determining module 2602, and a sending module 2603.

The receiving module 2601 is configured to receive a data frame sent by a UE, where the data frame includes a data packet that the UE needs to send to the cellular radio access device, and the data packet includes a source IP address and a destination IP address; the determining module 2602 is configured to determine that the destination IP address is an address used to bear a cellular service, or determine that the source IP address is assigned by a core network gateway; and the sending module 2603 is configured to send the data frame to the cellular radio access device, so that the cellular radio access device processes the data packet by using a cellular network protocol.

It should be noted that for specific working processes of function modules in the non-cellular radio access device provided in this embodiment, reference may be made to specific description of corresponding processes in a method embodiment. Details are not described herein in this embodiment.

After receiving a data frame sent by UE, the non-cellular radio access device provided in this embodiment may determine whether a data packet is a cellular network data packet according to a source IP address or a destination IP address included in the data packet; and after determining that the data packet is a cellular network data packet, send the data frame to a cellular radio access device, so that the cellular radio access device processes the data packet by using a cellular network protocol. When determining that the data packet is a cellular network data packet by using the IP address, the non-cellular radio access device sends the data frame to the cellular radio access device, so that the cellular radio access device processes the data packet by using the cellular network protocol. Therefore, service continuity is ensured, thereby improving service quality and user experience.

Figure 33:
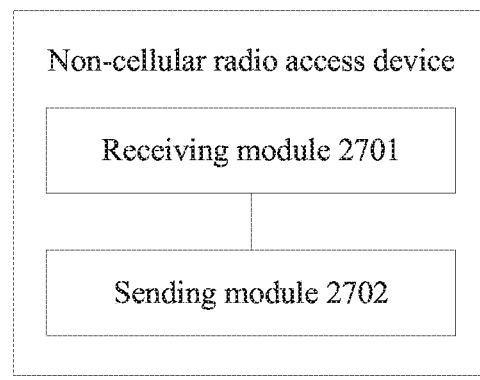
FIG. 33 is a schematic composition diagram of a non-cellular radio access device according to another embodiment.

Another embodiment provides a non-cellular radio access device, where the non-cellular radio access device is applied to a wireless communications system, and the wireless communications system further includes a cellular radio access device. As shown in FIG. 33, the non-cellular radio access device includes a receiving module 2701 and a sending module 2702.

The receiving module 2701 is configured to receive a data frame sent by the cellular radio access device or an AC, where the data frame includes a data packet that the cellular radio access device needs to send to a UE; and the sending module 2702 is configured to add, to the data frame, indication information used to indicate that the data packet is a cellular network data packet, and send the data frame to the UE, where the indication information is used by the UE to process the data packet by using a cellular network protocol according to the indication information.

In this embodiment, further optionally, the receiving module 2701 is further configured to: before the sending module 2702 adds, to the data frame, the indication information used to indicate that the data packet is a cellular network data packet, and sends the data frame to the UE, receive the indication information sent by the cellular radio access device.

It should be noted that for specific working processes of function modules in the non-cellular radio access device provided in this embodiment, reference may be made to specific description of corresponding processes in a method embodiment. Details are not described herein in this embodiment.

After receiving a data frame sent by a cellular radio access device, the non-cellular radio access device provided in this embodiment adds, to the data frame, indication information used to indicate that a data packet is a cellular network data packet, and sends the data frame to UE. Because the data frame received by the UE includes the indication information used to indicate that the data packet is a cellular network data packet, after receiving the data frame, the UE needs to process the data packet by using a cellular network protocol. The indication information is used to indicate that the data packet is a cellular network data packet, so that the UE can process the data packet by using the cellular network protocol. Therefore, service continuity is ensured, thereby improving service quality and user experience.

Figure 34:
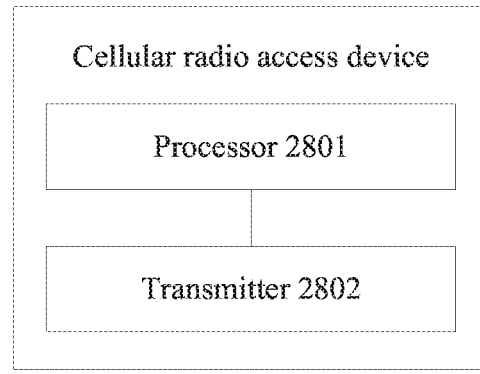
FIG. 34 is a schematic composition diagram of a cellular radio access device according to another embodiment.

Another embodiment provides a cellular radio access device, where the cellular radio access device is applied to a wireless communications system, and the wireless communications system further includes a non-cellular radio access device. As shown in FIG. 34, the cellular radio access device includes a processor 2801 and a transmitter 2802.

The processor 2801 is configured to determine to offload data, in a cellular network, of a UE served by the cellular radio access device to a non-cellular network; and the transmitter 2802 is configured to send, by using the non-cellular radio access device, a data frame to the UE served by the cellular radio access device.

The data frame includes a data packet that the cellular radio access device needs to send to the UE, and indication information used to indicate that the data packet is a cellular network data packet, where the indication information is used by the UE to process the data packet by using a cellular network protocol according to the indication information.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

In this embodiment, further optionally, the transmitter 2802 is further configured to send a mapping relationship between the bearer information and the radio bearer that is in the at least one radio bearer and that carries the data packet, to the UE by using an air interface message.

In this embodiment, further optionally, the cellular network data packet includes a PDCP data packet or a RLC data packet.

It should be noted that for specific working processes of function modules in the cellular radio access device provided in this embodiment, reference may be made to specific description of corresponding processes in a method embodiment. Details are not described herein in this embodiment.

After determining to offload data, in a cellular network, of UE served by the cellular radio access device to a non-cellular network, the cellular radio access device provided in this embodiment sends, by using a non-cellular radio access device, a data frame to the UE served by the cellular radio access device. Because the data frame includes indication information used to indicate that a data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 35:
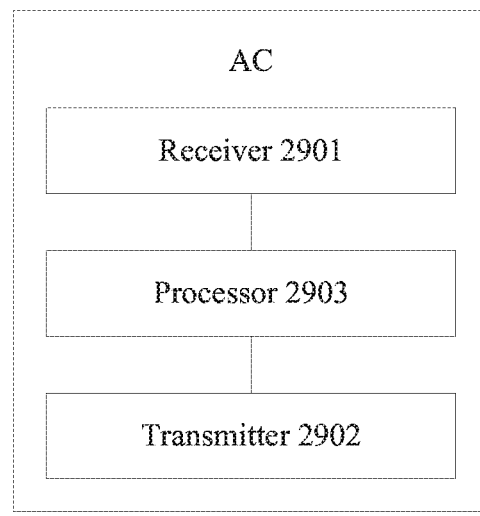
FIG. 35 is a schematic composition diagram of an AC according to another embodiment.

Another embodiment provides an AC, where the access controller AC is applied to a wireless communications system that includes a cellular radio access device and a non-cellular radio access device. As shown in FIG. 35, the AC includes a receiver 2901 and a transmitter 2902.

The receiver 2901 is configured to receive a data packet that is sent by the cellular radio access device and that the cellular radio access device needs to send to a UE; and the transmitter 2902 is configured to send a data frame to the UE by using the non-cellular radio access device.

The data frame includes the data packet that the cellular radio access device needs to send to the UE, and indication information used to indicate that the data packet is a cellular network data packet, where the indication information is used by the UE to process the data packet by using a cellular network protocol according to the indication information.

In this embodiment, further optionally, the indication information is address information of the cellular radio access device.

In this embodiment, further optionally, the receiver 2901 is further configured to: before the transmitter 2902 sends the data frame to the UE by using the non-cellular radio access device, receive identification information of the non-cellular radio access device that is sent by the cellular radio access device, where the identification information is used by the AC to determine the non-cellular radio access device.

In this embodiment, further optionally, the data packet is included in an 802.3 frame.

The AC further includes a processor 2903.

The processor 2903 is configured to: before the transmitter 2902 sends the data frame to the UE by using the non-cellular radio access device, add the data packet included in the 802.3 frame to the data frame.

In this embodiment, further optionally, the identification information of the non-cellular radio access device is a MAC address of the non-cellular radio access device, a basic service set identifier (BSSID) of the non-cellular radio access device, or a SSID of the non-cellular radio access device.

In this embodiment, further optionally, when there is at least one radio bearer on the UE, the data frame further includes bearer information used to indicate a radio bearer that is in the at least one radio bearer and that carries the data packet.

In this embodiment, further optionally, the transmitter 2902 is further configured to send a mapping relationship between the bearer information and the radio bearer that is in the at least one radio bearer and that carries the data packet, to the UE by using the cellular radio access device.

In this embodiment, further optionally, the cellular network data packet includes a PDCP data packet or a RLC data packet.

It should be noted that for specific working processes of function modules in the AC provided in this embodiment, reference may be made to specific description of corresponding processes in a method embodiment. Details are not described herein in this embodiment.

After receiving a data packet that is sent by a cellular radio access device and that the cellular radio access device needs to send to UE, the AC provided in this embodiment may add, to a data frame, the data packet and indication formation used to indicate that the data packet is a cellular network data packet, and send the data frame to the UE by using a non-cellular radio access device. Because the data frame includes the indication information used to indicate that the data packet is a cellular network data packet, after receiving the data frame, the UE may process the data packet by using a cellular network protocol according to the indication information. The indication information is used to indicate that the data packet is a cellular network data packet, so that the UE processes the data packet by using the cellular network protocol. Therefore, service continuity is ensured, thereby improving service quality and user experience.

Figure 36:
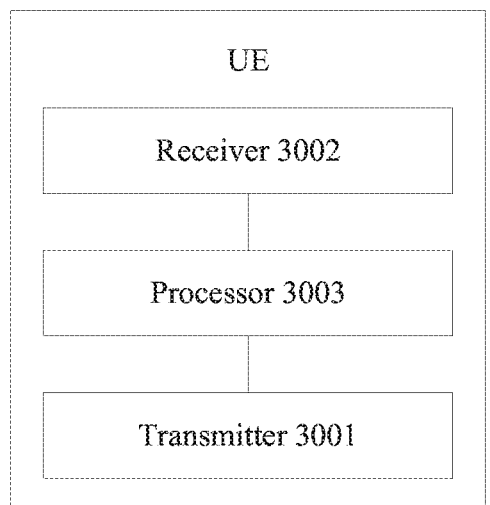
FIG. 36 is a schematic composition diagram of UE according to another embodiment.

Another embodiment provides a UE, where the UE is applied to a wireless communications system that includes a cellular radio access device and a non-cellular radio access device. As shown in FIG. 36, the UE includes a transmitter 3001.

The transmitter 3001 is configured to: when it is determined to offload data of the UE in a cellular network to a non-cellular network, send, by the UE, a data frame to the cellular radio access device by using the non-cellular radio access device.

The data frame includes a data packet that the UE needs to send to the cellular radio access device, and indication information used to indicate that the data packet is a cellular network data packet, where the indication information is used by the cellular radio access device to process the data packet by using a cellular network protocol.

In this embodiment, further optionally, the indication information is address information of the cellular radio access device.

In this embodiment, further optionally, the UE further includes a receiver 3002 and a processor 3003.

The receiver 3002 is configured to: before the transmitter 3001 sends the data frame to the cellular radio access device by using the non-cellular radio access device, receive a mapping relationship between a MAC address of the cellular radio access device and function information of the MAC address, where the mapping relationship is sent by the cellular radio access device, and the function information includes offloading and converging; and the processor 3003 is configured to: determine, according to the mapping relationship received by the receiver 3002, a MAC address whose function information is offloading and converging as the indication information.

In this embodiment, further optionally, when there is at least one radio bearer on the UE, the data frame further includes bearer information used to indicate a radio bearer that is in the at least one radio bearer and that carries the data packet.

In this embodiment, further optionally, the cellular network data packet includes a PDCP data packet or a RLC data packet.

It should be noted that for specific working processes of function modules in the UE provided in this embodiment, reference may be made to specific description of corresponding processes in a method embodiment. Details are not described herein in this embodiment.

When determining to offload data of the UE in a cellular network to a non-cellular network, the UE provided in this embodiment sends a data frame to a cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 37:
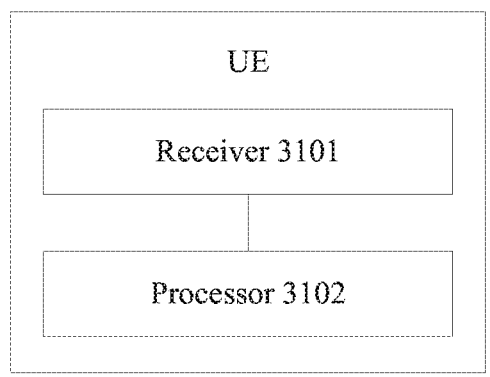
FIG. 37 is a schematic composition diagram of UE according to another embodiment.

Another embodiment provides a UE, where the UE is applied to a wireless communications system that includes a cellular radio access device and a non-cellular radio access device. As shown in FIG. 37, the UE includes a receiver 3101 and a processor 3102.

The receiver 3101 is configured to: receive a data frame sent by the cellular radio access device by using the non-cellular radio access device, where the data frame is sent after the cellular radio access device determines to offload data of the UE in a cellular network to a non-cellular network, and the data frame includes a data packet that the cellular radio access device needs to send to the UE, and indication information used to indicate that the data packet is a cellular network data packet; and the processor 3102 is configured to determine that the data packet is the cellular network data packet according to the indication information, and process the data packet by using a cellular network protocol.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

The receiver 3101 is further configured to: before the processor 3102 processes the data packet by using the cellular network protocol, receive a mapping relationship between the bearer information and the radio bearer that is in the at least one radio bearer and that carries the data packet, where the mapping relationship is sent by the cellular radio access device by using an air interface message; and the processor 3102 is specifically configured to process the data packet by using the cellular network protocol according to the mapping relationship and the bearer information.

In this embodiment, further optionally, the cellular network data packet includes a PDCP data packet or a RLC data packet.

It should be noted that for specific working processes of function modules in the UE provided in this embodiment, reference may be made to specific description of corresponding processes in a method embodiment. Details are not described herein in this embodiment.

According to the UE provided in this embodiment, after determining to offload data, in a cellular network, of the UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may determine that the data packet is a cellular network data packet according to the indication information, and process the data packet by using a cellular network protocol. The indication information is used to indicate that the data packet is a cellular network data packet, so that the UE processes the data packet by using the cellular network protocol. Therefore, service continuity is ensured, thereby improving service quality and user experience.

Figure 38:
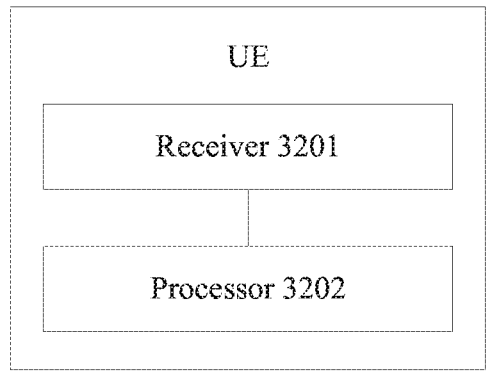
FIG. 38 is a schematic composition diagram of UE according to another embodiment.

Another embodiment provides a UE, where the UE is applied to a wireless communications system that includes a cellular radio access device and a non-cellular radio access device. As shown in FIG. 38, the UE includes a receiver 3201 and a processor 3202.

The receiver 3201 is configured to receive a data frame sent by an AC by using the non-cellular radio access device, where the data frame is sent after the AC receives a data packet that is sent by the cellular radio access device and that the cellular radio access device needs to send to the UE, and the data frame includes the data packet that the cellular radio access device needs to send to the UE, and indication information used to indicate that the data packet is a cellular network data packet; and the processor 3202 is configured to determine that the data packet is the cellular network data packet according to the indication information, and process the data packet by using a cellular network protocol.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

The receiver 3201 is further configured to: before the processor 3202 processes the data packet by using the cellular network protocol, receive a mapping relationship between the bearer information and the radio bearer that is in the at least one radio bearer and that carries the data packet, where the mapping relationship is sent by the AC by using the cellular radio access device; and the processor 3202 is specifically configured to process the data packet by using the cellular network protocol according to the mapping relationship and the bearer information that are received by the receiver 3201.

In this embodiment, further optionally, the cellular network data packet includes a PDCP data packet or a RLC data packet.

It should be noted that for specific working processes of function modules in the UE provided in this embodiment, reference may be made to specific description of corresponding processes in a method embodiment. Details are not described herein in this embodiment.

According to the UE provided in this embodiment, after determining to offload data, in a cellular network, of the UE served by a cellular radio access device to a non-cellular network, the cellular radio access device sends, by using a non-cellular radio access device, a data frame to the UE served by the cellular radio access device. Because the data frame includes indication information used to indicate that a data packet is a cellular network data packet, after receiving the data frame, the UE may determine that the data packet is a cellular network data packet according to the indication information, and process the data packet by using a cellular network protocol. The indication information is used to indicate that the data packet is a cellular network data packet, so that the UE processes the data packet by using the cellular network protocol. Therefore, service continuity is ensured, thereby improving service quality and user experience.

Figure 39:
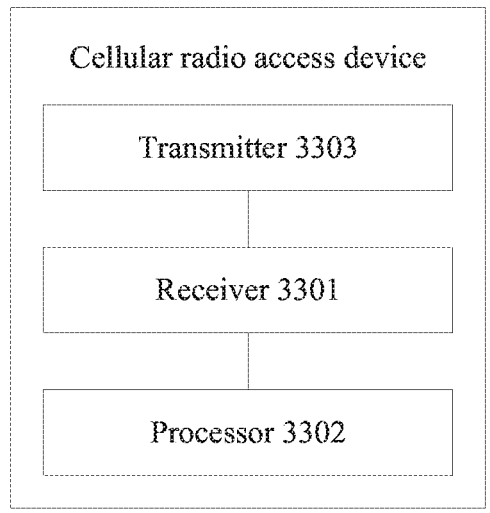
FIG. 39 is a schematic composition diagram of a cellular radio access device according to another embodiment.

Another embodiment provides a cellular radio access device, where the cellular radio access device is applied to a wireless communications system, and the wireless communications system further includes a non-cellular radio access device. As shown in FIG. 39, the cellular radio access device includes a receiver 3301 and a processor 3302.

The receiver 3301 is configured to receive a data frame sent by a UE by using the non-cellular radio access device, where the data frame is sent when the UE determines to offload data of the UE in a cellular network to a non-cellular network, and the data frame includes a data packet that the UE needs to send to the cellular radio access device, and indication information used to indicate that the data packet is a cellular network data packet; and the processor 3302 is configured to process the data packet by using a cellular network protocol.

In this embodiment, further optionally, the indication information is address information of the cellular radio access device.

In this embodiment, further optionally, the cellular radio access device further includes a transmitter 3303.

The transmitter 3303 is configured to: before the receiver 3301 receives the data frame sent by the UE by using the non-cellular radio access device, send a mapping relationship between a MAC address of the cellular radio access device and function information of the MAC address to the UE, where the function information includes offloading and converging.

In this embodiment, further optionally, the data frame is sent after the non-cellular radio access device determines that the data packet is the cellular network data packet; or the processor 3302 is further configured to: before processing the data packet by using the cellular network protocol, determine that the data packet is the cellular network data packet according to the indication information.

In this embodiment, further optionally, when there is at least one radio bearer on the UE, the data frame further includes bearer information used to indicate a radio bearer that is in the at least one radio bearer and that carries the data packet.

The processor 3302 is specifically configured to process the data packet by using the cellular network protocol according to the bearer information and a mapping relationship between the bearer information and the radio bearer that is in the at least one radio bearer and that carries the data packet.

In this embodiment, further optionally, the cellular network data packet includes a PDCP data packet or a RLC data packet.

It should be noted that for specific working processes of function modules in the cellular radio access device provided in this embodiment, reference may be made to specific description of corresponding processes in a method embodiment. Details are not described herein in this embodiment.

According to the cellular radio access device provided in this embodiment, when determining to offload data of UE in a cellular network to a non-cellular network, the UE sends a data frame to the cellular radio access device by using a non-cellular radio access device, where the data frame carries a data packet and indication information used to indicate that the data packet is a cellular network data packet. Because the data frame includes the indication information used to indicate that the data packet is a cellular network data packet, after receiving the data frame, the cellular radio access device processes the data packet by using a cellular network protocol. The indication information is used to indicate that the data packet is a cellular network data packet, so that the cellular radio access device processes the data packet by using the cellular network protocol. Therefore, service continuity is ensured, thereby improving service quality and user experience.

Figure 40:
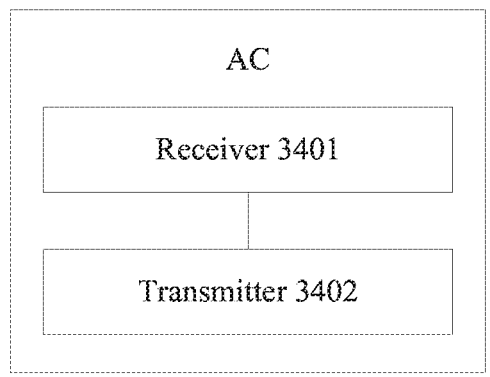
FIG. 40 is a schematic composition diagram of an AC according to another embodiment.

Another embodiment provides an AC, where the access controller AC is applied to a wireless communications system that includes a cellular radio access device and a non-cellular radio access device. As shown in FIG. 40, the AC includes a receiver 3401 and a transmitter 3402.

The receiver 3401 is configured to receive a data frame sent by a UE by using the non-cellular radio access device, where the data frame is sent when the UE determines to offload data of the UE in a cellular network to a non-cellular network, the data frame includes a data packet that the UE needs to send to the cellular radio access device, and indication information used to indicate that the data packet is a cellular network data packet, and the indication information is used by the cellular radio access device to process the data packet by using a cellular network protocol; and the transmitter 3402 is configured to: after it is determined that the data packet is the cellular network data packet according to the indication information, send the data frame to the cellular radio access device; or send the data frame to the cellular radio access device, where the data frame is sent to the AC by the non-cellular radio access device after determining that the data packet is the cellular network data packet according to the indication information.

In this embodiment, further optionally, the indication information is address information of the cellular radio access device.

In this embodiment, further optionally, when there is at least one radio bearer on the UE, the data frame further includes bearer information used to indicate a radio bearer that is in the at least one radio bearer and that carries the data packet.

In this embodiment, further optionally, the cellular network data packet includes a PDCP data packet or a RLC data packet.

It should be noted that for specific working processes of function modules in the AC provided in this embodiment, reference may be made to specific description of corresponding processes in a method embodiment. Details are not described herein in this embodiment.

After receiving a data frame sent by UE by using a non-cellular radio access device, the AC provided in this embodiment may send the data frame to a cellular radio access device after determining that a data packet is a cellular network data packet according to indication information; or may directly send the data frame to a cellular radio access device. Because the data frame is sent to the cellular radio access device by the AC or the non-cellular radio access device after determining that the data packet included in the data frame is a cellular network data packet, after receiving the data frame, the cellular radio access device needs to process the data packet by using a cellular network protocol. The indication information is used to indicate that the data packet is a cellular network data packet, so that the cellular radio access device can process the data packet by using the cellular network protocol. Therefore, service continuity is ensured, thereby improving service quality and user experience.

Figure 41:
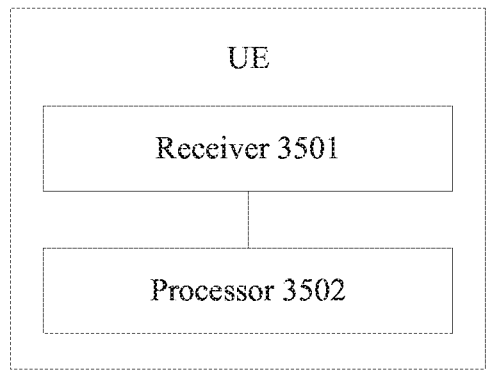
FIG. 41 is a schematic composition diagram of UE according to another embodiment.

Another embodiment provides a UE, where the UE is applied to a wireless communications system that includes a cellular radio access device and a non-cellular radio access device. As shown in FIG. 41, the UE includes a receiver 3501 and a processor 3502.

The receiver 3501 is configured to receive a data frame sent by the cellular radio access device by using the non-cellular radio access device, where the data frame includes a data packet that the cellular radio access device needs to send to the UE, and the data packet includes a source IP address and a destination IP address; and the processor 3502 is configured to determine that the source IP address is an address used to bear a cellular service, or determine that the destination IP address is assigned by a core network gateway, and process the data packet by using a cellular network protocol.

It should be noted that for specific working processes of function modules in the UE provided in this embodiment, reference may be made to specific description of corresponding processes in a method embodiment. Details are not described herein in this embodiment.

After receiving a data frame sent by a cellular radio access device by using a non-cellular radio access device, the UE provided in this embodiment may determine whether a data packet is a cellular network data packet according to a source IP address or a destination IP address included in the data packet; and after determining that the data packet is a cellular network data packet, process the data packet by using a cellular network protocol. When determining that the data packet is a cellular network data packet by using the IP address, the UE processes the data packet by using the cellular network protocol. Therefore, service continuity is ensured, thereby improving service quality and user experience.

Figure 42:
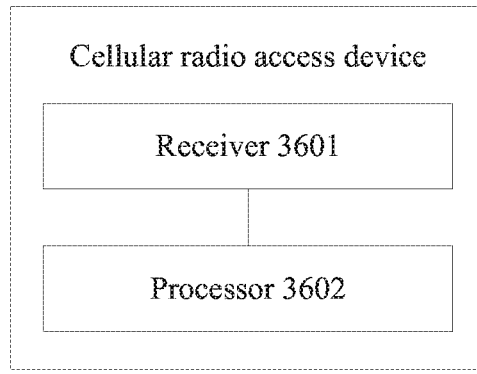
FIG. 42 is a schematic composition diagram of a cellular radio access device according to another embodiment.

Another embodiment provides a cellular radio access device, where the cellular radio access device is applied to a wireless communications system, and the wireless communications system further includes a non-cellular radio access device. As shown in FIG. 42, the cellular radio access device includes a receiver 3601 and a processor 3602.

The receiver 3601 is configured to receive a data frame sent by a UE by using the non-cellular radio access device, where the data frame includes a data packet that the UE needs to send to the cellular radio access device, and the data packet includes a source IP address and a destination IP address; and the processor 3602 is configured to determine that the destination IP address is an address used to bear a cellular service, or determine that the source IP address is assigned by a core network gateway, and process the data packet by using a cellular network protocol.

It should be noted that for specific working processes of function modules in the cellular radio access device provided in this embodiment, reference may be made to specific description of corresponding processes in a method embodiment. Details are not described herein in this embodiment.

After receiving a data frame sent by UE by using a non-cellular radio access device, the cellular radio access device provided in this embodiment may determine whether a data packet is a cellular network data packet according to a source IP address or a destination IP address included in the data packet; and after determining that the data packet is a cellular network data packet, process the data packet by using a cellular network protocol. When determining that the data packet is a cellular network data packet by using the IP address, the cellular radio access device processes the data packet by using the cellular network protocol. Therefore, service continuity is ensured, thereby improving service quality and user experience.

Figure 43:
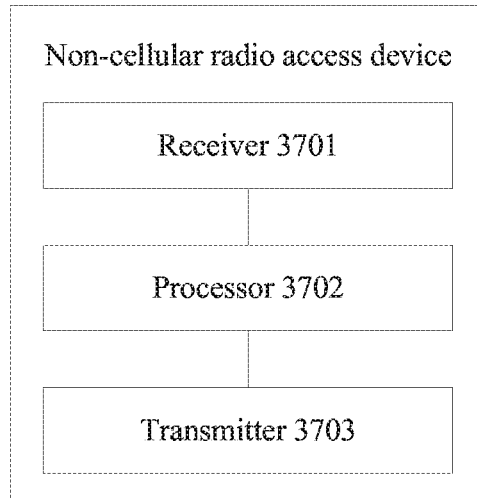
FIG. 43 is a schematic composition diagram of a non-cellular radio access device according to another embodiment.

Another embodiment provides a non-cellular radio access device, where the non-cellular radio access device is applied to a wireless communications system, and the wireless communications system further includes a cellular radio access device. As shown in FIG. 43, the non-cellular radio access device includes a receiver 3701, a processor 3702, and a transmitter 3703.

The receiver 3701 is configured to receive a data frame sent by the cellular radio access device, where the data frame includes a data packet that the cellular radio access device needs to send to a UE, and the data packet includes a source IP address and a destination IP address; the processor 3702 is configured to determine that the source IP address is an address used to bear a cellular service, or determine that the destination IP address is assigned by a core network gateway; and the transmitter 3703 is configured to send the data frame to the UE, so that the UE processes the data packet by using a cellular network protocol.

It should be noted that for specific working processes of function modules in the non-cellular radio access device provided in this embodiment, reference may be made to specific description of corresponding processes in a method embodiment. Details are not described herein in this embodiment.

After receiving a data frame sent by a cellular radio access device, the non-cellular radio access device provided in this embodiment may determine whether a data packet is a cellular network data packet according to a source IP address or a destination IP address included in the data packet; and after determining that the data packet is a cellular network data packet, send the data frame to UE, so that the UE processes the data packet by using a cellular network protocol. When determining that the data packet is a cellular network data packet by using the IP address, the non-cellular radio access device sends the data frame to the UE, so that the UE processes the data packet by using the cellular network protocol. Therefore, service continuity is ensured, thereby improving service quality and user experience.

Figure 44:
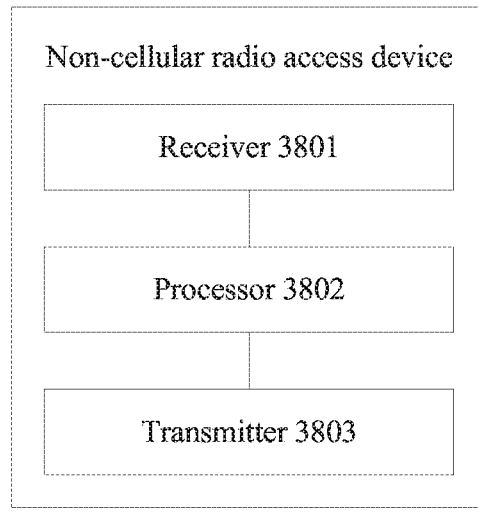
FIG. 44 is a schematic composition diagram of a non-cellular radio access device according to another embodiment.

Another embodiment provides a non-cellular radio access device, where the non-cellular radio access device is applied to a wireless communications system, and the wireless communications system further includes a cellular radio access device. As shown in FIG. 44, the non-cellular radio access device includes a receiver 3801, a processor 3802, and a transmitter 3803.

The receiver 3801 is configured to receive a data frame sent by a UE, where the data frame includes a data packet that the UE needs to send to the cellular radio access device, and the data packet includes a source IP address and a destination IP address; the processor 3802 is configured to determine that the destination IP address is an address used to bear a cellular service, or determine that the source IP address is assigned by a core network gateway; and the transmitter 3803 is configured to send the data frame to the cellular radio access device, so that the cellular radio access device processes the data packet by using a cellular network protocol.

It should be noted that for specific working processes of function modules in the non-cellular radio access device provided in this embodiment, reference may be made to specific description of corresponding processes in a method embodiment. Details are not described herein in this embodiment.

After receiving a data frame sent by UE, the non-cellular radio access device provided in this embodiment may determine whether a data packet is a cellular network data packet according to a source IP address or a destination IP address included in the data packet; and after determining that the data packet is a cellular network data packet, send the data frame to a cellular radio access device, so that the cellular radio access device processes the data packet by using a cellular network protocol. When determining that the data packet is a cellular network data packet by using the IP address, the non-cellular radio access device sends the data frame to the cellular radio access device, so that the cellular radio access device processes the data packet by using the cellular network protocol. Therefore, service continuity is ensured, thereby improving service quality and user experience.

Figure 45:
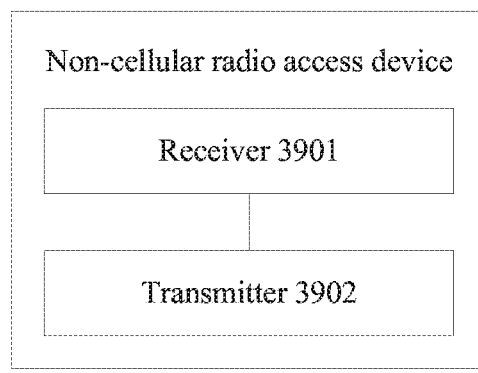
FIG. 45 is a schematic composition diagram of a non-cellular radio access device according to another embodiment.

Another embodiment provides a non-cellular radio access device, where the non-cellular radio access device is applied to a wireless communications system, and the wireless communications system further includes a cellular radio access device. As shown in FIG. 45, the non-cellular radio access device includes a receiver 3901 and a transmitter 3902.

The receiver 3901 is configured to receive a data frame sent by the cellular radio access device or an AC, where the data frame includes a data packet that the cellular radio access device needs to send to a UE; and the transmitter 3902 is configured to add, to the data frame, indication information used to indicate that the data packet is a cellular network data packet, and send the data frame to the UE, where the indication information is used by the UE to process the data packet by using a cellular network protocol according to the indication information.

In this embodiment, further optionally, the receiver 3901 is further configured to: before the transmitter 3902 adds, to the data frame, the indication information used to indicate that the data packet is a cellular network data packet, and sends the data frame to the UE, receive the indication information sent by the cellular radio access device.

It should be noted that for specific working processes of function modules in the non-cellular radio access device provided in this embodiment, reference may be made to specific description of corresponding processes in a method embodiment. Details are not described herein in this embodiment.

After receiving a data frame sent by a cellular radio access device, the non-cellular radio access device provided in this embodiment adds, to the data frame, indication information used to indicate that a data packet is a cellular network data packet, and sends the data frame to UE. Because the data frame received by the UE includes the indication information used to indicate that the data packet is a cellular network data packet, after receiving the data frame, the UE needs to process the data packet by using a cellular network protocol. The indication information is used to indicate that the data packet is a cellular network data packet, so that the UE can process the data packet by using the cellular network protocol. Therefore, service continuity is ensured, thereby improving service quality and user experience.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present embodiments essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners, but are not intended to limit the protection scope. Any variation or replacement readily figured out by a person skilled in the aft within the technical scope disclosed in the present embodiments shall fall within the protection scope of the present embodiments. Therefore, the protection scope of the present embodiments shall be subject to the protection scope of the claims.

What is claimed is:

1. A method comprises:
   receiving, by a device, a first data frame and indication information sent by a cellular radio access device, wherein the first data frame comprises a data packet for a user equipment (UE), and the first data frame and the indication information are sent through a Control and Provisioning of Wireless Access Points protocol (CAPWAP) tunnel interface between the device and the cellular radio access device;
   receiving, by the device, identification information of an access point (AP) sent by the cellular radio access device, wherein the AP is selected by the cellular radio access device;
   generating, by the device, a second data frame according to the first data frame and the identification information of the AP; and
   sending, by the device, the second data frame to the UE using the AP, wherein the second data frame is sent through a CAPWAP tunnel interface between the device and the AP, wherein the second data frame comprises the data packet for the UE and the indication information, and the indication information indicates that the UE is to process the data packet using a cellular network protocol, wherein the indication information comprises a type code, and the type code indicates whether the data packet is a Packet Data Convergence Protocol (PDCP) data packet or a Radio Link Control (RLC) data packet.

2. The method according to claim 1, wherein the second data frame further comprises bearer information indicating a radio bearer on the UE and that carries the data packet.

3. The method according to claim 1, wherein the data packet for the UE comprises the PDCP data packet or the RLC data packet.

4. The method according to claim 1, wherein the device is a non-cellular radio access device.

5. The method according to claim 1, wherein the device is an access controller.

6. An access controller, comprising:
   a processor; and
   a non-transitory computer readable storage medium storing a program for execution by the processor, the program including instructions to:
   receive a first data frame and indication information sent by a cellular radio access device, wherein the first data frame and the indication information are sent through a Control and Provisioning of Wireless Access Points protocol (CAPWAP) tunnel interface between the access controller and the cellular radio access device, and wherein the first data frame comprises a data packet for a user equipment (UE);
   receive identification information of an access point (AP) sent by the cellular radio access device, wherein the AP is selected by the cellular radio access device;
   generate a second data frame according to the first data frame and the identification information of the AP; and
   send the second data frame to the UE using the AP, wherein the second data frame is sent through a CAPWAP tunnel interface between the access controller and the AP, wherein the second data frame comprises the data packet for the UE and the indication information, and the indication information indicates that the UE is to process the data packet using a cellular network protocol, and wherein the indication information comprises a type code, and the type code indicates whether the data packet is a Packet Data Convergence Protocol (PDCP) data packet or a Radio Link Control (RLC) data packet.

7. The access controller according to claim 6, wherein the second data frame further comprises bearer information indicating a radio bearer on the UE and that carries the data packet.

8. The access controller according to claim 6, wherein the data packet comprises the PDCP data packet or the RLC data packet.

* * * * *